United States Patent
Takahashi et al.

(10) Patent No.: US 10,510,110 B2
(45) Date of Patent: Dec. 17, 2019

(54) HOME ELECTRICAL APPLIANCE AND NETWORK SYSTEM

(71) Applicant: Toshiba Lifestyle Products & Services Corporation, Ome-shi, Tokyo (JP)

(72) Inventors: Yuki Takahashi, Ome (JP); Hitomi Saeki, Ome (JP); Hirokazu Izawa, Ome (JP); Yuuki Marutani, Ome (JP); Kazuhiro Furuta, Ome (JP); Kota Watanabe, Ome (JP)

(73) Assignee: TOSHIBA LIFESTYLE PRODUCTS & SERVICES CORPORATION, Tokyo (JP)

( * ) Notice: Subject to any disclaimer, the term of this patent is extended or adjusted under 35 U.S.C. 154(b) by 802 days.

(21) Appl. No.: 14/757,499

(22) Filed: Dec. 23, 2015

(65) Prior Publication Data

US 2016/0127144 A1    May 5, 2016

Related U.S. Application Data

(63) Continuation of application No. PCT/JP2014/066544, filed on Jun. 23, 2014.

(30) Foreign Application Priority Data

Jun. 27, 2013 (JP) ................... 2013-134908
Mar. 19, 2014 (JP) ................... 2014-056632

(51) Int. Cl.
  *G06Q 30/06* (2012.01)
  *G08C 17/00* (2006.01)
  (Continued)

(52) U.S. Cl.
  CPC ......... *G06Q 30/0641* (2013.01); *G05B 15/02* (2013.01); *G06F 11/0709* (2013.01);
  (Continued)

(58) Field of Classification Search
  CPC ..... G06Q 30/0641; F25D 29/00; F25D 11/00; H04L 12/2816; H04M 11/00; G08C 2201/50; G08C 2201/51
  (Continued)

(56) References Cited

U.S. PATENT DOCUMENTS 9,137,297 B2 *  9/2015  Kim .............. H04L 12/2818
2002/0007304 A1  1/2002  Kasajima
  (Continued)

FOREIGN PATENT DOCUMENTS

CN       1182287      12/2004
CN     102449915       5/2012
  (Continued)

OTHER PUBLICATIONS

English Language Abstract of JP 2011-159051 published Aug. 18, 2011.
  (Continued)

*Primary Examiner* — Yogesh C Garg
(74) *Attorney, Agent, or Firm* — DLA Piper LLP US

(57) ABSTRACT

A network system including a home appliance, a server, and a communication terminal. The home appliance is provided with a control portion configured to control an operating state of the home appliance, an information setting portion configured to set information corresponding to current state of the control portion, and a transmitting portion configured to externally transmit a result of information set by the information setting portion through the communication line. The communication terminal is configured to display a specific advice, the specific advice being based on data, obtained from the multiple entries of data provided by the server, being suitable with a result of information transmitted by the home appliance.

13 Claims, 51 Drawing Sheets

(51) Int. Cl.
  G06Q 10/06 (2012.01)
  G06Q 50/06 (2012.01)
  G05B 15/02 (2006.01)
  G06F 11/07 (2006.01)
  H04L 12/28 (2006.01)
  F25D 29/00 (2006.01)

(52) U.S. Cl.
  CPC .......... G06F 11/079 (2013.01); G06Q 10/06 (2013.01); G06Q 50/06 (2013.01); G08C 17/00 (2013.01); H04L 12/2816 (2013.01); F25D 29/00 (2013.01); *F25D 2400/361* (2013.01); *G08C 2201/50* (2013.01)

(58) Field of Classification Search
  USPC ................................ 705/27.1; 715/769, 721
  See application file for complete search history.

(56) References Cited

U.S. PATENT DOCUMENTS

| | | | |
|---|---|---|---|
| 2005/0197763 A1* | 9/2005 | Robbins ................. | G06F 3/0481 345/169 |
| 2010/0286801 A1 | 11/2010 | Kwanho et al. | |
| 2011/0074589 A1* | 3/2011 | Han .................... | H04L 12/2825 340/618 |
| 2012/0198274 A1* | 8/2012 | Cho ........................ | H04L 12/12 714/15 |
| 2012/0316984 A1 | 12/2012 | Glassman | |
| 2013/0067375 A1* | 3/2013 | Kim ........................ | F25D 29/00 715/769 |
| 2014/0009300 A1* | 1/2014 | Ha ...................... | G05B 23/0205 340/679 |
| 2018/0198638 A1* | 7/2018 | Ha .......................... | H04L 12/12 |

FOREIGN PATENT DOCUMENTS

| | | | |
|---|---|---|---|
| EP | 1 186 694 | | 3/2002 |
| EP | 2292986 | | 3/2011 |
| JP | H-10154181 | | 6/1998 |
| JP | 2002-109017 | | 4/2002 |
| JP | 2002-162149 | | 6/2002 |
| JP | 2002-295939 | | 10/2002 |
| JP | 2004-070699 | | 3/2004 |
| JP | 2005114205 A | * | 4/2005 ............. F25D 23/00 |
| JP | 2006-260561 | | 9/2006 |
| JP | 2011-027305 | | 2/2011 |
| JP | 2011-159051 | | 8/2011 |
| JP | 2011-197904 | | 10/2011 |
| JP | 2012-048511 | | 3/2012 |
| JP | 2012-181805 | | 9/2012 |
| KR | 2002-0020831 | | 3/2002 |
| KR | 2012-0005237 | | 1/2012 |
| WO | WO 2013/025013 | | 2/2013 |

OTHER PUBLICATIONS

English Language Abstract of JP 2002-295939 published Oct. 9, 2002.
English Language Abstract of JP 2002-162149 published Jun. 7, 2002.
International Search Report issued in PCT/JP2014/066544 dated Sep. 16, 2014.
Written Opinion issued in PCT/JP2014/066544 dated Sep. 16, 2014.
English language Abstract and machine translation of JP 2011-027305 published on Feb. 10, 2011.
English language Abstract and machine translation of JP2012-048511 published on Mar. 8, 2012.
English language Abstract and machine translation of JP 2011-197904 published on Oct. 6, 2011.
English language Abstract and machine translation of JP 2006-260561 published on Sep. 28, 2006.
English language Abstract and machine translation of JP 2002-109017 published on Apr. 12, 2002.
English language Abstract and machine translation of JP 2012-181805 published on Mar. 9, 2012.
Chinese Office Action issued in CN 201480036424.1 dated Dec. 4, 2018.
European Office Action issued in EP 14 817 865.0 dated Apr. 20, 2018.
Japanese Office Action issued in JP 2014-056632 dated Feb. 27, 2018.
Korean Office Action (with English Translation) issued in Korean Application No. 10-2016-7000520 dated May 17, 2017.
Korean Office Action issued in Korean Application No. 7000520 dated Sep. 9, 2016 with English Translation.
English language Abstract and machine translation of JP 2004-070699 published on Mar. 4, 2004.
English language Abstract and machine translation of KR 2002-0020831 published on Mar. 16, 2002.
English language Abstract and machine translation of KR 2012-0005237 published on Jan. 16, 2012.
Japanese Office Action issued in Application No. JP 2018-116148 dated Jun. 25, 2019.

* cited by examiner

ERROR INFORMATION TABLE

| CLASSIFICATION | SEVERITY | ERROR CODE | ERROR CONTENT |
|---|---|---|---|
| WARNING | LIGHT | E11 | DOOR IS LEFT OPEN FOR LONG TIME |
| WARNING | MODERATE | E21 | FREEZER IS NOT COOLED |
| WARNING | MODERATE | E22 | FREEZE COOLER IS NOT COOLED |
| SEVERE FAILURE | HEAVY | E31 | EXCESS CURRENT |
| SEVERE FAILURE | HEAVY | E32 | CURRENT DETECTION CIRCUIT FAILURE |

REPLACEMENT PURCHASE INFORMATION

STOCK IN NEAREST DEALER (AS OF MAY 1)

| STORE NAME | LATEST MODEL: XX | POPULAR MODEL: XX |
|---|---|---|
| STORE A | 2 | NONE |
| STORE B | NONE | 1 |
| STORE C | NONE | NONE |

OK

REPLACEMENT PURCHASE INFORMATION

SALES OF LATEST MODEL (3/1 TO 3/3)

| DATE | NUMBER SOLD | |
|------|-------------|---|
| 3/1  | 50          | |
| 3/2  | 15          | TOTAL 65 |
| 3/3  | 20          | TOTAL 85 |

HOME ELECTRICAL APPLIANCE AND NETWORK SYSTEM

CROSS-REFERENCE TO RELATED APPLICATION(S)

This application is a continuation to an International Application No. PCT/JP2014/066554, filed on Jun. 23, 2014 which is based upon and claims the benefit of priority from Japanese Patent Application No. 2013-134908, filed on, Jun. 27, 2013 and from Japanese Patent Application No. 2014-056632, filed on, Mar. 19, 2014 the entire contents of which are incorporated herein by reference.

FIELD

Embodiments disclosed herein relate to a home electrical appliance and network system.

BACKGROUND

There are network systems provided with communication terminals and servers. The server stores multiple entries of data used for displaying pieces of advice for assisting the user in using the home appliance. When the user operates the communication terminal, an advice is displayed on the communication terminal which is prepared based on the multiple entries of data stored in the server suitable with the operation performed by the user.

The usability of conventional network systems are poor since they merely display advice on the communication terminal which is substantially equivalent to what is given in the instructions of the home electrical appliance.

SUMMARY

One embodiment of a home appliance includes a control portion configured to control an operating state of the home appliance; an information setting portion configured to set information for displaying, to a communication terminal, an advice suitable with current state of the control portion from a choice of plural pieces of advice directed to a user; and a transmitting portion configured to externally transmit a result of information set by the information setting portion through a communication line.

One embodiment of a network system includes a home appliance connected to a communication line; a storing unit being connected to the home appliance through the communication line and being configured to store multiple entries of data for displaying advice pertaining to the home appliance; and a communication terminal being connected to the storing unit through the communication line and being provided with a display portion. The home appliance is provided with a control portion configured to control an operating state of the home appliance, an information setting portion configured to set information corresponding to current state of the control portion, and a transmitting portion configured to externally transmit a result of information set by the information setting portion through the communication line. A specific advice is displayed on the display portion of the communication terminal, the specific advice being based on data, obtained from the multiple entries of data stored in the storing unit, being suitable with a result of information transmitted by the home appliance.

BRIEF DESCRIPTIONS OF THE DRAWINGS

FIG. 1 illustrates a network system of a first embodiment.
FIG. 2 illustrates an electrical configuration of the refrigerator.
FIG. 3 illustrates a top screen.
FIG. 4 illustrates a first select screen.
FIG. 5 illustrates a second select screen.
FIG. 6 indicates the process flow of a first operational information transmission process of a communication control circuit.
FIG. 7 indicates the process flow of a second operational information transmission process of a communication control circuit.
FIG. 8 indicates an advice screen.
FIG. 9 indicates an advice screen.
FIG. 10 indicates an advice screen.
FIG. 11 indicates an advice screen.
FIG. 12 indicates an advice screen.
FIG. 13 indicates an advice screen.
FIG. 14 indicates an advice screen.
FIG. 15 indicates an advice screen.
FIG. 16 illustrates a second embodiment and corresponds to FIG. 11.
FIG. 17 illustrates a setting screen.
FIG. 18 illustrates a third embodiment and corresponds to FIG. 8.
FIG. 19 illustrates a fourth embodiment and corresponds to FIG. 4.
FIG. 20 indicates an error table.
FIG. 21 is a flowchart indicating the control flow of a server.
FIG. 22 is a flowchart indicating a light severity advice display process.
FIG. 23 is a flowchart indicating a moderate severity advice display process.
FIG. 24 is a flowchart indicating an error support advice display process.
FIG. 25 is a flowchart indicating a purchase support advice display process.
FIG. 26 is a flowchart indicating a heavy severity advice display process.
FIG. 27 illustrates a screen displaying a light severity advice.
FIG. 28 illustrates a screen displaying a moderate severity advice.
FIG. 29 illustrates a screen displaying an error support advice.
FIG. 30 illustrates a screen accepting a repair request.
FIG. 31 illustrates a screen displaying a purchase support advice.
FIG. 32 illustrates a screen displaying replacement purchase information.
FIG. 33 illustrates a screen displaying a heavy severity advice.
FIG. 34 illustrates a screen displaying information when the appliance is operating normally.
FIG. 35 corresponds to FIG. 28 and illustrates another embodiment.
FIG. 36 illustrates a screen displaying risk information in another embodiment.
FIG. 37 illustrates a screen displaying replacement purchase information.
FIG. 38 illustrates a screen displaying replacement purchase information.
FIG. 39 illustrates a screen displaying replacement purchase information.
FIG. 40 illustrates a screen displaying replacement purchase information.

DESCRIPTION

Figure 1:
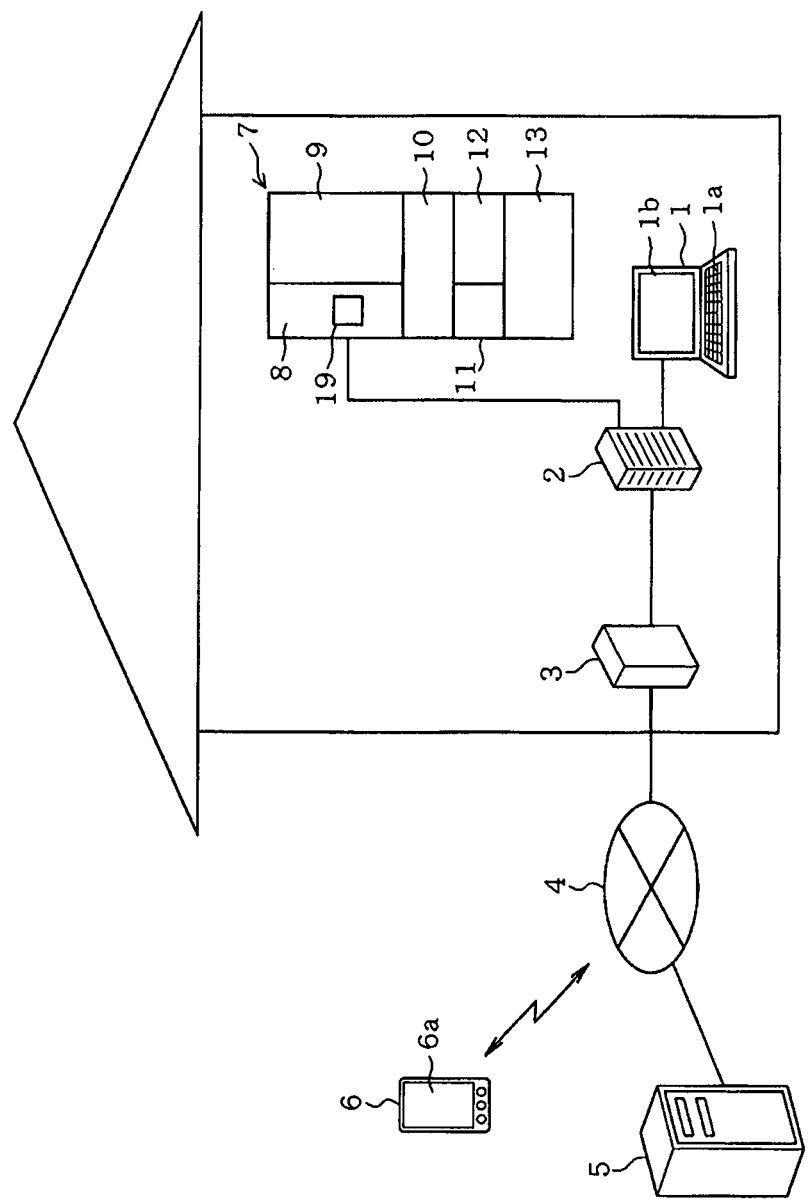

A description is given hereinafter on embodiments of a home electrical appliance and a network system. Elements that are substantially identical across the embodiments are represented by identical reference symbols and are not described in detail.

First Embodiment

In the present embodiment, the network system is configured by a personal computer 1, an access point 2, a router 3, a communication line 4, a server 5, a high-end mobile phone 6, and a refrigerator 7. The refrigerator 7 is one example of a home electrical appliance. Apart from a refrigerator, examples of the home electrical appliance include: a washing machine; cooling and heating equipment such as an air conditioner; a vacuum cleaner; heat cookers such as a microwave oven, oven, and cooking heater; and television. The network may be configured by a single home electrical appliance or more than one home electrical appliance existing in the same network.

As illustrated in FIG. 1, the personal computer 1 is disposed in the room of a home. The personal computer 1 has a keyboard 1a and a liquid crystal display 1b. The personal computer 1 is connected to the communication line 4 configured by an internet by way of the access point 2 and the router 3. The server 5 is connected to the communication line 4. The personal computer and the server 5 send/receive information through the communication line 4. The personal computer 1 is one example of a communication terminal and the liquid crystal display 1b is one example of a display portion. The server 5 stores multiple entries of data for providing advice pertaining to the home electrical appliance. The server 5 is one example of a storing unit.

The high-end mobile phone 6 is connected to the communication line 4 as illustrated in FIG. 1. The high-end mobile phone 6 and the server 5 exchange information through the communication line 4. Examples of the high-end mobile phone 6 include the so-called smart phones, tablet PCs, and note PCs. The high-end mobile phone 6 is provided with a liquid crystal display 6a. The high-end mobile phone 6 has a transparent touch panel attached on the front side of the liquid crystal display 6a. Information is inputted to the high-end mobile phone 6 by user operation of the touch panel. The high-end mobile phone 6 is one example of a communication terminal and one example of liquid crystal display 6a. The communication terminal need not be an external element like the personal computer 1 or the high-end mobile phone 6 which are independent of the home electrical appliance such as the refrigerator 7. For example, the communication terminal may be embedded inseparably in the home electrical appliance.

The refrigerator 7 is disposed inside a room of a home as illustrated in FIG. 1. The refrigerator 7 is provided with a storage chamber including a refrigeration chamber, a vegetable chamber, an ice maker chamber, an upper freezer chamber, and a lower freezer chamber. The refrigeration chamber is opened/closed by operating an R door 8 and an R door 9 located in the front side. The vegetable chamber is opened/closed by operating a V door 10. The ice maker chamber is opened/closed by operating an I door 11 located in the front side. The upper freezer chamber is opened/closed by operating an F door 12 located in the front side. The lower freezer chamber is opened/closed by operating an F door 12 located in the front side. The refrigerator 7 is one example of a home electrical appliance also hereinafter referred to as a home appliance. The structure of the refrigerator 7 may be modified as required so that different numbers of storage chambers are disposed in different locations, the doors are opened/closed in a different manner, etc.

Figure 2:
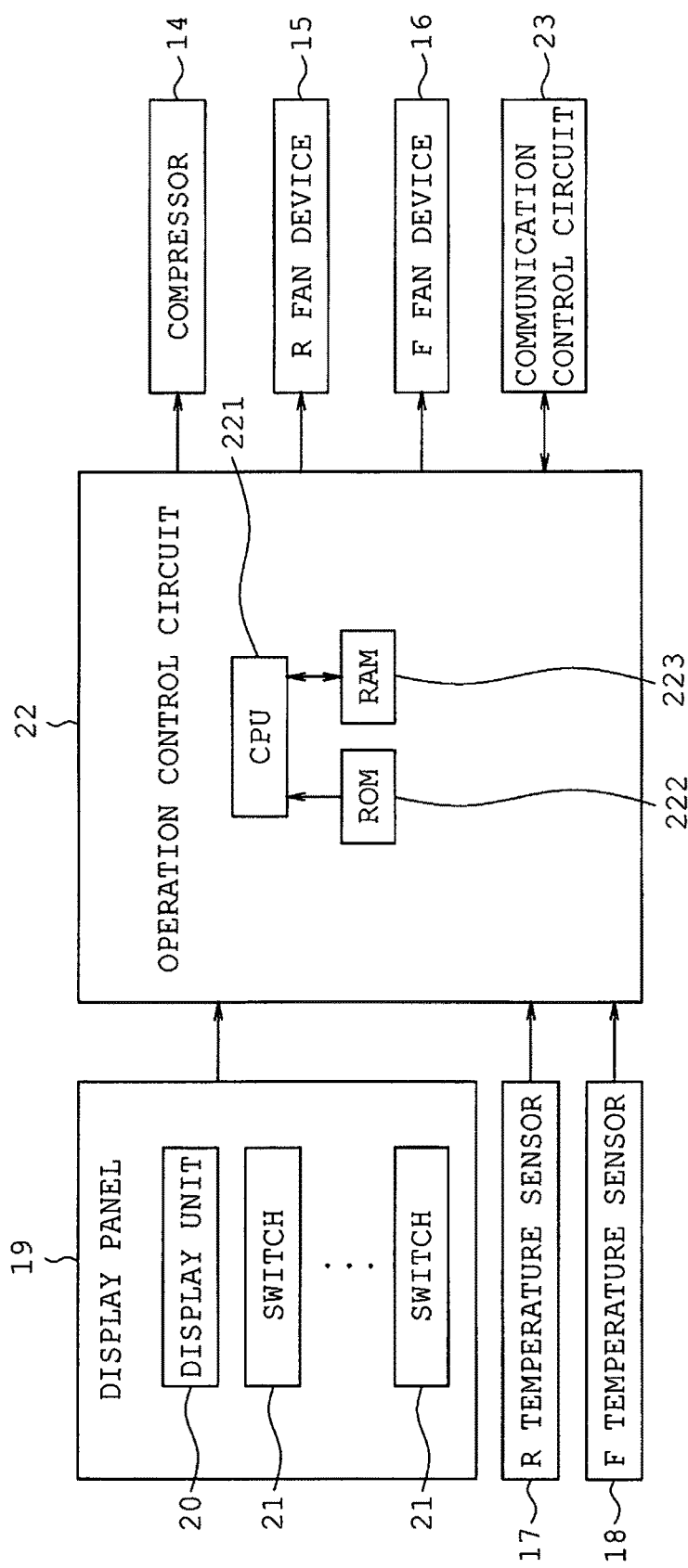

The refrigerator 7 is provided with a refrigeration cycle. The refrigeration cycle is configured to supply cool air into the refrigeration chamber, the ice maker chamber, the upper freezer chamber, and the lower freezer chamber. Cool air is supplied into the vegetable chamber through the refrigeration chamber. The refrigeration cycle includes a compressor 14, an R evaporator, an F evaporator, a condenser, an R fan device 15, and an F fan device 16 as illustrated in FIG. 2. The compressor 14 is driven by a compressor motor. Refrigerant is supplied to the R evaporator, the F evaporator, and the condenser from the compressor 14.

The R evaporator produces cool air for the refrigeration chamber. The R fan device 15 is configured to supply cool air produced by the R evaporator into the refrigeration chamber. As illustrated in FIG. 2, an R temperature sensor 17 is fixed inside the refrigeration chamber. The R temperature sensor 17 is configured to produce temperature signals sized in correlation with the temperature of the refrigeration chamber. The F evaporator is configured to produce cool air for the ice maker chamber, the upper freezer chamber, and the lower freezer chamber. The F fan device 16 is configured to supply the cool air produced by the F evaporator into the ice maker chamber, the upper freezer chamber, and the lower freezer chamber. As illustrated in FIG. 2, the F temperature sensor 18 is fixed inside the lower freezer chamber. The F temperature sensor 18 is configured to output temperature signals sized in correlation with the temperature of the lower freezer chamber.

As illustrated in FIG. 1, a control panel 19 is fixed to the R door 8 of the refrigerator 7. As illustrated in FIG. 2, the control panel 19 is provided with a display 20 and multiple switches 21. The switches 21 are operable by the use. The display 20 is visually recognizable by the user.

As illustrated in FIG. 2, the refrigerator 7 is provided with an operation control circuit 22. The operation control circuit 22 is provided with a CPU 221, a ROM 222, and a RAM 223. The ROM 222 of the operation control circuit 22 stores an operation control program. The operation control circuit 22 is provided with a real time clock and is provided with a time keeping function that keeps track of time based on the measurement of the real time clock. The operation control circuit 22 is one example of a control portion.

The operation control circuit 22 is configured to specify the refrigeration intensity, the freeze intensity, and the power save mode through the operation of the switches 21. The operation control circuit 22 displays the specified settings of the refrigeration intensity, the freeze intensity, and the power save mode on the display 20. The refrigeration intensity represents the intensity of cooling in the refrigeration chamber. The freeze intensity represents the intensity of cooling in the lower freezer chamber. The refrigeration intensity and the freeze intensity are specified to either of the scales including "strong", "moderate", and "weak". The power save mode is an operational mode that runs with less electric power compared to the predetermined standard electric power. Either of "power save", "go out", "power-save go out", and "power-save peak shift" are specified in the power save mode.

The operation control circuit 22 is configured to control the rotation of the compressor motor of the compressor 14, the R fan motor of the R fan unit 15, and the F fan motor of the F fan unit 16 based on the temperature signals given by the R temperature sensor 17 and the temperature signals given by the F temperature sensor 18. The rotation of the compressor motor, the R fan motor, and the F fan motor are controlled based on an operation control program of the operation control circuit 22. When the power save mode is specified, the operation control circuit 22 controls the temperature of the refrigeration chamber and the temperature of the lower freezer chamber to the specified settings under the power save mode by the controlled rotation of the compressor motor, the R fan motor, and the F fan motor. When the power save mode is not specified, the operation control circuit 22 controls the temperature of the refrigeration chamber to the specified refrigeration intensity and the temperature of the lower freezer chamber to the specified freeze intensity by the controlled rotation of the compressor motor, the R fan motor, and the F fan motor.

As illustrated in FIG. 2, the refrigerator 7 is provided with a communication control circuit 23. The communication control circuit 23 is provided with a CPU 221, a ROM 222, and a RAM 223. The ROM 222 of the control circuit 23 stores a communication control program. The communication control circuit 23 is connected to the operation control circuit 22. Information is exchanged between the operation control circuit 22 and the communication control circuit 23. The communication control circuit 23 is connected to the communication line 4 by way of the access point 2 and the router 3. Information is exchanged between the communication control circuit 23 and the server 5 by way of the communication line 4. The communication control circuit 23 is installed in the refrigerator 7 and is one example of an information setting portion and a transmitting portion.

The communication control circuit 23 may be built into the refrigerator 7 or may be purchased independent of the refrigerator 7 and afterwards attached to the refrigerator 7. The electric power of the communication control circuit 23 may be supplied through the refrigerator 7 or supplied independent of the refrigerator 7. The communication control circuit 23 may have a battery installed. In such case, the communication control circuit 23 is capable of communicating with the server 5 even when power supply to the refrigerator 7 is cutoff. The communication control circuit 23 and the access point 2 may be wire connected or wirelessly connected. The connection between the communication control circuit 23 and the access point 2 is not limited to a LAN communication but may be a power line carrier communication that uses power line as a communication line.

The communication control line 23 is configured to specify power supply information, time information, weak operation information, power save information, and strong operation information. The power supply information indicates the presence and absence of power supply to the refrigerator 7. When power is not supplied to the refrigerator 7, "no power supply" is specified to the power supply information. The time information indicates whether or not a predetermined standby time has elapsed based on the start of power supply to the refrigerator 7. When the predetermined standby time has not elapsed, "time not elapsed" is specified to the time information. The weak operation information indicates whether or not the refrigeration intensity and the freeze intensity of the refrigerator 7 are specified to "weak". The weak operation information is specified to "weak" when the refrigeration intensity and the freeze intensity are specified to "weak". The power save information indicates whether or not the power save mode is specified. The power save information is specified to "power save" when either of "power save", "go out", "power-save go out", and "power-save peak shift" is specified. The strong operation information indicates whether or not the refrigeration intensity of the refrigerator 7 is specified to "strong". The strong operation information is specified to "strong" when the refrigeration intensity is specified to "strong". The "power supply information" to the "strong operation information" are specified by communication exchanged at constant time interval between the communication control circuit 23 and the operation control circuit 22 according to the communication control program of the ROM 222 and are updated at constant time interval.

Figure 3:
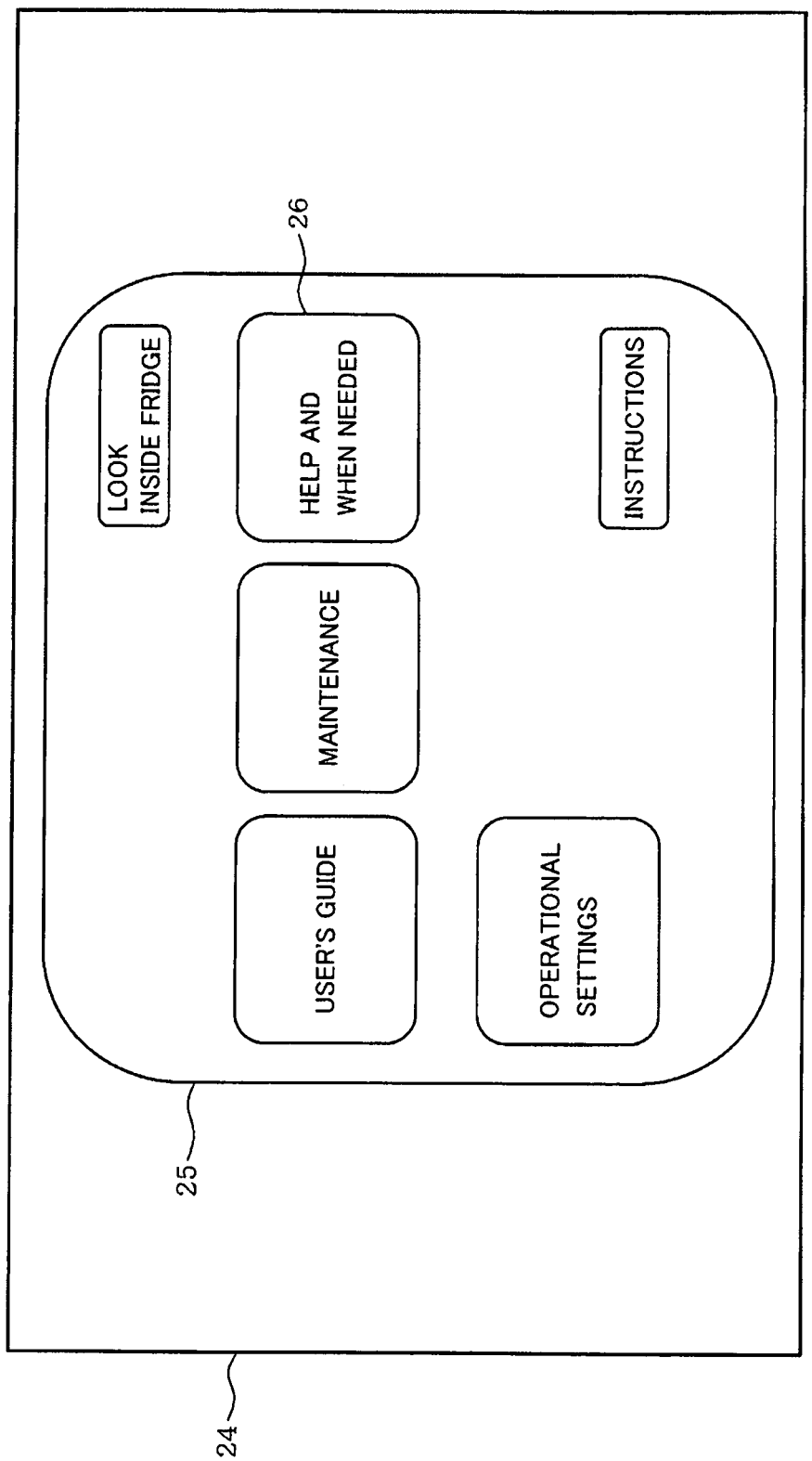

Top screen illustrated in FIG. 3 is invoked in a display region 24 of the liquid crystal display 1b of the personal computer 1 when the keyboard 1a of the personal computer 1 is operated. The personal computer 1 invokes the top screen according to the display program provided from the server 5 through the communication line 4. The top screen is provided with multiple keys including a frame design 25 and key 26. The key 26 is operated electrically when required or when the user needs help in using the refrigerator 7. The key 26 is provided with a message label that reads "Help and When Needed".

Figure 4:
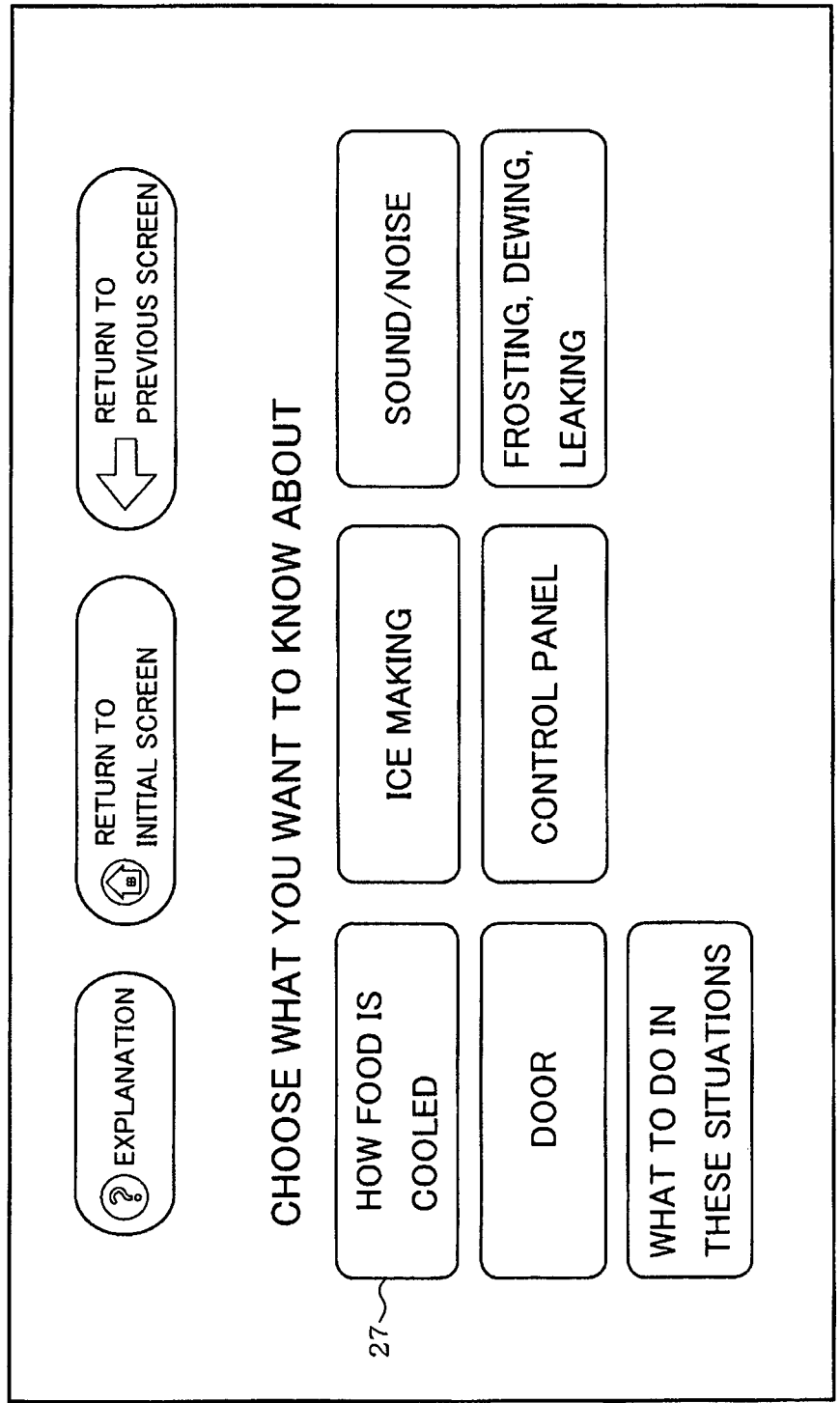

The first select screen illustrated in FIG. 4 is invoked to replace the top screen in the display region 24 of the personal computer 1 when the key 26 is operated on the top screen. The personal computer 1 displays the first select screen according to the display program provided from the server 5. The first select screen is provided with multiple keys including key 27. The key 27 is operated electrically when the user needs help in cooling food or when required in cooling food. Key 27 is provided with a message label that reads "How Food is Cooled".

Figure 5:
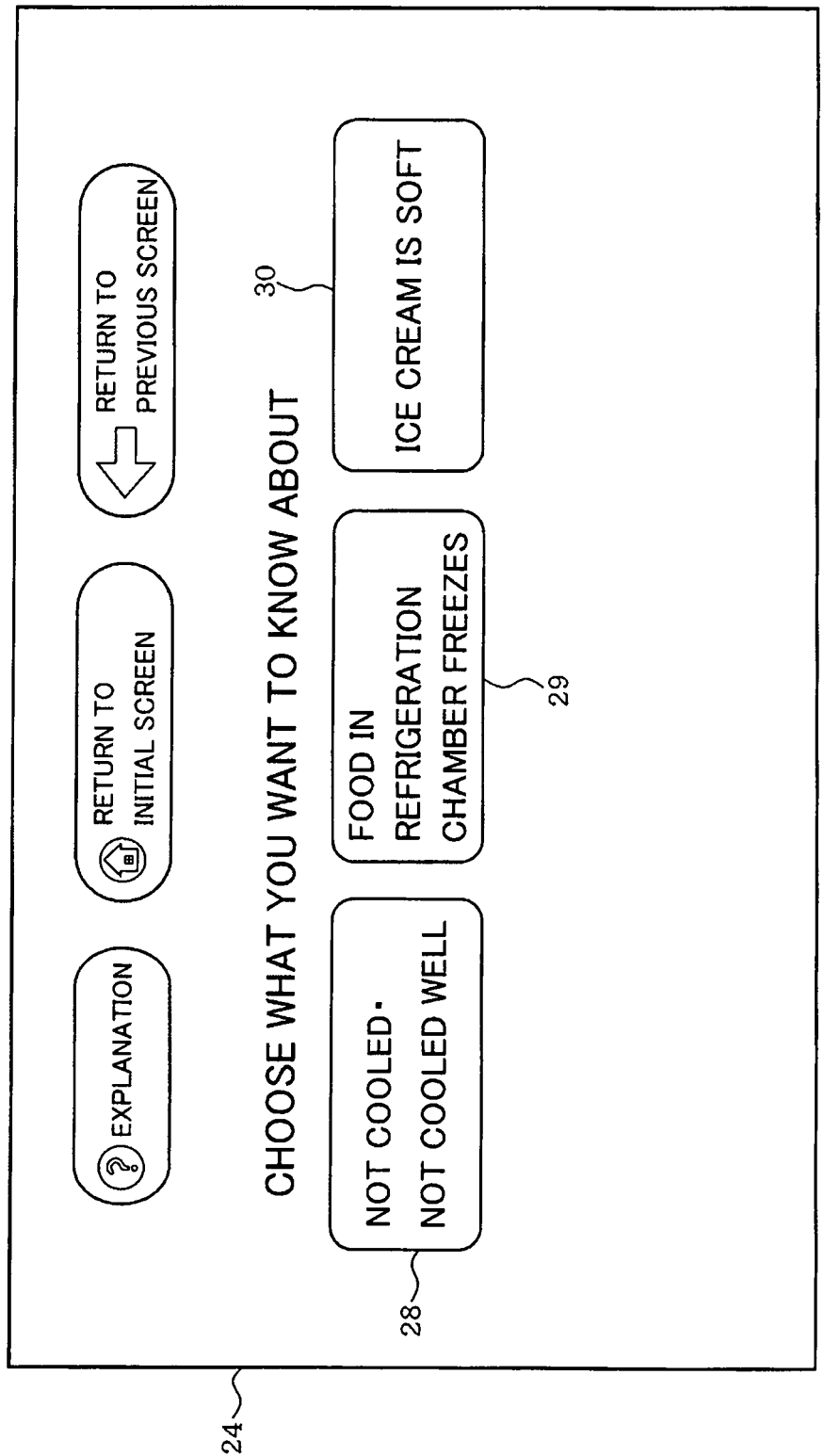

The second select screen illustrated in FIG. 5 is invoked to replace the first select screen in the display region 24 of the personal computer 1 when the key 27 is operated on the first select screen. The personal computer 1 displays the second select screen according to the display program provided from the server 5. The second select screen is provided with multiple keys including key 28, key 29, and key 30. The key 28 is operated electrically by the user when food is not cooled or when food is not cooled well. The key 28 is provided with a message label that reads "Not cooled•Not cooled well". The key 29 is operated electrically by the user when food inside the refrigeration chamber freezes. The key 29 is provided with a message label that reads "Food in refrigeration chamber freezes". The key 30 is operated electrically by the user when ice cream is soft. The key 30 is provided with a message label that reads "Ice cream is soft".

Figure 6:
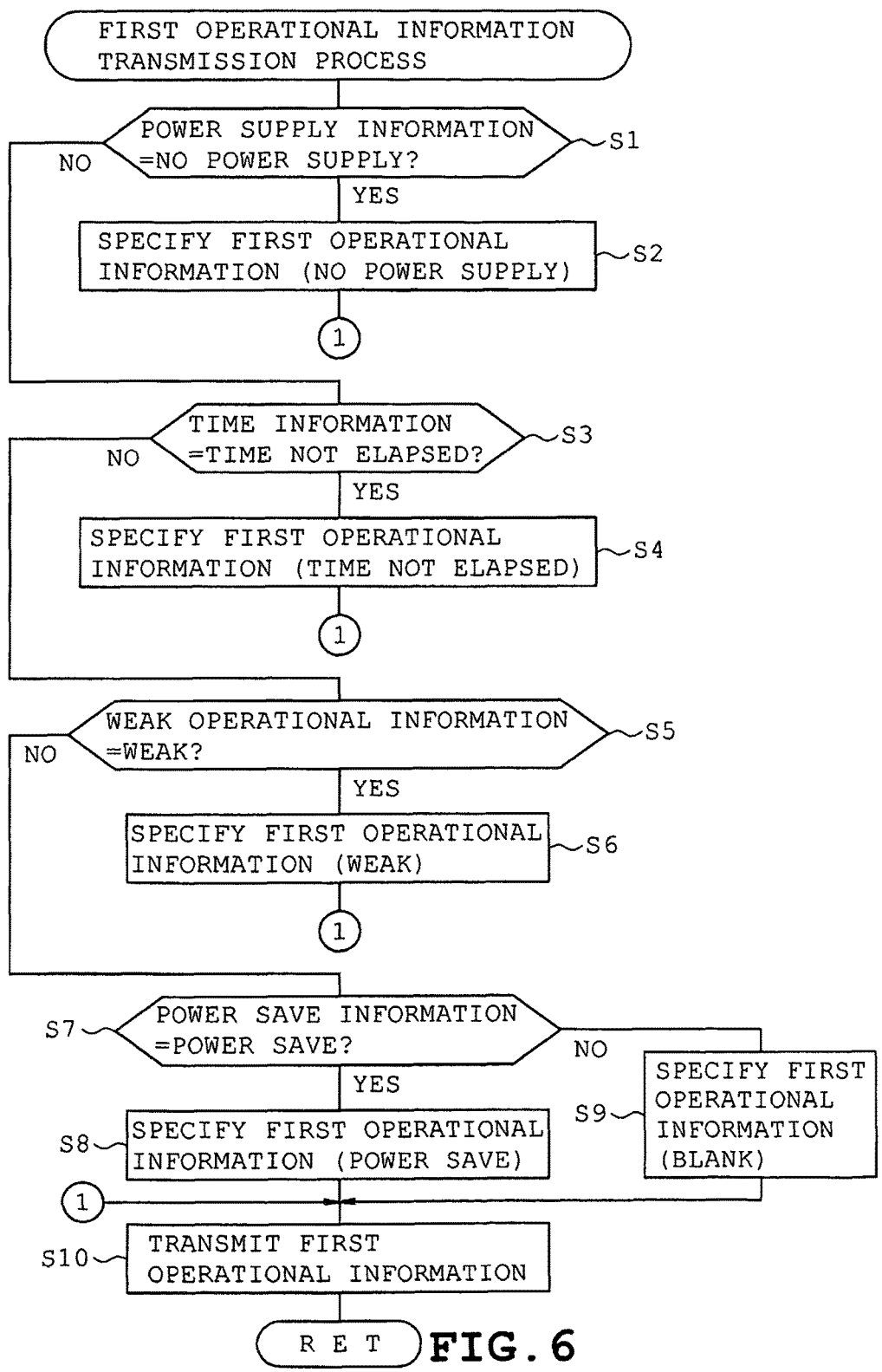

The personal computer 1 requests transmission of a first operational information to the communication control circuit 23 of the refrigerator 7 through the server 5 when the key 28 is operated on the second select screen. The first operational information is one example of information pertaining to the current state of the refrigerator 7. The communication control circuit 23 invokes a first operational information transmission process when transmission of the first operational information has been requested. FIG. 6 indicates the first operational information transmission process. At step S1, the communication control circuit 23 judges whether or not "no power supply" is specified to the power supply information. When judging that "no power supply" has been specified to the power supply information, the communication control circuit 23 specifies "no power supply" to the first operational information at step S2 and the information specified to the first operational information is transmitted to the personal computer 1 through the server 5 at step S10.

When judging that "no power supply" is specified to the power supply information at step S1, the communication circuit 23 judges whether or not "time not elapsed" is specified to the time information at step S3. When judging that "time not elapsed" is specified to the time information, the communication control circuit 23 specifies "time not elapsed" to the first operational information at step S4 and the information specified to the first operational information is transmitted to the personal computer 1 through the server 5 at step S10.

When judging that "time not elapsed" is not specified to the time information at step S3, the communication control circuit 23 judges whether or not "weak" is specified to the weak operation information at step S6. When judging that "weak" is specified to the weak operation information, the communication control circuit 23 specifies "weak" to the first operational information at step S6 and the information specified to the first operational information is transmitted to the personal computer 1 through the server 5 at step S10.

When judging that "weak" is not specified to the weak operation information at step S6, the communication control circuit 23 judges whether or not "power save" is specified to the power save information at step S7. When judging that "power save" is specified to the power save operation information, the communication control circuit 23 specifies "power save" to the first operational information at step S8 and when judging that "power save" is not specified to the power save operation information, the communication control circuit 23 specifies "blank" to the first operational information at step S9. In either case, the information specified to the first operational information is transmitted to the personal computer 1 through the server 5 at step S10.

Figure 7:
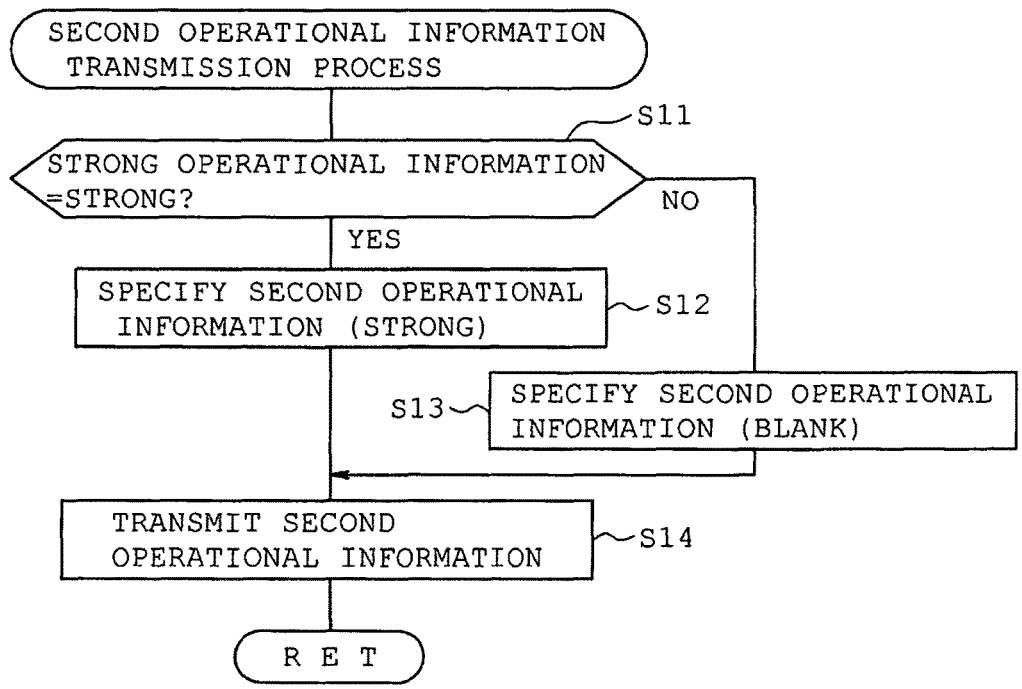
Figure 8:
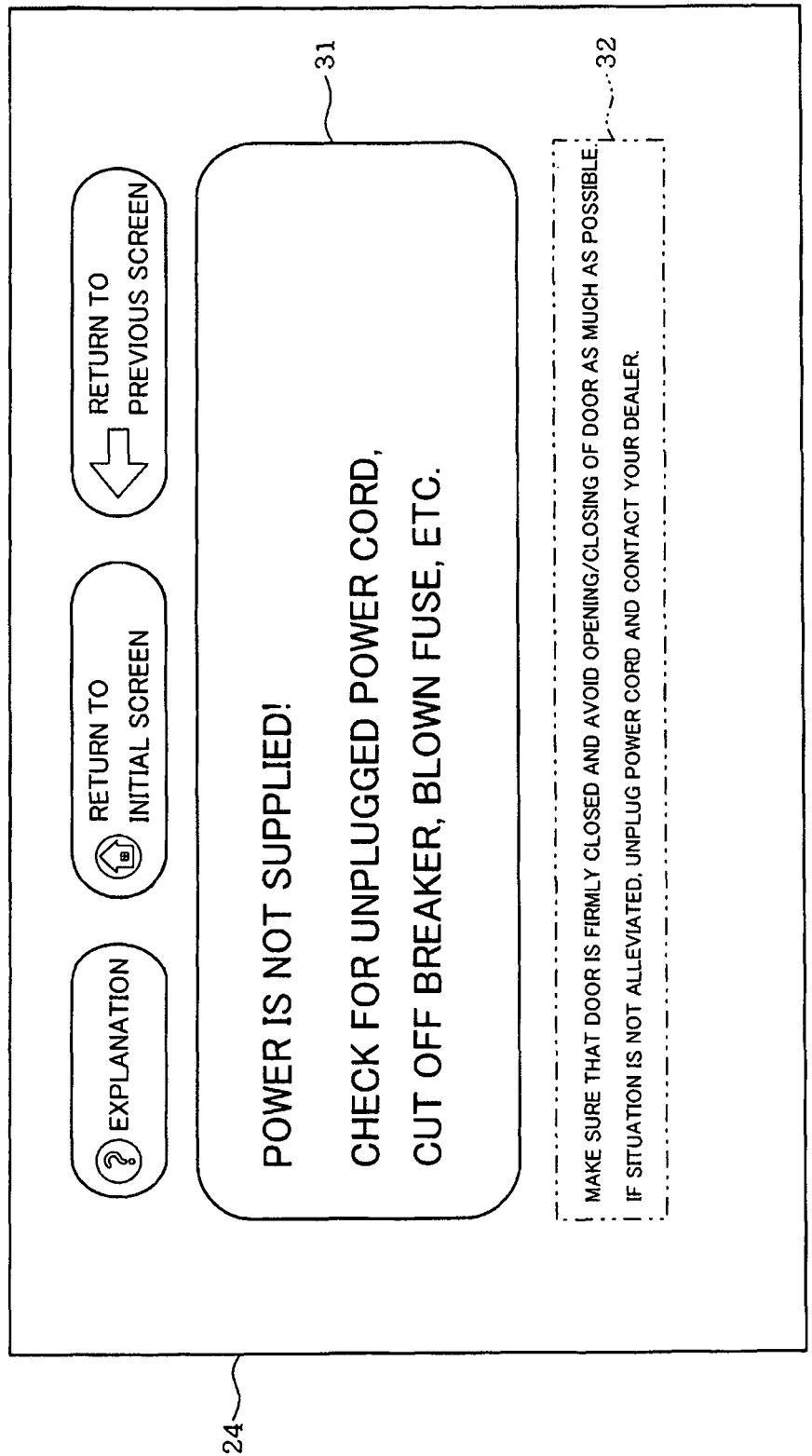
Figure 9:
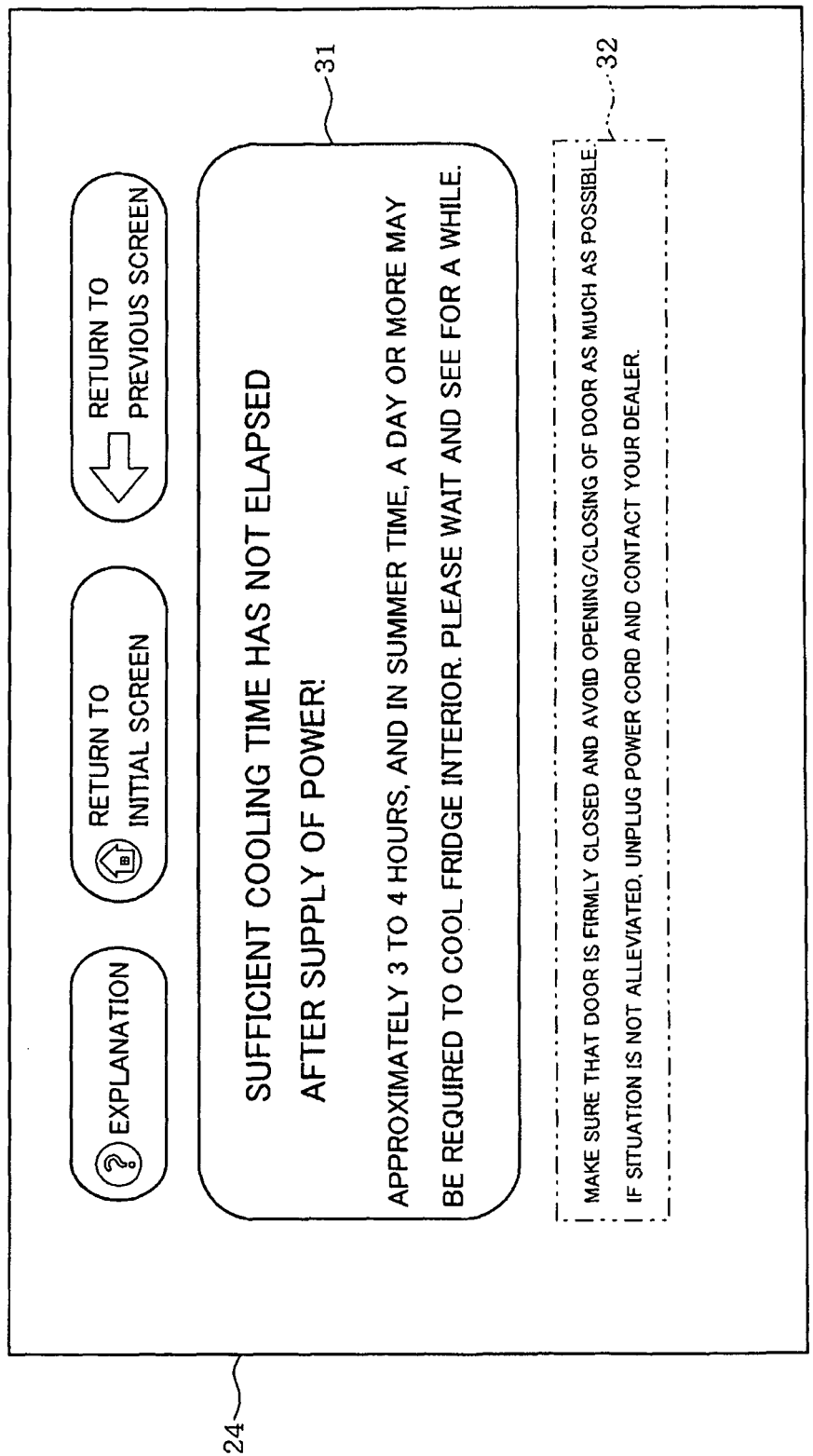

The personal computer 1 requests transmission of a second operational information to the communication control circuit 23 through the server 5 when the key 29 is operated on the second select screen. The communication control circuit 23 invokes a second operational information transmission process when transmission of the second operational information has been requested. FIG. 7 indicates the second operational information transmission process.

The communication control circuit 23 judges whether or not "strong" is specified to the strong operation information at step S11. When judging that "strong" is specified to the strong operation information, the communication control circuit 23 specifies "strong" to the second operational information at step S12 and when judging that "strong" is not specified to the strong operation information, the communication control circuit 23 specifies "blank" to the second operational information at step S13. In either case, the information specified to the second operational information is transmitted to the personal computer 1 through the server 5 at step S14.

Advice screens illustrated in FIGS. 8 to 15 are invoked to replace the second select screen in the display region 24 of the personal computer 1 when the keys 28 to 30 are operated on the second select screen. The personal computer 1 displays the advice screen according to the display program provided from the server 5. The advice screen is provided with a particular advice region 31 and a general advice region 32. The particular advice region 31 is a region surrounded by a laterally elongated rectangular frame design. Either of the first particular advice, the second particular advice, and the third particular advice is displayed in characters in the particular advice region 31. The general advice region 32 is an imaginary region shaped like a laterally elongate rectangle. The general advice region 32 is specified below the particular advice region 31. The area of the general advice region 32 is smaller than the area of the particular advice region 31. Either of a first general advice, a second general advice, and a third general advice is displayed in the general advice region 32 in characters smaller than those used in a first particular advice, a second particular advice, and a third particular advice. The particular advice region 31 is one example of a display region and a window. The general advice region 32 is one example of a display region.

The first particular advice is displayed when the key 28 is operated on the second select screen and is one example of a specific advice. The first particular advice is an advice given to the user to remedy the situation in which food is not cooled or is not cooled well. The type of the first particular advice and whether or not to display the first particular advice is specified depending upon the current state of the refrigerator 7. The second particular advice is displayed when the key 29 is operated on the second select screen. The second particular advice is an advice given to the user to remedy the situation in which food in the refrigeration chamber becomes frozen. Whether or not to display the second particular advice is specified depending upon the current state of the refrigerator 7. The third particular advice is always displayed when the key 30 is operated on the second select screen. The third particular advice is an advice given to the user to remedy the situation in which the ice cream is soft.

The first general advice is always displayed when the key 28 is operated on the second select screen. The first general advice is a general advice given to the user to remedy the situation in which food is not cooled or is not cooled well. The second general advice is always displayed when the key 29 is operated on the second select screen. The second general advice is a general advice given to the user to remedy the situation in which food in the refrigeration chamber becomes frozen. The third general advice is always displayed when the key 30 is operated on the second select screen. The third general advice is a general advice given to the user to remedy the situation in which the ice cream is soft.

The server 5 stores multiple entries of the first particular advice data. The multiple entries of the first advice data are each used for displaying the first particular advice. When receiving the first operational information from the communication control circuit 23, the personal computer 1 acquires one of the multiple entries of the first particular advice data stored in the server 5 depending upon the information received through the first operational information. Then, the personal computer 1 displays the first particular advice in the particular advice region 31 of the advice screen suitable with the acquired first particular advice data. The first particular advice is displayed by the personal computer 1 according to the display program provided by the server 5. The relation between the first operational information and the first particular advice is described in following 1) to 5).

1) When "no power supply" is set to the first operational information, "POWER IS NOT SUPPLIED! CHECK FOR UNPLUGGED POWER CORD, CUT OFF BREAKER, BLOWN FUSE, ETC" is displayed in the particular advice region 31 as the first particular advice (see FIG. 8).
2) When "time not elapsed" is set to the first operational information, "SUFFICIENT COOLING TIME HAS NOT ELAPSED AFTER SUPPLY OF POWER! APPROXIMATELY 3 TO 4 HOURS, AND IN SUMMER TIME, A DAY OR MORE MAY BE REQUIRED TO COOL FRIDGE INTERIOR. PLEASE WAIT AND SEE FOR A WHILE" is displayed in the particular advice region 31 as the first particular advice (see FIG. 9).
3) When "weak" is set to the first operational information, "TEMPERATURE ADJUSTMENT IS SPECIFIED TO "WEAK"! PLEASE SWITCH TEMPERATURE ADJUSTMENT TO "MODERATE" OR "STRONG" AND WAIT AND SEE FOR A WHILE" is displayed in the particular advice region 31 as the first particular advice (see FIG. 10).
4) When "power save" is set to the first operational information, "POWER SAVE" (OR EITHER "GO OUT", "POWER SAVE•GO OUT", AND "POWER SAVE•PEAK SHIFT") IS SET. TEMPERATURE OF FRIDGE INTERIOR IS ELEVATED BY 1 TO 2 DEGREES CELSIUS IN THIS SETTING. PLEASE CANCEL WHEN NOT COOLED WELL" is displayed in the particular advice region 31 as the first particular advice (see FIG. 11).
5) When "blank" is set to the first operational information, the first particular advice is not displayed in the particular advice region 31 and the particular advice region 31 is left blank (see FIG. 12).

Figure 10:
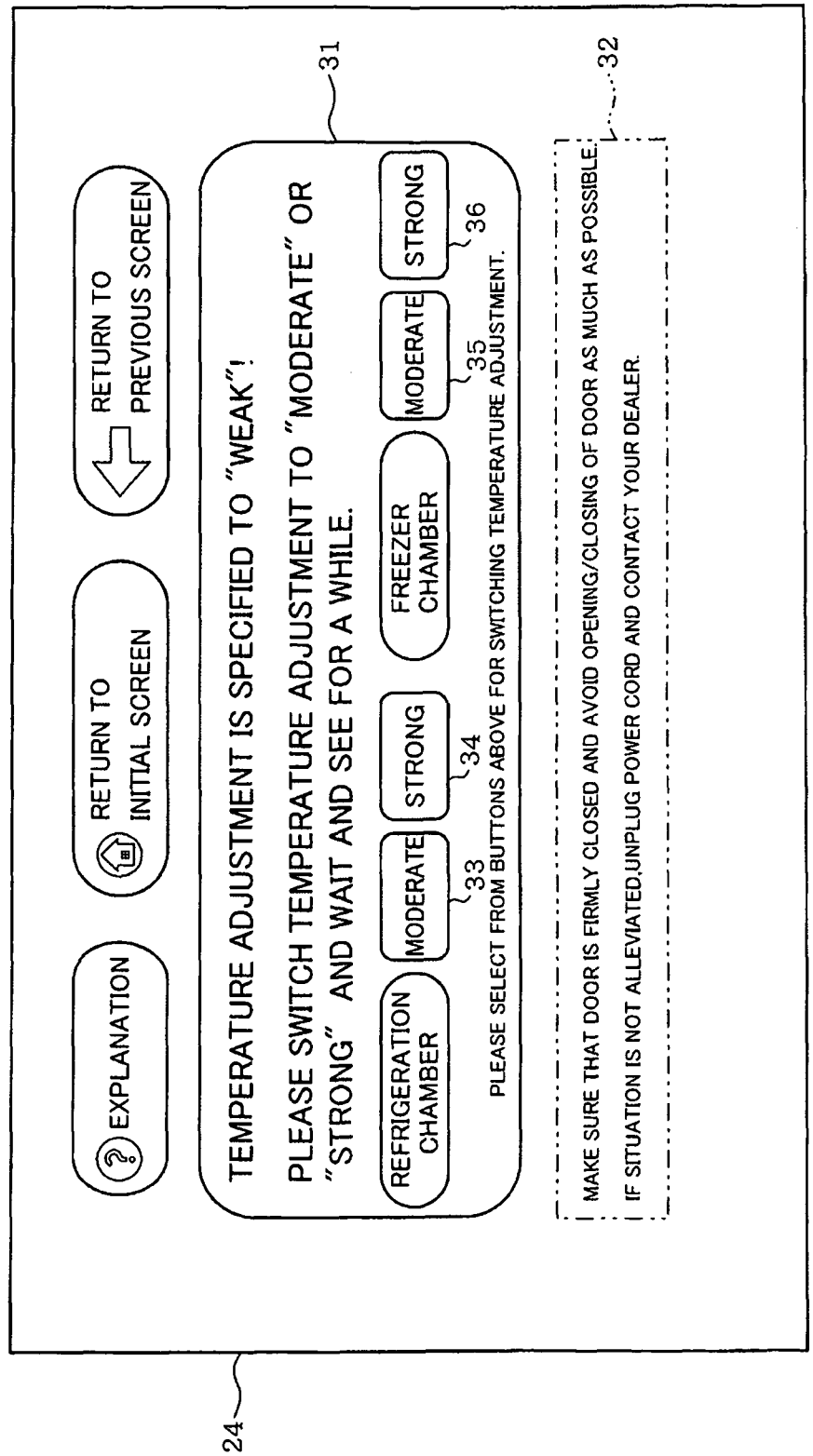

When "weak" is set to the first operational information as illustrated in FIG. 10, temperature change keys 33, 34, 35, and 36 are displayed in the particular advice region 31. The temperature change keys 33 to 36 are displayed according to the display program provided by the server 5. When the temperature change keys 33 to 36 are operated, the personal computer 1 sets a temperature change instruction based on the operation of the temperature change keys 33 to 36. The relation between the operation of the temperature change keys 33 to 36 and the temperature change instruction is described in the following 11) to 14). When the personal computer 1 has set the temperature change instruction, the content of the temperature change instruction is transmitted to the communication control circuit 23 through the server 5. Each of the temperature change keys 33 to 36 serve as a setting key.

11) When the temperature change key 33 is operated, "refrigeration intensity (moderate)" is set as the temperature change instruction.
12) When the temperature change key 34 is operated, "refrigeration intensity (strong)" is set as the temperature change instruction.
13) When the temperature change key 35 is operated, "refrigeration intensity (moderate)" is set as the temperature change instruction.
14) When the temperature change key 36 is operated, "refrigeration intensity (strong)" is set as the temperature change instruction.

When receiving the temperature change instruction from the personal computer 1, the communication control circuit 23 instructs the operation control circuit 22 to change the refrigeration intensity or the freeze intensity from the current intensity level of "weak" to the intensity level set in the temperature change instruction. When food is not cooled or is not cooled well because the refrigeration intensity and the freeze intensity are each set to "weak", the user is allowed to increase the refrigeration intensity or the freeze intensity of the refrigerator 7 by operating either of the temperature change keys 33 to 36 on the advice screen. It is thus, possible to alleviate the problem of food not being cooled or not being cooled well by increasing the refrigeration intensity or the freeze intensity of the refrigerator 7.

Figure 11:
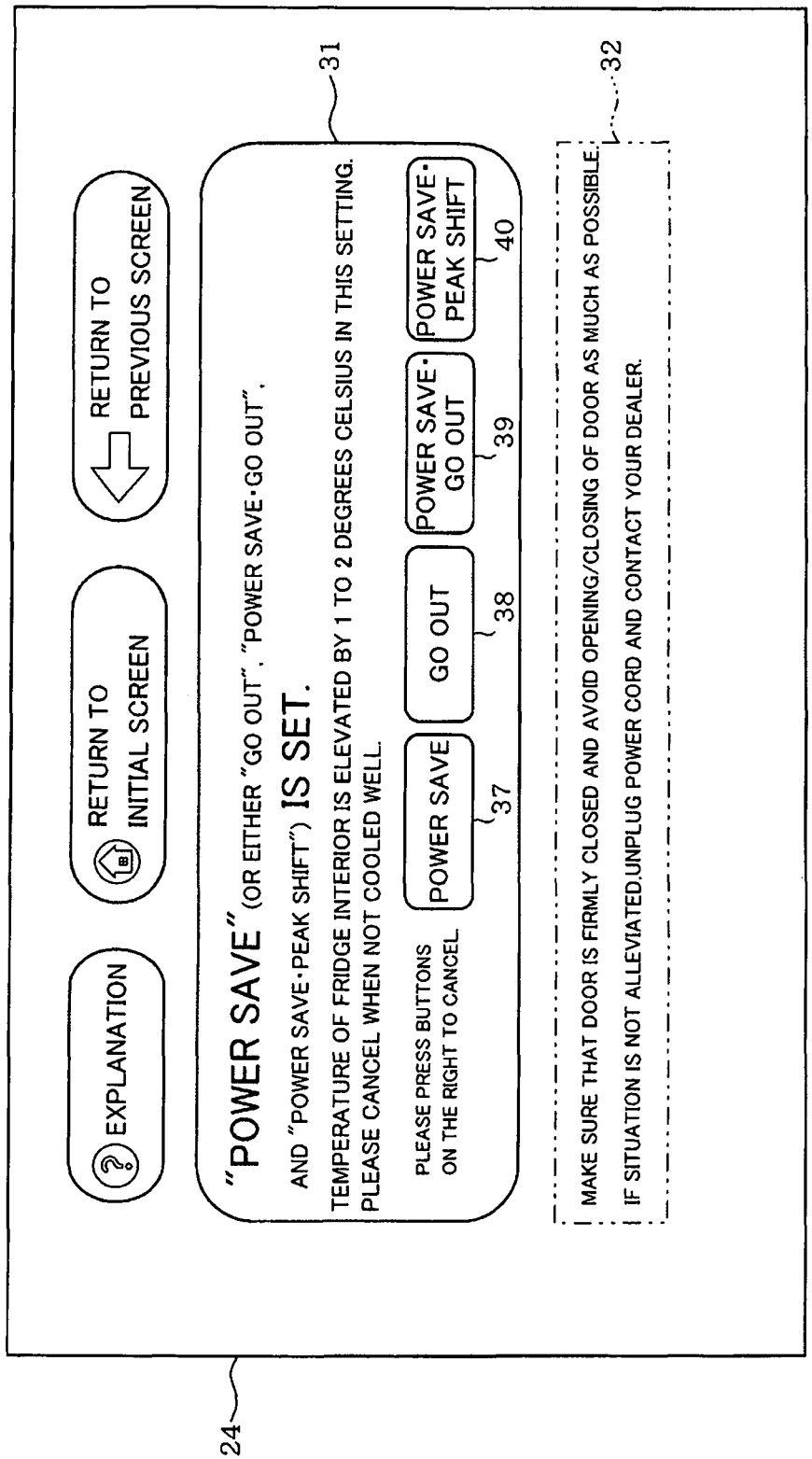
Figure 12:
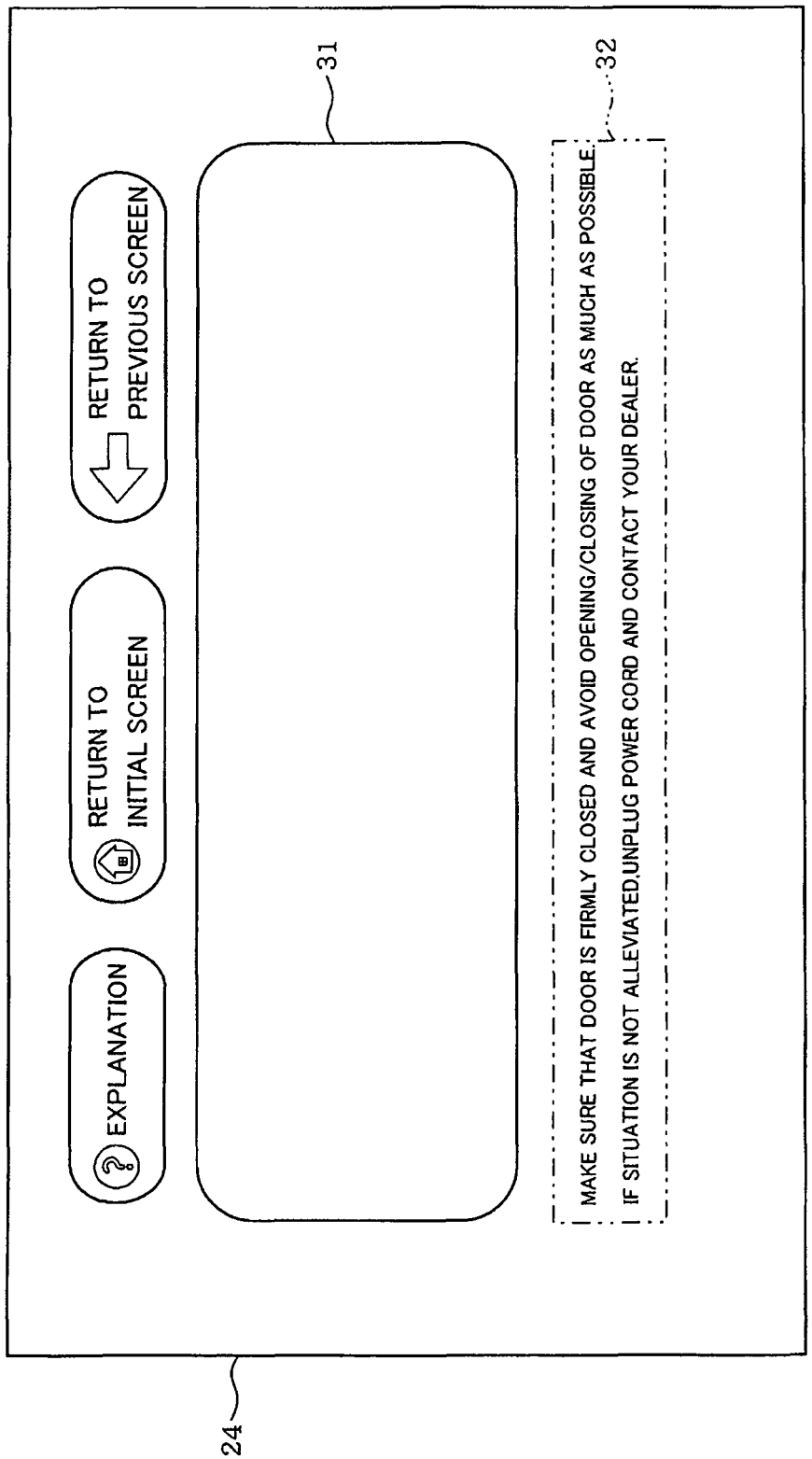

When "power save" is set to the first operational information, the personal computer 1 displays power save cancel keys 37, 38, 39, and 40 in the particular advice region 31 as illustrated in FIG. 11. The power save cancel keys 37 to 40 are displayed according to the display program provided from the server 5. The power save cancel key 37 is displayed in an illuminated state when a "power save" power save mode is set. The power save cancel key 38 is displayed in an illuminated state when a "go out" power save mode is set. The power save cancel key 39 is displayed in an illuminated state when a "power save•go out" power save mode is set. The power save cancel key 40 is displayed in an illuminated state when a "power save peak shift" power save mode is set. These power save cancel keys 37 to 40 are each one example of a setting key.

When either of the power save cancel keys 37 to 40 in the illuminated state is operated, the personal computer 1 sets power save cancel instruction based on the operation of the power save cancel keys 37 to 40. The relation between the power save cancel keys 37 to 40 and the power save instruction is described in the following 21) to 24). When the personal computer 1 has set the power save cancel instruction, the content of the power save cancel instruction is transmitted to the communication control circuit 23 of the refrigerator 7 through the server 5.

21) When the power save cancel key 37 is operated in the illuminated state, power save cancel instruction "power save" is set.
22) When the power save cancel key 38 is operated in the illuminated state, power save cancel instruction "go out" is set.
23) When the power save cancel key 39 is operated in the illuminated state, power save cancel instruction "power save•go out" is set.
24) When the power save cancel key 40 is operated in the illuminated state, power save cancel instruction "power save peak shift" is set.

When receiving the power save mode cancel instruction from the personal computer, the communication control circuit 23 instructs the operation control circuit 22 to cancel the power save mode specified by the power save cancel instruction. The operation control circuit 22 is configured to cancel the power save mode specified by the power save cancel instruction when canceling of the power save mode has been instructed. When food is not cooled or is not cooled well because the power save mode is set to either of "power save", "go out", "power save-go out", and "power save peak shift", the user is allowed to cancel the power save mode of the refrigerator 7 by operating either of the power save cancel keys 37 to 40 on the advice screen. It is thus, possible to alleviate the problem of food not being cooled or not being cooled well by canceling the power save mode of the refrigerator 7.

The server 5 stores the first general advice data. The first general advice data is configured to display the first general advice. When the key 28 is operated on the second select screen, the personal computer 1 acquires the first general advice data from the server 5. As illustrated in FIGS. 8 to 12, the personal computer 1 displays the first general advice that reads "MAKE SURE THAT DOOR IS FIRMLY CLOSED AND AVOID OPENING/CLOSING OF DOOR AS MUCH AS POSSIBLE. IF SITUATION IS NOT ALLEVIATED, UNPLUG POWER CORD AND CONTACT YOUR DEALER" in the general advice region 32 of the advice screen according to the first general advice data. That is, when the key 28 is operated on the second select screen, a common first general advice is displayed in the general advice region 32 regardless of whichever of "no power supply", "time not elapsed", "weak", "power save", and "blank" has been set as the first operational information.

Figure 13:
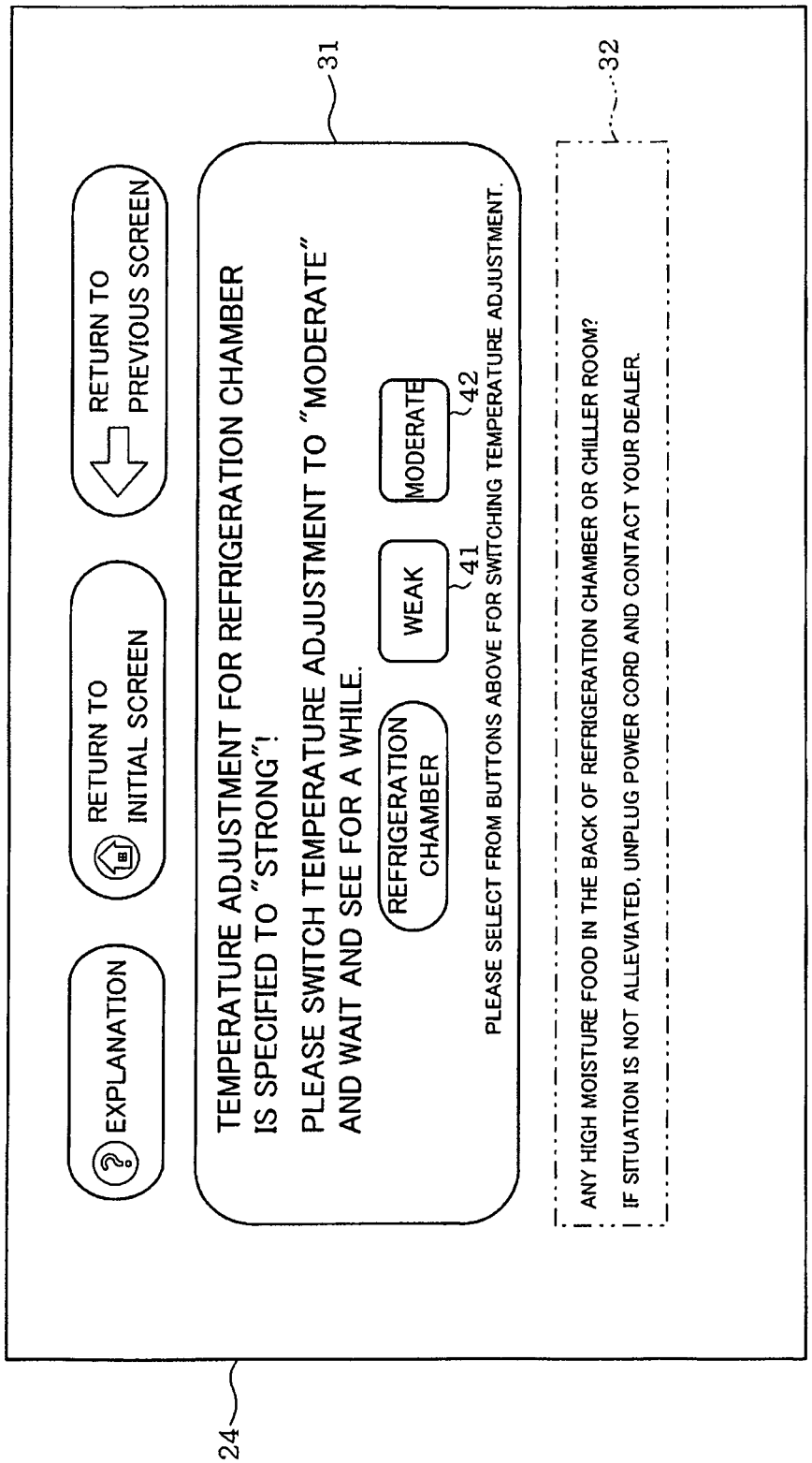
Figure 14:
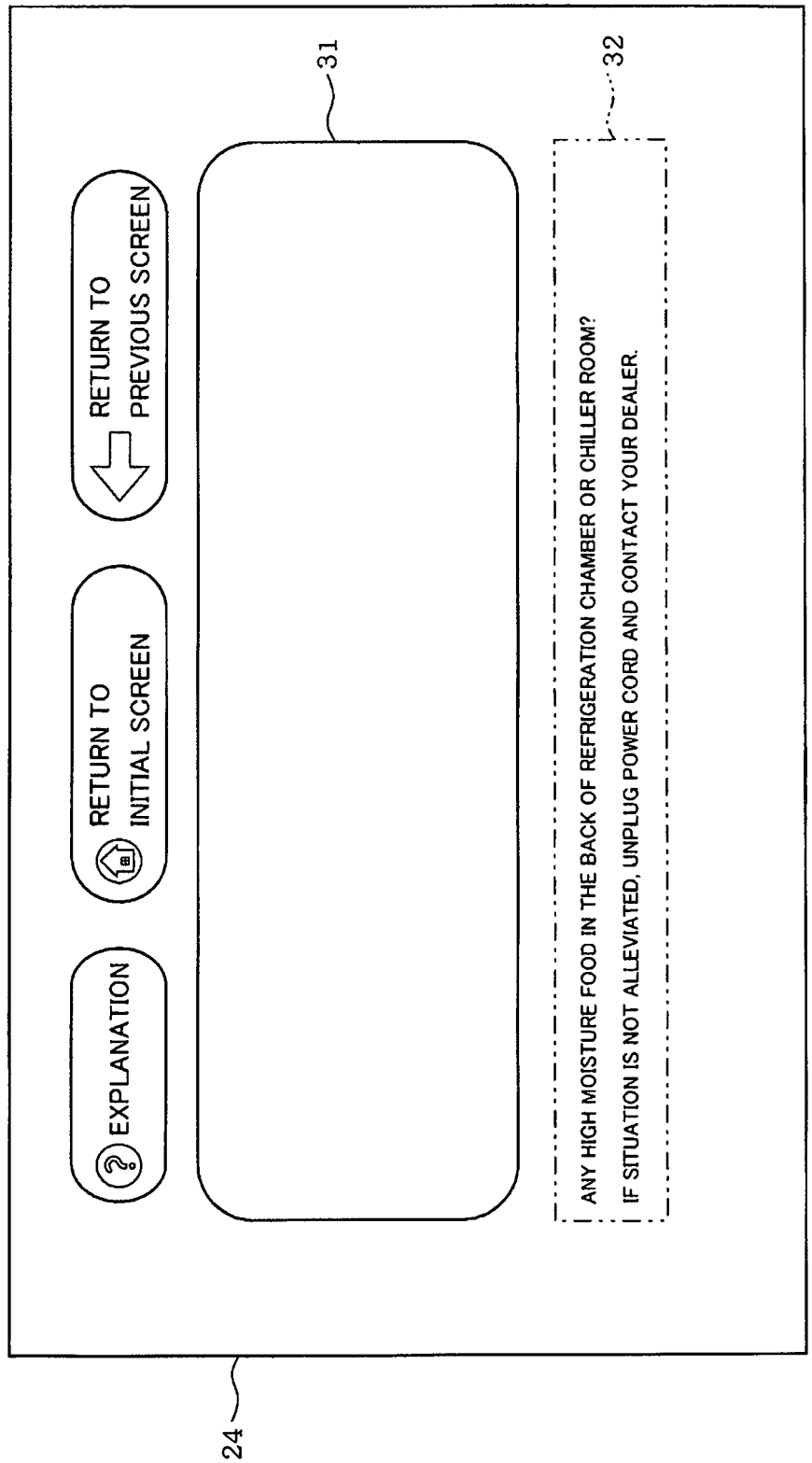

The server 5 stores the second particular advice data. The second particular advice data is configured to display the second particular advice. When receiving the second operational information from the communication control circuit 23 in which the intensity level is set to "strong", the personal computer 1 acquires the second particular advice data from the server 5. Then, the personal computer 1 displays the second particular advice that reads "TEMPERATURE ADJUSTMENT IS SPECIFIED TO "STRONG"! PLEASE SWITCH TEMPERATURE ADJUSTMENT TO "MODERATE" AND WAIT AND SEE FOR A WHILE" in the particular advice region 31 of the advice screen as illustrated in FIG. 13, according to the acquired second particular advice data. When receiving the second operational information from the communication control circuit 23 in which "blank" is specified, the personal computer 1 does not display any advice in the particular advice region 31 and the particular advice region 31 is left blank as illustrated in FIG. 14.

When receiving the second operational information in which the intensity level is set to "strong", the personal computer 1 displays temperature change keys 41 and 42 in the particular advice region 31 as illustrated in FIG. 13. The temperature change keys 41 and 42 are displayed according to the display program provided by the server 5. When the temperature change key 41 or 42 is operated, the personal computer 1 sets a temperature change instruction. The relation between the operation of the temperature change keys 41 and 42 and the temperature change instruction is described in the following 31) and 32). When the personal computer 1 has set the temperature change instruction, the content of the temperature change instruction is transmitted to the communication control circuit 23 of the refrigerator 7 through the server 5.

31) When the temperature change key 41 is operated, "refrigeration intensity (weak)" is set as the temperature change instruction.

32) When the temperature change key 42 is operated, "refrigeration intensity (moderate)" is set as the temperature change instruction.

When receiving the temperature change instruction from the personal computer 1, the communication control circuit 23 instructs the operation control circuit 22 to change the refrigeration intensity from the current intensity level of "strong" to the intensity level set in the temperature change instruction. The operation control circuit 22 is configured to change the refrigeration intensity from the current intensity level of "strong" when the change in the refrigeration intensity is instructed. When food inside the refrigeration chamber becomes frozen because the refrigeration intensity is set to "strong", the user is allowed to change the refrigeration intensity of the refrigerator 7 to a weaker intensity level by operating either of the temperature change keys 41 or 42 on the advice screen. It is thus, possible to alleviate the problem of food inside the refrigeration chamber becoming frozen by reducing the refrigeration intensity of the refrigerator 7.

The server 5 stores the second general advice data. The second general advice data is configured to display the second general advice. When the key 29 is operated on the second select screen, the personal computer 1 acquires the second general advice data from the server 5. As illustrated in FIGS. 13 and 14, the personal computer 1 displays the second general advice that reads "ANY HIGH MOISTURE FOOD IN THE BACK OF REFRIGERATION CHAMBER OR CHILLER ROOM? PLEASE RELOCATE HIGH MOISTURE FOOD SOMEWHERE ELSE. IF SITUATION IS NOT ALLEVIATED, UNPLUG POWER CORD AND CONTACT YOUR DEALER." in the general advice region 32 of the advice screen according to the second general advice data. That is, when the key 29 is operated on the second select screen, the second general advice different from the first general advice is displayed regardless of whichever of "strong" or "blank" has been set as the second operational information.

Figure 15:
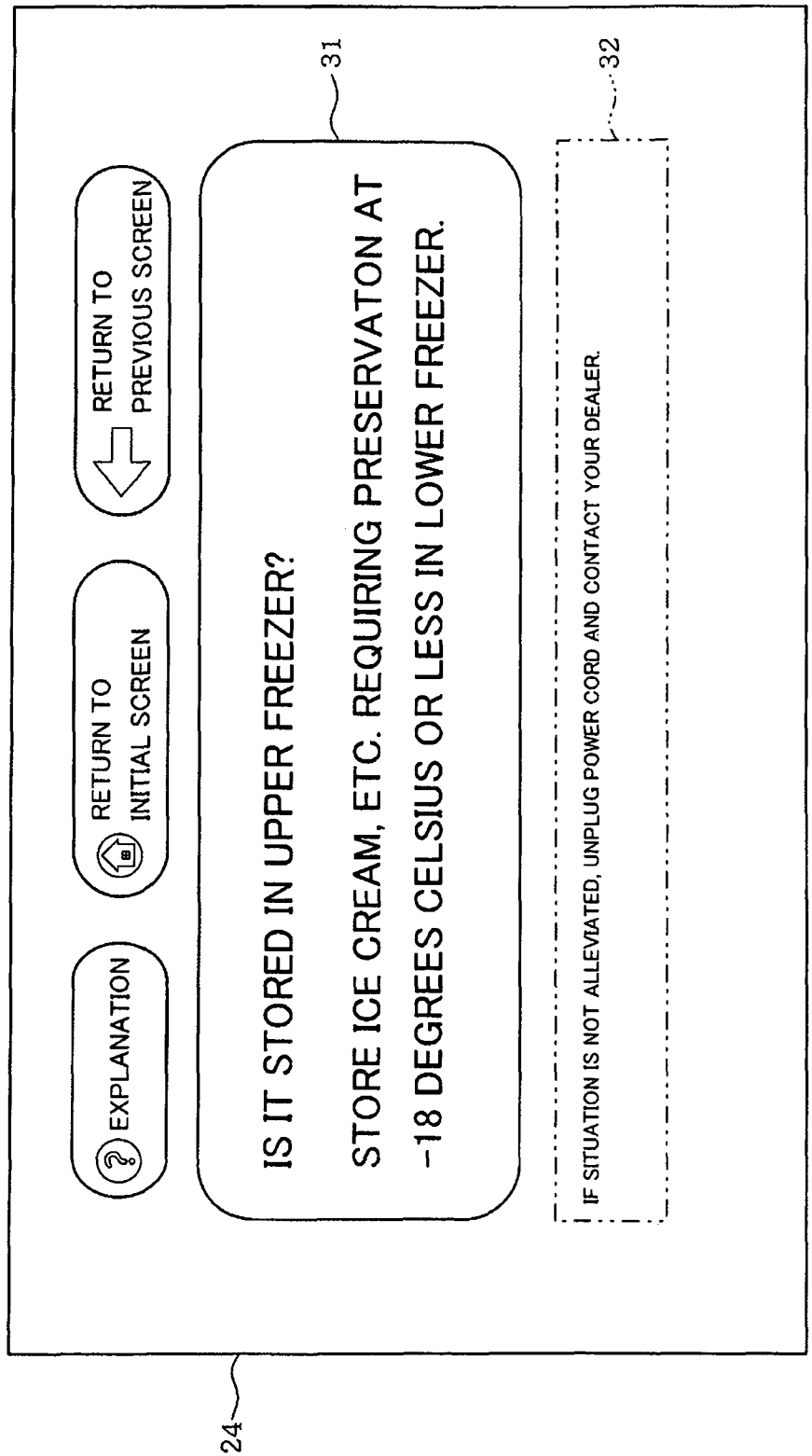

The server 5 stores the third particular advice data. The third particular advice data is configured to display the third particular advice. When the key 30 is operated on the second select screen, the personal computer 1 acquires the third particular advice data from the server 5. As illustrated in FIG. 15, the personal computer 1 displays the third particular advice that reads "IS IT STORED IN UPPER FREEZER? STORE ICE CREAM, ETC. REQUIRING PRESERVATION AT −18 DEGREES CELSIUS OR LESS IN LOWER FREEZER." in the particular advice region 31 of the advice screen according to the third particular advice data.

The server 5 stores the third general advice data. The third general advice data is configured to display the third general advice. When the key 30 is operated on the second select screen, the personal computer 1 acquires the third general advice data from the server 5. As illustrated in FIG. 15, the personal computer 1 displays the third general advice that reads "IF SITUATION IS NOT ALLEVIATED, UNPLUG POWER CORD AND CONTACT YOUR DEALER" in the general advice region 32 of the advice screen according to the third general advice data.

The high-end mobile phone 6 possesses the same functionality as the personal computer 1. The top screen illustrated in FIG. 3 is displayed on the liquid crystal display 6a of the high-end mobile phone 6 when the touch panel of the high-end mobile phone 6 is operated. The first select screen is displayed on the liquid crystal display 6a when the key 26 is operated on the liquid crystal display 6a of the high-end mobile phone 6. The second select screen is displayed on the liquid crystal display 6*a* when the key 27 is operated on the liquid crystal display 6*a* of the high-end mobile phone 6. When the keys 28 to 30 of the second select screen is operated, the high-end mobile phone 6 exchanges information with the communication control circuit 23 of the refrigerator 7 through the server 5 as was the case in the personal computer 1. The advice screens illustrated in FIGS. 8 to 15 are displayed on the liquid crystal display 6*a* of the high-end mobile phone 6.

The first embodiment provides the following effects.

The refrigerator 7 sets the first operational information and externally transmits the first operational information carrying the specified settings through the communication line 4 depending upon the current state of the operation control circuit 22. The personal computer 1 and the high-end mobile phone 6 display a specific first particular advice selected from the multiple entries of the first particular advice data stored in the server 5 that corresponds with the transmitted result of the first operational information. It is thus, possible to obtain the first particular advice suitably corresponding with the current state of the refrigerator 7 when food is not cooled and when food is not cooled well by simply operating the personal computer 1 or the high-end mobile phone 6. This improves user friendliness.

The first general advice which does not correspond to the content of the first operational information transmitted from the refrigerator is displayed on the advice screen on which the specific first particular advice is also displayed. As a result, it is possible for the user to learn general countermeasures to be taken when food is not cooled and when food is not cooled well. It is thus, possible to improve the usability even more effectively.

The personal computer 1 and the high-end mobile phone 6 display the first particular advice above the first general advice on the advice screen displayed to the liquid crystal display 1*b* and 6*a*. This makes the first particular advice more noticeable to the user as compared to the first general advice and thus, it will become difficult for the user to miss the first particular advice.

The personal computer 1 and the high-end mobile phone 6 display the first particular advice inside the particular advice region 31 which is greater in area compared to the general advice region 32 for displaying the first general advice on the advice screen displayed to the liquid crystal displays 1*b* and 6*a*. This makes the first particular advice more noticeable to the user as compared to the first general advice and thus, it will become difficult for the user to miss the first particular advice.

The personal computer 1 and the high-end mobile phone 6 display a single and fixed first general advice on the advice screen displayed to the liquid crystal displays 1*b* and 6*a*. The first general advice being "fixed" means that the content of the first general advice does not vary depending upon the particular advice being displayed on the same screen as the first general advice. This makes the first particular advice being variable to be more noticeable to the user as compared to the first general advice from the user's standpoint. Thus, it will become difficult for the user to miss the first particular advice in this respect as well.

The personal computer 1 and the high-end mobile phone 6 display the temperature change key 33 to 36 for specifying the operation of the refrigerator 7 on the advice screen displayed to the liquid crystal displays 1*b* and 6*a* along with the first particular advice. As a result, it is possible for the user to learn the countermeasures to be taken when food is not cooled or is not cooled well from the first particular advice displayed on the advice screen and cope with the situation by simply operating the temperature change keys 33 to 36 without having to switch the advice screen to other screens. It is thus, possible to improve the usability even more effectively. Similar effect is achieved for the power save keys 37 to 40 as well.

Second Embodiment

Figure 16:
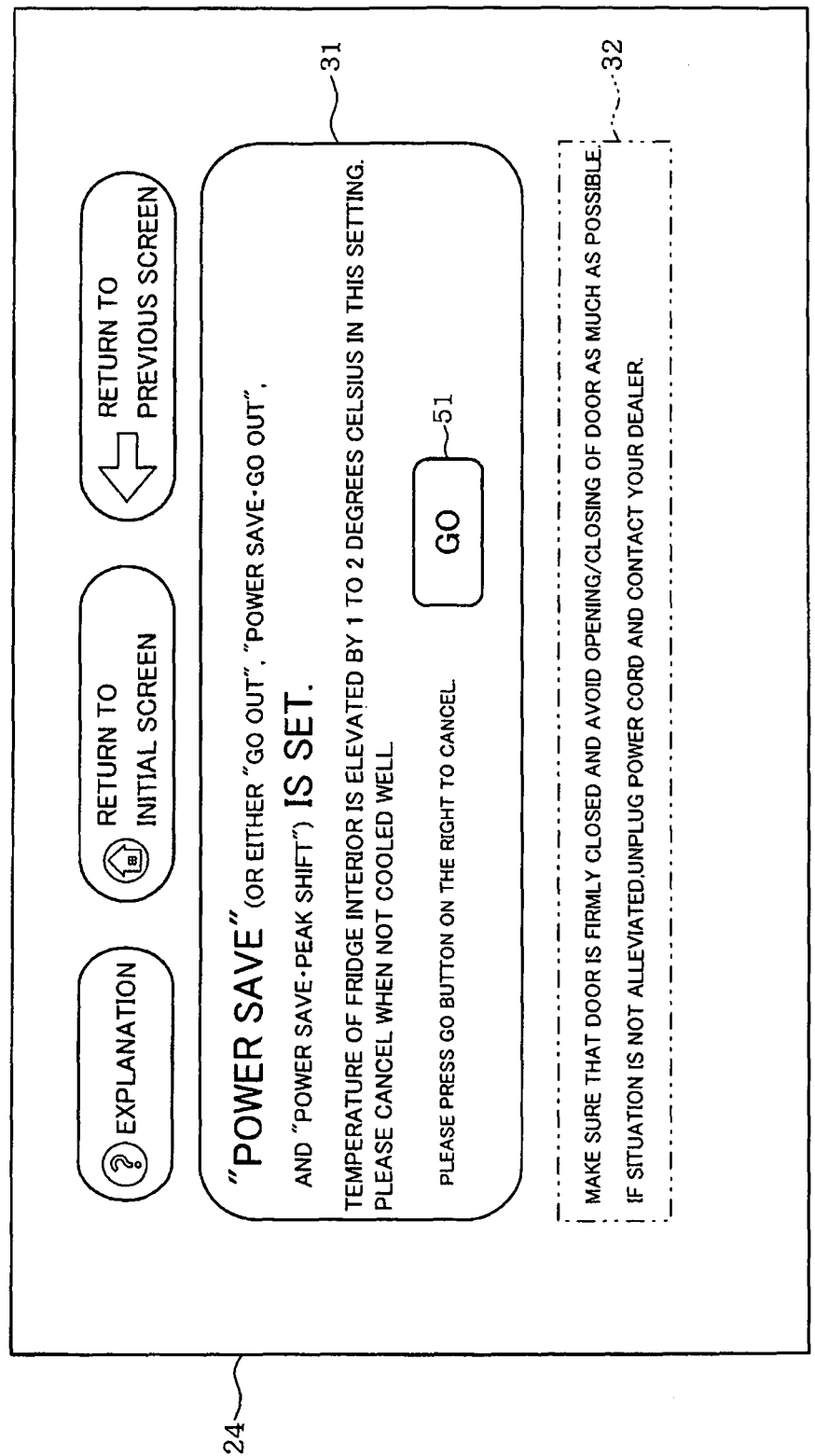

The advice screen illustrated in FIG. 16 is a screen displayed to the liquid crystal display 1*b* by the personal computer 1 to replace the advice screen illustrated in FIG. 11 and is provided with a "go" key 51. The "go" key 51 is displayed according to the display program provided by the server 5. The personal computer 1 replaces the advice screen illustrated in FIG. 16 with the setting screen illustrated in FIG. 17 when the "go" key 51 is operated. The setting screen is displayed according to the display program provided by the server 5. The setting screen is provided with temperature change keys 52, 53, and 54 for setting refrigeration intensity, temperature change keys 55, 56, and 57 for setting freeze intensity, and power save cancel keys 58, 59, 60, and 61.

When the temperature change keys 52 to 57 are operated, the personal computer 1 sets a temperature change instruction for refrigeration intensity or freezer intensity in accordance with the operation of the temperature change keys 52 to 57. When the temperature change instruction has been set, the personal computer 1 transmits the content of the temperature change instruction to the communication control circuit 23 of the refrigerator 7 through the server 5. When receiving the temperature change instruction, the communication control circuit 23 instructs the operation control circuit 22 to change the refrigeration intensity or the freeze intensity from the current intensity level to the intensity level set in the received temperature change instruction. When a change in the refrigeration intensity or the freeze intensity is instructed, the operation control circuit 22 changes the intensity level of the refrigeration intensity or the freeze intensity to the instructed intensity level.

When the power save cancel keys 58 to 61 are operated, the personal computer 1 sets a power mode cancel instruction in accordance with the operation of the power save cancel keys 58 to 61. When the power save cancel key has been set, the personal computer 1 transmits the content of the power save cancel instruction to the communication control circuit 23 of the refrigerator 7 through the server 5. When receiving the power save cancel instruction, the communication control circuit 23 instructs the operation control circuit 22 to cancel one of the power save modes according to the received power save cancel instruction. When cancellation of one of the power modes is instructed, the operation control circuit 22 cancels one of the power save modes.

Figure 17:
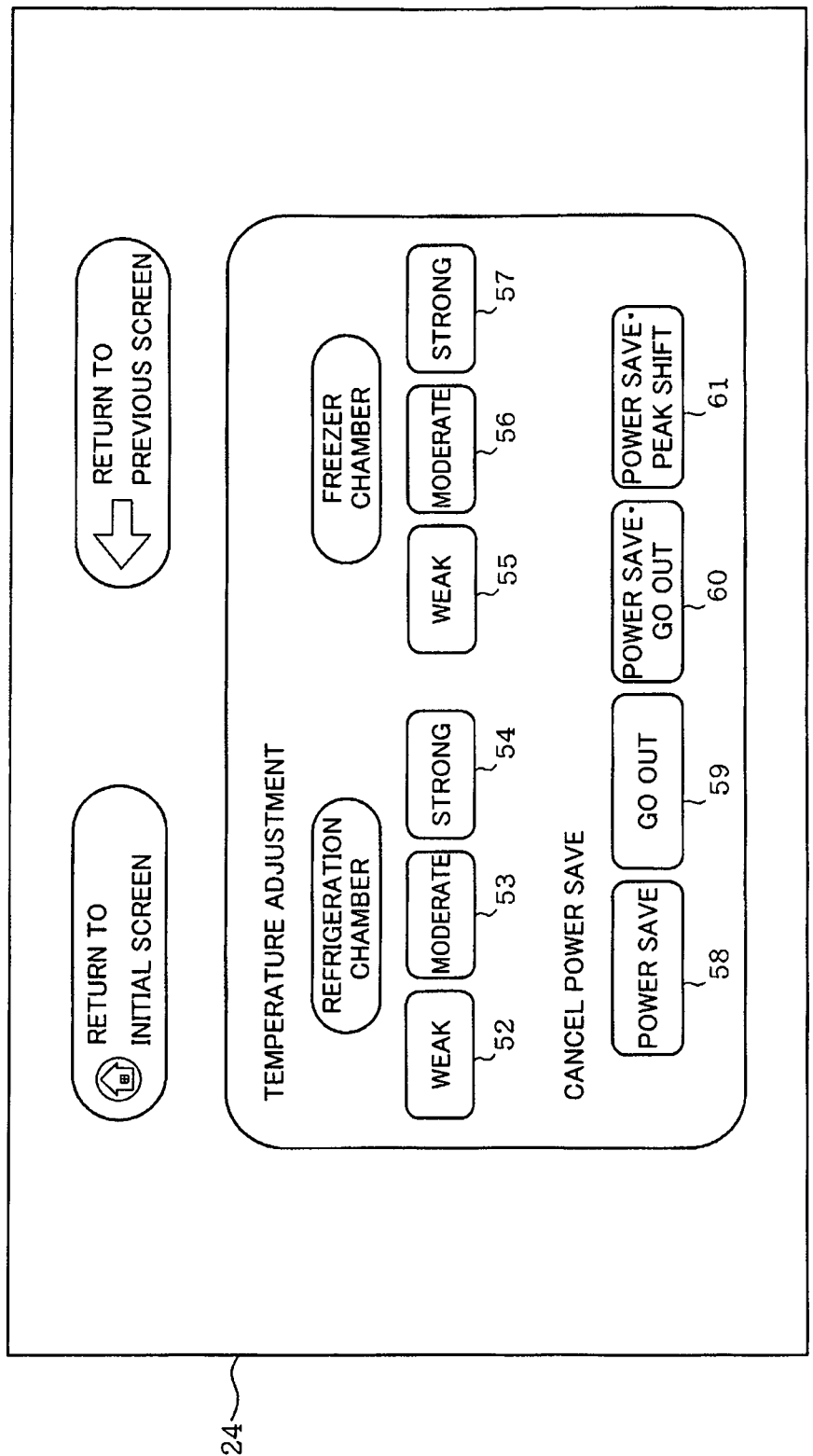

The advice screen illustrated in FIG. 16 and the setting screen illustrated in FIG. 17 are also displayed to the liquid crystal display 6*a* of the high-end mobile phone 6. When the temperature change keys 52 to 57 have been operated, the high-end mobile phone 6 transmits the temperature change instruction to the communication control circuit 23 through the server 5 as was the case in the personal computer 1. When the power mode cancel keys 58 to 61 have been operated, the high-end mobile phone 6 transmits the power save cancel instruction to the communication control circuit 23 through the server 5 as was the case in the personal computer 1.

The above described second embodiment provides the following effects.

The personal computer 1 and the high-end mobile phone 6 display the "go" key 51 on the advice screen displayed to the liquid crystal display 1b and 6a. When the "go" button has been operated, the personal computer 1 and the high-end mobile phone 6 makes a transition from the advice screen to the setting screen for setting the operation of the refrigerator 7. The user is thus, allowed to make a screen transition from the advice screen to the setting screen by operating the transition key 51 when the food is not cooled or is not cooled well. As a result, usability is improved since the user is allowed to cope with the situation in which the food is not cooled or is not cooled well by operating the temperature change keys 52 to 57 and the power save keys 58 to 61.

Third Embodiment

The personal computer 1 and the high-end mobile phone 6 display part of the particular advice region 31 over the front side of the general advice region 32 when displaying the first particular advice, the second particular advice, and the third particular advice in the particular advice region 31 of the advice screen. Further, the personal computer 1 and the high-end mobile phone 6 display the particular advice region 31 above the general advice region 32 so as not to be disposed over the front side of the general advice region 32 when leaving the particular advice region 31 blank.

Figure 18:
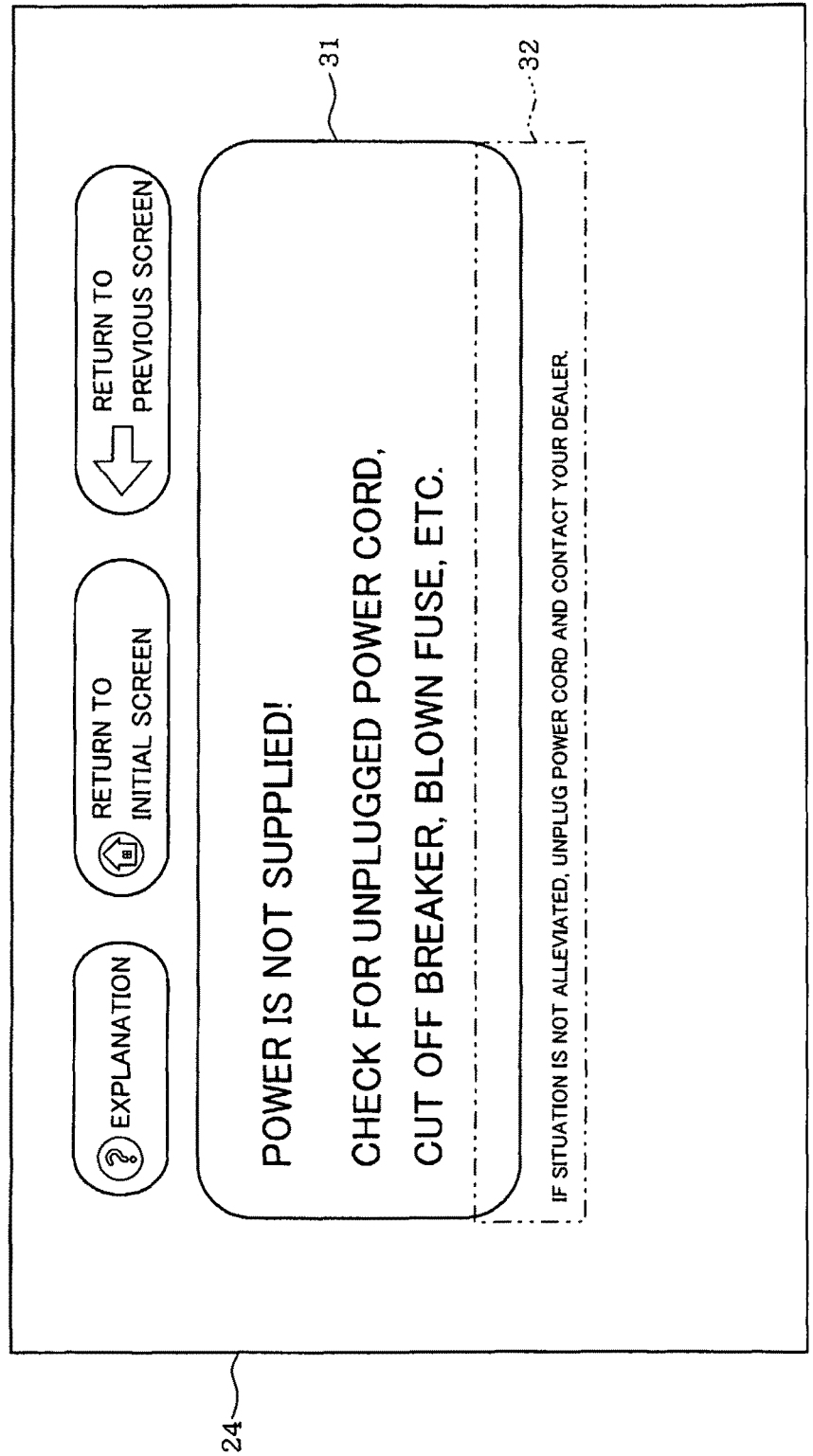

FIG. 18 illustrates a lower portion of the particular advice region 31 being disposed over the front side of the general advice region 32. When part of the particular advice region 31 is disposed over the general advice region 32, part of the general advice within the general advice region 32 becomes invisible. The area of this particular advice region 31 is greater compared to the areas of the particular advice regions 31 of the first embodiment and the second embodiment. The original advice region 31 displays the first particular advice, the second particular advice, and the third particular advice in larger characters compared to the first particular advice, the second particular advice, and the third particular advice of the first embodiment and the second embodiment.

The above described third embodiment provides the following effects.

The personal computer 1 and the high-end phone 6 display the first particular advice on the advice screen displayed to the liquid crystal displays 1b and 6a so as to be located inside window 31 (particular advice region 31) and the window 31 is disposed in the front side of the general advice. This makes the first particular advice more noticeable to the user as compared to the first general advice and thus, it will become difficult for the user to miss the first particular advice.

In each of the above described embodiments, the power supply information, the time information, the weak operation information, the power save information, and the strong operation information may be transmitted to the server 5 from the communication control circuit 23 of the refrigerator 7. The server 5 may be configured to perform a first operational information transmission process indicated in FIG. 6 and a second operational information transmission process indicated in FIG. 7. In such case, the power supply information, the time information, the weak operation information, the power save information, and the strong operation information are examples of information corresponding to the current state of the refrigerator 7.

In each of the above described embodiments, the power supply information, the time information, the weak operation information, the power save information, and the strong operation information may be transmitted to the personal computer 1 and the high-end phone 6 from the communication control circuit 23 of the refrigerator 7 through the server 5 and the personal computer 1 and the high-end phone 6 may be configured to execute the first operational information transmission process of FIG. 6 and the second operational information transmission process of FIG. 7.

In each of the above described embodiments, the outline profile, the area, and the location of the particular advice region 31 may be varied depending upon the type of the first particular advice. In such case, the particular advice region 31 is preferably disposed above the general advice region 32 so as to cover a greater area compared to the general advice region 32 irrespective of the type of the first particular advice.

Each of the above described embodiments may be configured for example as follows. The first to third particular advice data and the first to third general advice data may be pre-stored in the ROM 222 of the communication control circuit 23. The personal computer 1 and the high-end mobile phone 6 may be configured to acquire the first to third particular data and the first to third general advice data from the ROM 222 of the communication control circuit 23 through the communication line 4 and the server 5.

Fourth Embodiment

Next, a description will be given on a fourth embodiment with reference to FIGS. 19 to 34. The display regions 24 illustrated in FIGS. 27 to 34 represent the display regions of the liquid crystal display 1b of the personal computer 1 or the liquid crystal display 6a of the high-end mobile phone 6. The controls executed for the personal computer 1 and the high-end mobile phone 6 are the same and thus, a description will not be given for the high-end mobile phone 6.

Figure 19:
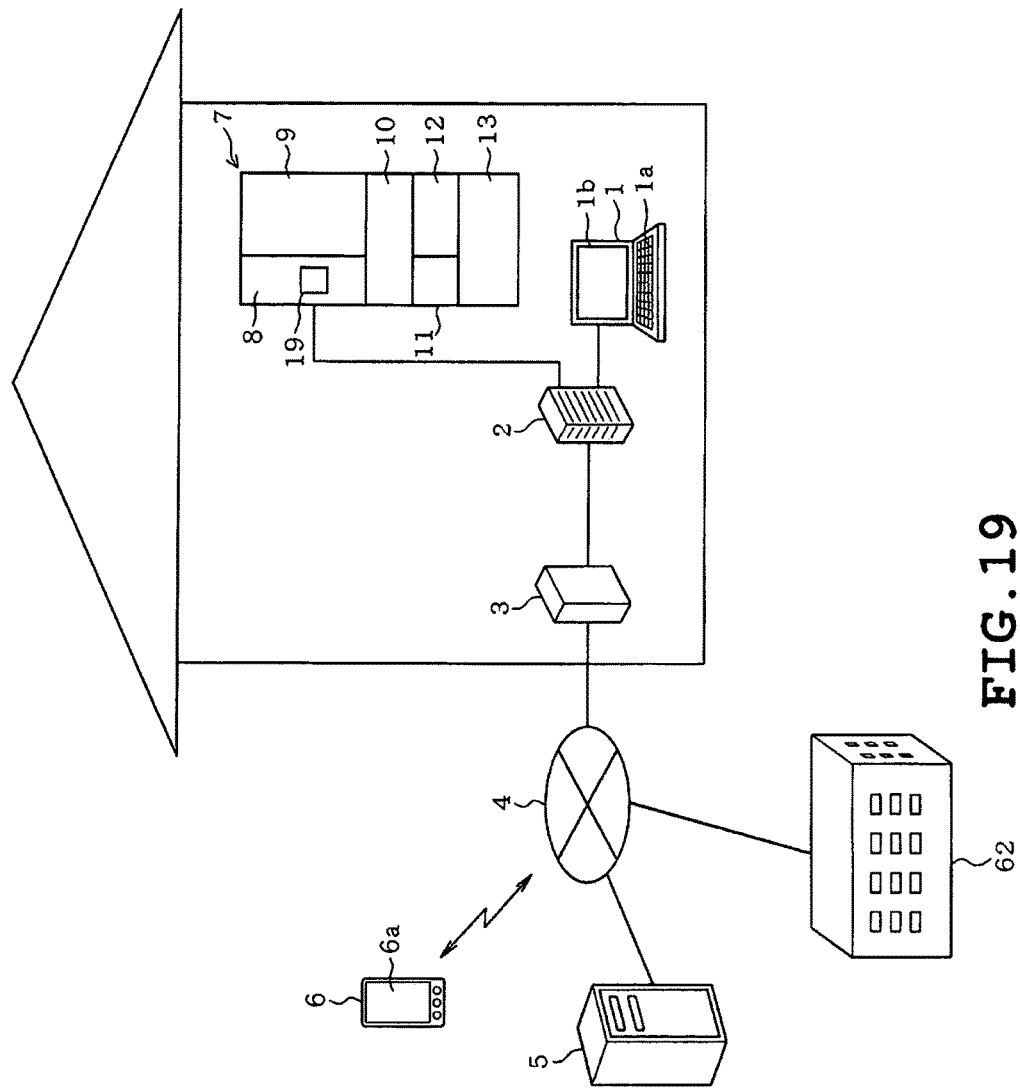

In the fourth embodiment, the personal computer 1, the high-end phone 6, and the refrigerator 7 are connected to the repair reception 62 through the communication line 4, one example of which may be the internet as illustrated in FIG. 19. The repair reception 62 includes a server not illustrated and an operator working as a repair contact. The server of the repair reception 62 is capable of storing data acquired from the personal computer 1, the high-end mobile phone 6, and the refrigerator 7. Further, the user is allowed to exchange information directly with the operator of the repair reception 62 through communication means such as telephone and email using personal computer 1 or high-end mobile phone 6. The server 5 and the server of the repair reception 62 not illustrated may be the same.

The server 5 stores an error information table pertaining to the refrigerator 7 as illustrated in FIG. 20. The error information table is configured by category, severity, error code, and error content. In the following description, a failure is defined as a state in which it is difficult for the refrigerator 7 to operate normally due to some kind of mechanical or electrical error occurring in the mechanical components of the refrigerator 7. Further, an error is defined as a state different from a normal state and encompasses abnormalities that are easily recoverable by the user in addition to the above described failures.

The category indicates what kind of information is being alerted to the user and includes "warning" and "severe failure". The "warning" provides a warning to the user. The "severe failure" informs the user that a severe failure has occurred. Severity indicates the level of error that has occurred in the refrigerator 7 and indicates the risk level of failures that may occur in the future. In this example, an alert is defined as appealing to the senses of the user such as sense of sight and sense of hearing through presentation of information, sound, etc. An alert is not limited to presenting information in the display regions 24 of the liquid crystal display 1b of the personal computer 1 and the liquid crystal display 6a of the high-end mobile phone 6. For example, an alert encompasses producing a specific sound using a sound producing device provided in the personal computer 1 and the high-end mobile phone 6.

Severity is classified into multiple levels of ranks. For example, severity is classified into 3 levels of "light", "moderate", and "Heavy". Severity becomes greater in the listed sequence of "light", "moderate", and "heavy". The "light" level indicates a state in which failure has not occurred and possibility of failure occurring in the future is low. The "light" level indicates the state in which the refrigerator 7 can continue to operate but is difficult to operate normally due to some kind of errors encountered by the refrigerator 7. The "light" level indicates that the error is recoverable by the user in most cases. The "moderate" level indicates a state in which failure has not occurred and possibility of failure occurring in the future is high. The "moderate" level indicates the state in which the failure has not occurred but failure is expected to occur in the near future. The "moderate" level indicates that the error is recoverable by the user in some cases but is not recoverable by the user in some cases. The "heavy" level indicates a state in which severity is "high". The "heavy" level indicates that it is difficult for the refrigerator 7 to continue to operate normally due to some kind of failure. The "heavy" level indicates that it is difficult for the error to be recovered by the user.

In the present embodiment, a situation in which the door of the refrigerator being left open for a long period of time is classified as category: "warning", severity: "light", and error code: E11. A situation in which the freezer chamber is not cooled is classified as category: "warning", severity: "moderate", and error code: E21. A situation in which the freeze cooler is not cooled is classified as category: "warning", severity: "moderate", and error code: E22. A situation in which there is excessive current flowing through compressor 14 is classified as category: "severe failure", severity: "heavy", and error code: E31. A situation in which the current detection circuit of the compressor 14 has failed is classified as category: "severe failure", severity: "heavy", and error code: E32. Information belonging to each category is used as failure forecasting information. In this example, "failure forecasting" is not limited to predicting failures of the refrigerator 7 possibly occurring in the future but encompasses detection of ongoing failures. The server 5 stores multiplicity of other types of errors that are not described herein.

When the refrigerator 7 encounters an error indicated in FIG. 20, or receives an inquiry on the presence/absence of errors from the server 5, the communication control circuit 23 of the refrigerator 7 transmits the error codes of errors currently occurring in the refrigerator 7 to the server 5 through the communication line 4. The following are possible situations in which the server 5 inquires upon the presence/absence of errors. For example, when the user wishes to check the status of the refrigerator 7, the user may send an inquiry to the server 5 using the personal computer 1 or high-end mobile phone 6. Further, when the server 5 is configured to periodically check the status of the refrigerator 7, the server 5 may automatically send an inquiry to the refrigerator 7 at regular time intervals.

Upon receiving an error code from the communication control circuit 23 of the refrigerator 7, the server 5 executes a specific advice display process to display a specific advice including failure forecast information to the liquid crystal display 1b of the personal computer 1 or the liquid crystal display 6a of the high-end mobile phone 6. When power supply to the communication control circuit 23 is cutoff, it is not possible for the refrigerator 7 to respond even if an inquiry is sent to the refrigerator 7 from the server 5. The server 5 may be configured to execute a specific advice display process using an error code obtained prior to the current inquiry, for example, a most recently obtained error code.

Figure 21:
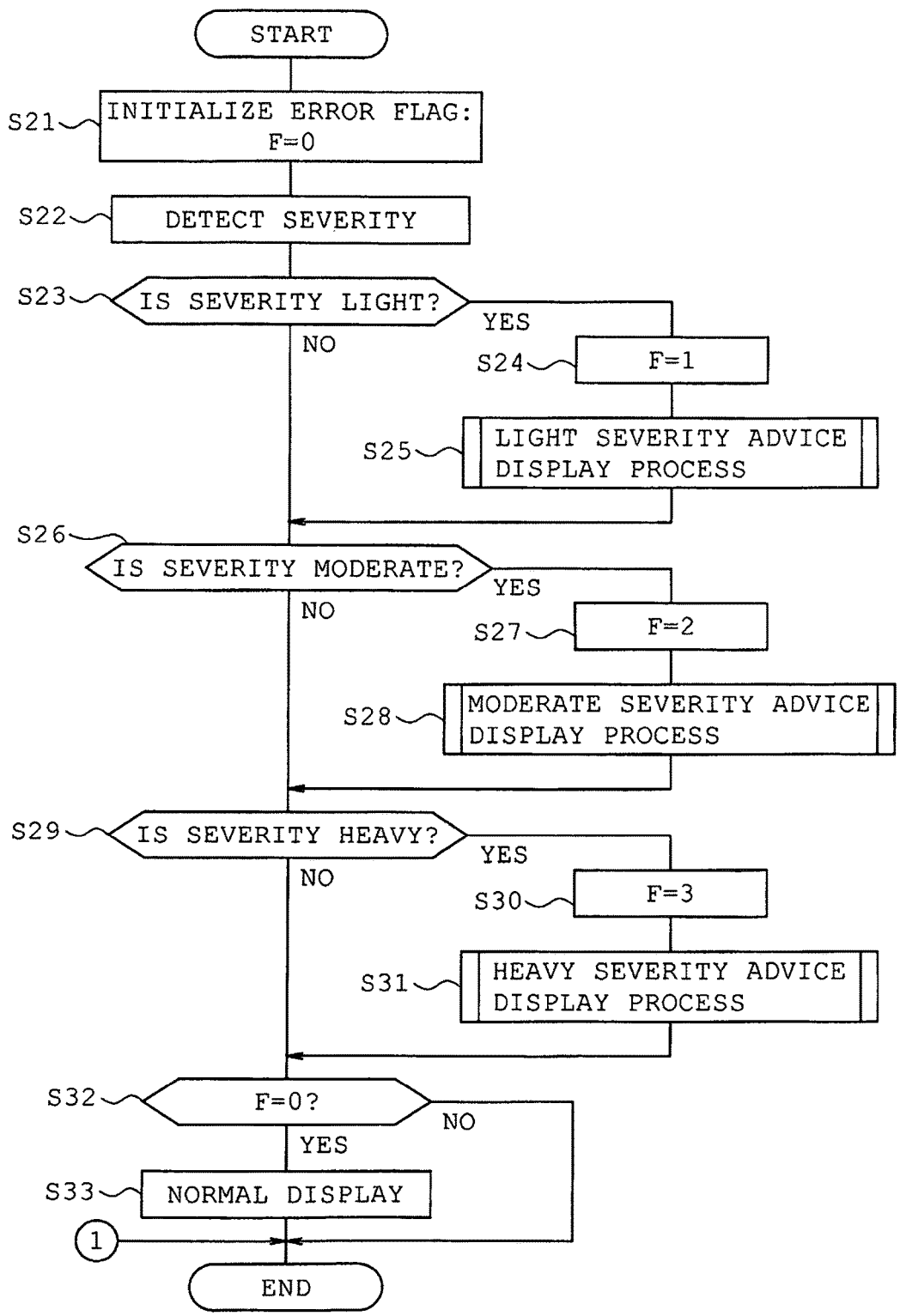
Figure 22:
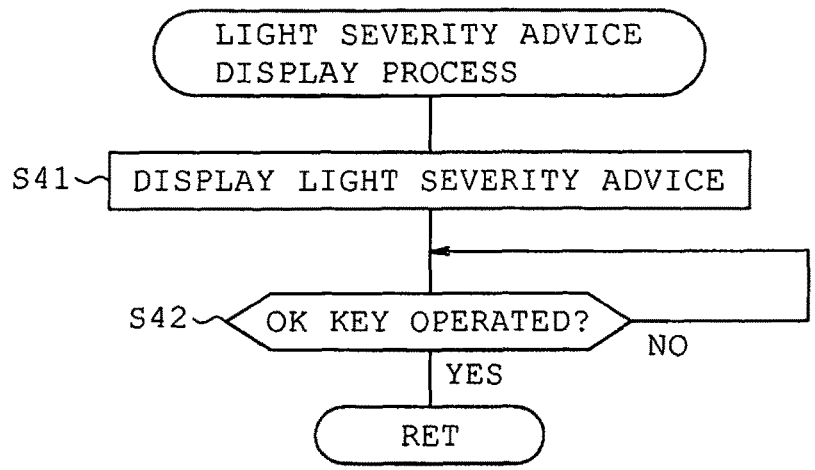
Figure 23:
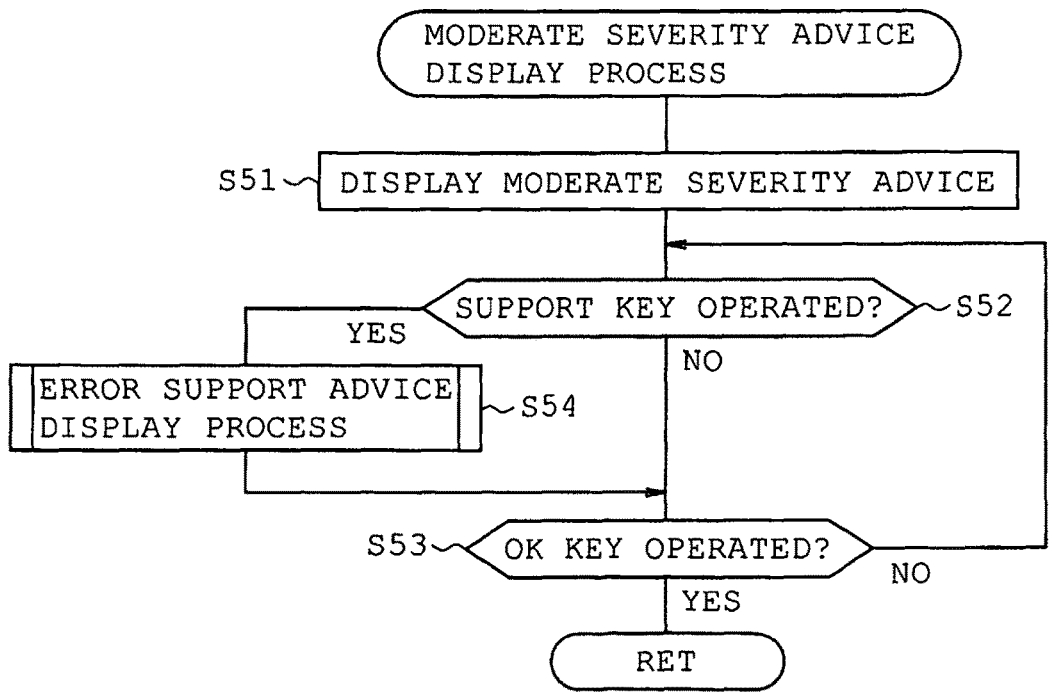

More specifically, the server 5 starts the specific advice display process (START) with step S21 in which an error flag F is initialized to "0" as illustrated in FIG. 21. The error flag F indicates what kinds of errors have occurred in the refrigerator 7. When "0" is assigned to error flag F, it is an indication that no errors have occurred in the refrigerator 7. When "1" is assigned to error flag F, it is an indication that a "light" error has occurred in the refrigerator 7. When "2" is assigned to error flag F, it is an indication that a "moderate" error has occurred in the refrigerator 7. When "3" is assigned to error flag F, it is an indication that a "heavy" error has occurred in the refrigerator 7.

At step S22, the server 5 detects the current severity of the refrigerator 7 based on the error code received from the communication control circuit 23 of the refrigerator 7. At step S23, a judgment is made as to whether or not the severity is "light". When judging that severity is "light" (step S23: YES), the server 5 proceeds to step S24 and assigns "1" to error flag F, whereafter a light severity advice display process is executed at step S25. In the light severity advice display process, the server 5 instructs the personal computer 1 to display a light severity specific advice (hereinafter referred to as light severity advice for short) at step S41 of FIG. 22.

Figure 27:
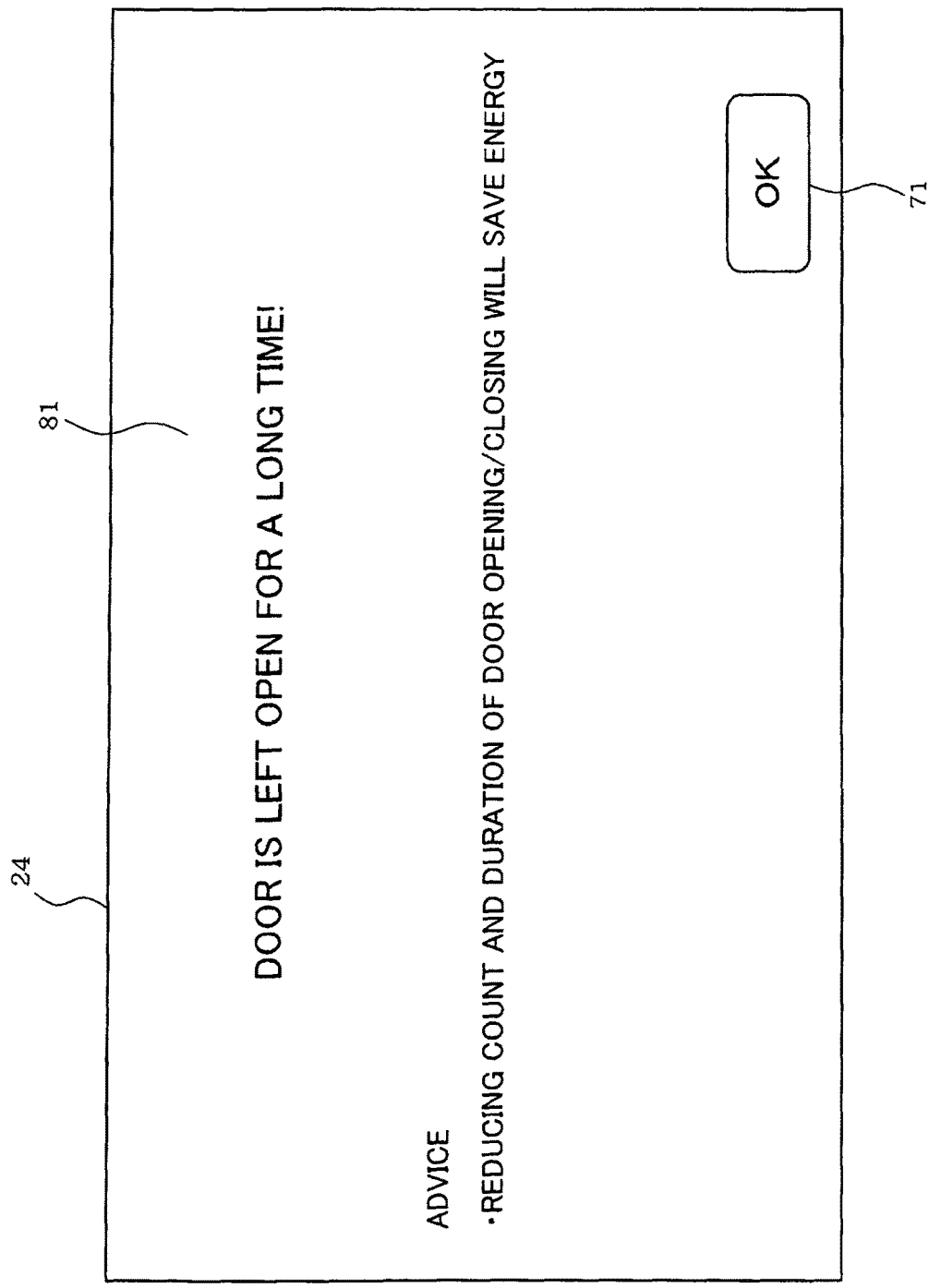

When receiving instructions to display light severity advice from the server 5, the personal computer 1 displays a light severity advice 81 associated with the error code in the display region 24 of the liquid crystal display 1b as illustrated in FIG. 27. FIG. 27 illustrates an example in which a light severity advice 81 associated with the error code E11 is displayed in the display region 24 of the liquid crystal display 1b. The light severity advice 81 includes failure forecast information indicating the failure which may occur in the future that is predicted from the current state of the refrigerator 7. One example of the light severity advice may be "DOOR IS LEFT OPEN FOR A LONG TIME". The light severity advice 81 includes tips for the user in addressing errors such as failures which can be predicted to occur in the future based on current state of the refrigerator 7. One example of such tips may be information such as: power can be saved by reducing the count and duration of door opening/closing, etc. The personal computer 1 displays the OK key 71 on the same screen as the light severity advice 81.

When the OK key 71 is operated by the user, the personal computer 1 transmits information to the server 5 indicating that the OK key 71 has been operated. When detecting that the OK key 71 has been operated (step S42: YES), the server 5 proceeds to step S26 indicated in FIG. 21 (RET). When judging at step S23 that the severity is not "light" (step S23: NO), the server 5 proceeds to step S26 to judge the presence and absence of other types of errors. At step S26, the server 5 judges whether or not severity is "moderate".

When judging that severity is "moderate" (step S26: YES), the server 5 proceeds to step S27 in which "2" is assigned to the error flag F. Then, the server 5 proceeds to step S28 and executes a moderate severity advice display process. In the moderate severity advice display process, the server 5 instructs the personal computer 1 to display a moderate severity specific advice (hereinafter referred to as moderate severity advice for short) at step S51 of FIG. 23.

Figure 28:
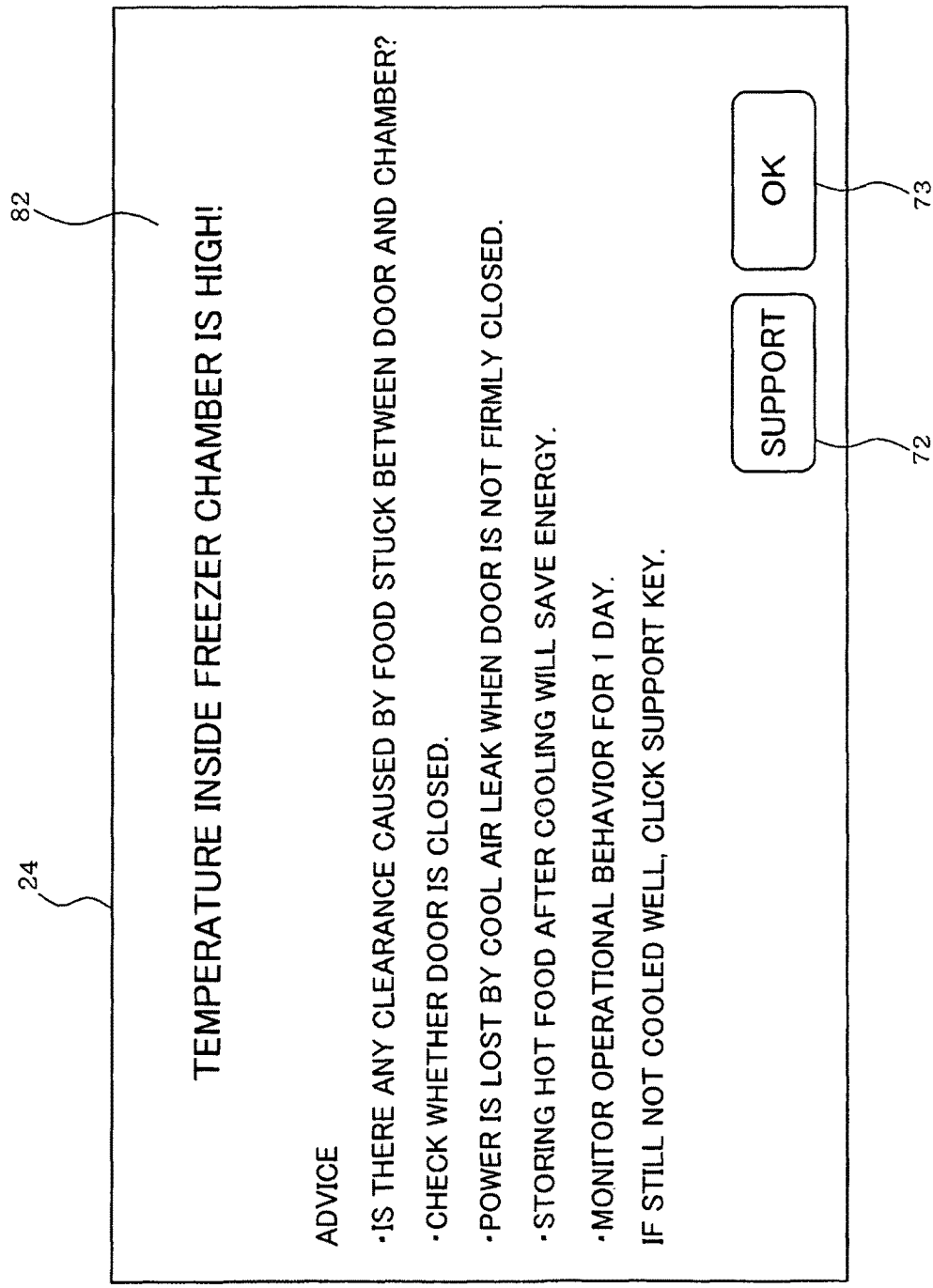

When receiving instructions to display moderate severity advice from the server 5, the personal computer 1 displays a moderate severity advice 82 associated with the error code in the display region 24 of the liquid crystal display 1b as illustrated in FIG. 28. FIG. 28 illustrates an example of the moderate severity advice 82 when the error code is E21 or E22. The moderate severity advice 82 includes failure forecast information indicating the failure which may occur in the future that is predicted from the current state of the refrigerator 7. One example of the moderate severity advice 82 may be "TEMPERATURE INSIDE FREEZER CHAMBER IS HIGH". The moderate severity advice 82 includes tips for the user in addressing failures which can be predicted to occur in the future based on current state of the refrigerator 7. Such tips may include inquiries such as "IS THERE ANY CLEARANCE CAUSED BY FOOD STUCK BETWEEN DOOR AND CHAMBER?" The personal computer 1 displays the support key 72 and the OK key 73 on the same screen as the moderate severity advice 82.

When the support key 72 or the OK key 73 is operated by the user, the personal computer 1 transmits information to the server 5 indicating that the support key 72 or the OK key 73 has been operated. The server 5 repeats steps S52 or S53 indicated in FIG. 23 until operation of either the support key 72 or the OK key 73 is detected. When detecting the operation of the OK key 73 (step S53: YES) without detecting the operation of the support key 72 (step S52: NO), the server 5 proceeds to step S29 (RET) of FIG. 21 to detect presence/absence of other errors. When detecting the operation of the support key 72 (step S52: YES) on the other hand, the server 5 proceeds to step S54 and executes an error support advice display process.

The server 5 starts the error support advice display process with step S61 indicated in FIG. 24 in which instructions are given to the personal computer 1 to display a specific error support advice (hereinafter referred to as an error support advice for short) on the liquid crystal display 1b. When receiving instructions from the server 5 to display error support advice, the personal computer 1 displays error support advice 83 associated with the error code in the display region 24 of the liquid crystal display 1b as illustrated in FIG. 29.

Figure 29:
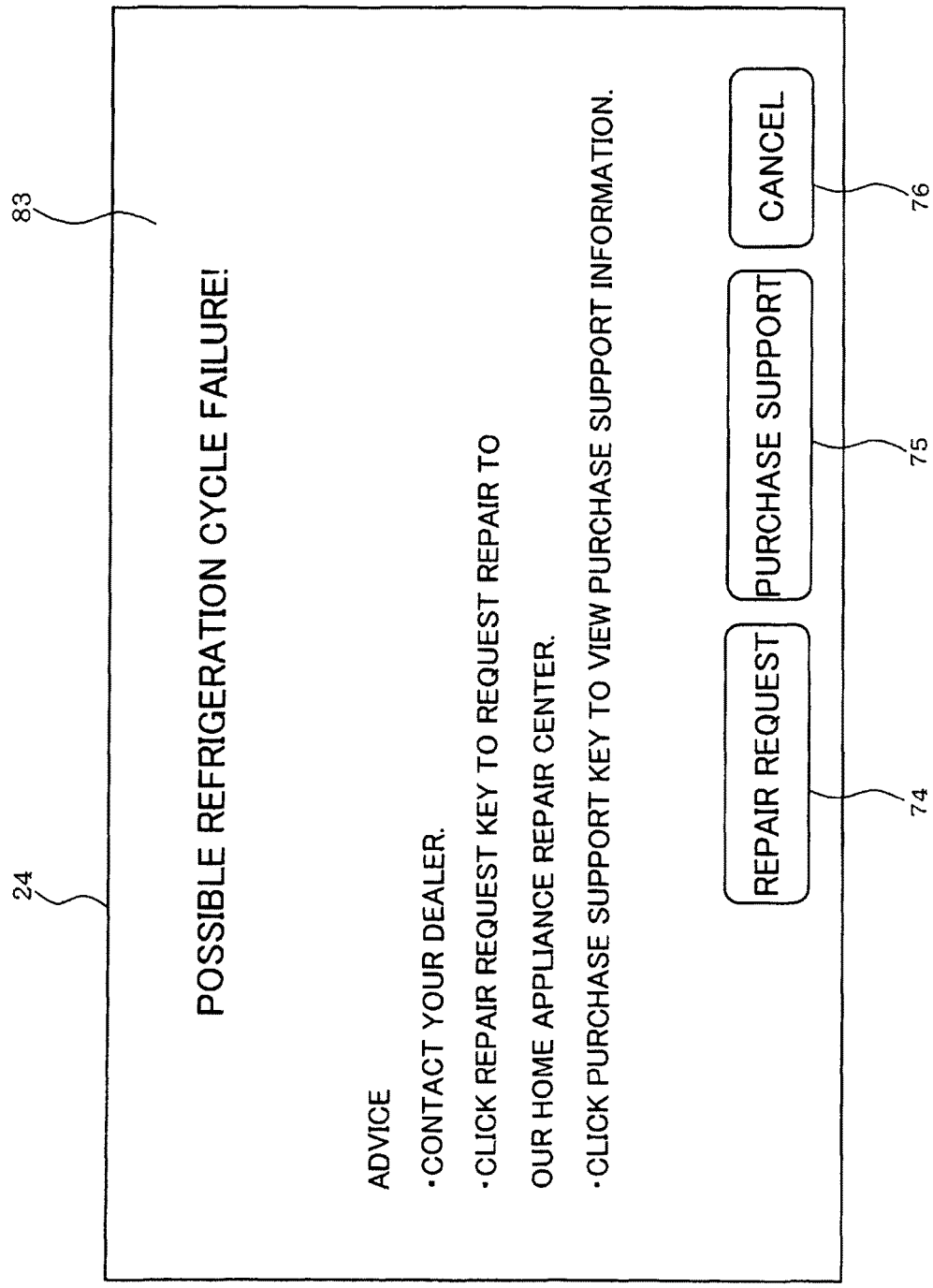

FIG. 29 illustrates an example of the error support advice 83 when the error code is E21 or E22. The error support advice 83 includes failure forecast information indicating the failure which may occur in the future that is predicted from the current state of the refrigerator 7. One example of the error support advice 83 may be "POSSIBLE REFRIGERATION CYCLE FAILURE". The error support advice 83 includes tips for the user in addressing failures which can be predicted to occur in the future based on current state of the refrigerator 7. Such tips may include suggestions to contact the dealer where the refrigerator 7 was purchased. The personal computer 1 displays the repair request key 74, purchase support key 75, and cancel key 76 on the same screen as the error support advice 83.

The server 5 may be configured to automatically display the error support advice 83 indicated in FIG. 29 after a predetermined period of 1 day for example from the display of the moderate severity advice 82 indicated in FIG. 28 by the personal computer 1. It is possible to prevent the user from forgetting to check the error support advice 83 since the support key 72 need not be operated and thus, is user friendly.

Figure 36:
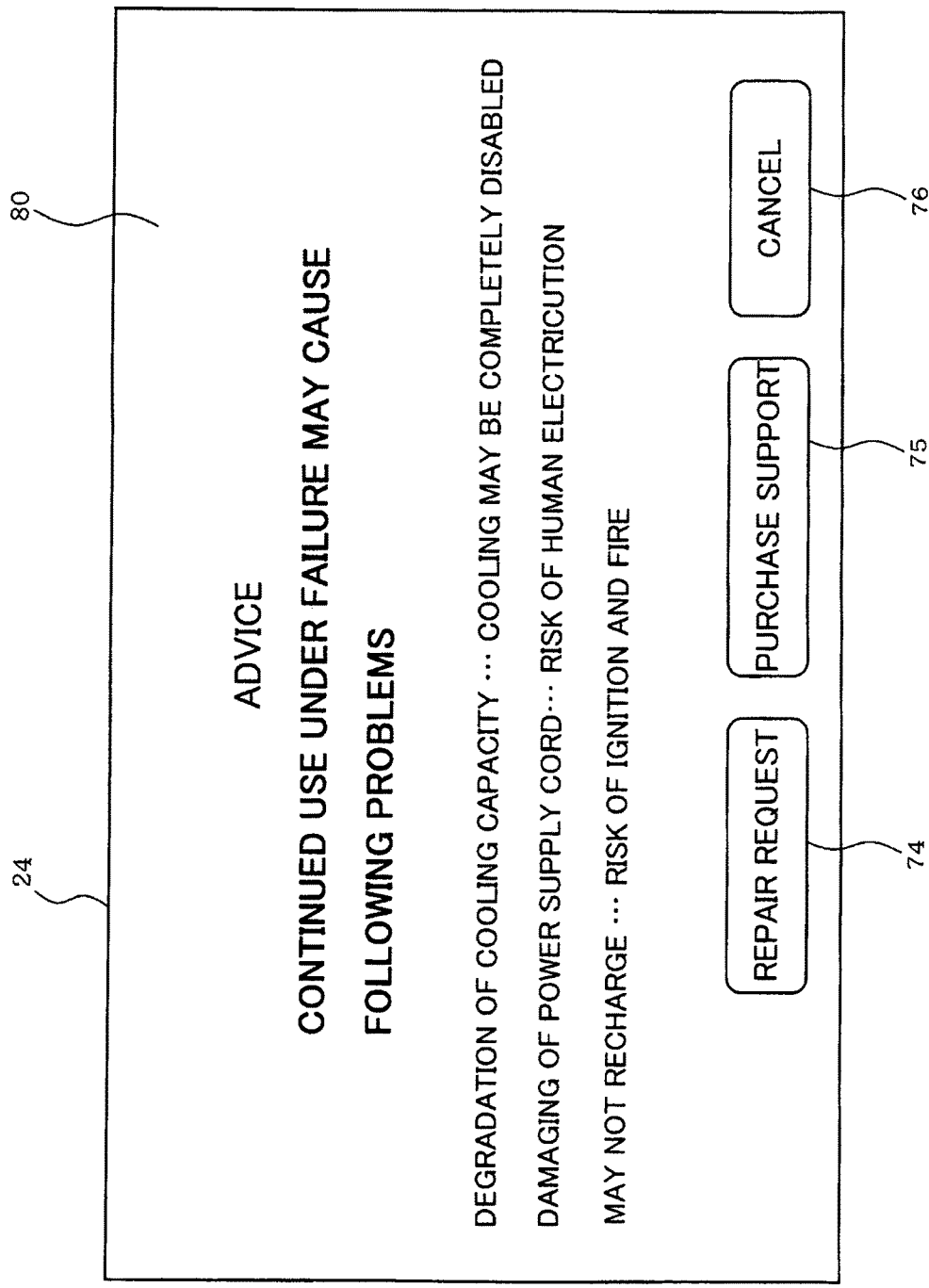

The server 5 may be configured to display risk information 80 as a specific advice in the display region 24 as illustrated in FIG. 36. The risk information 80 indicates the possible risks that may result from continued use with the failures displayed in the failure forecast information left unattended. That is, the risk information 80 indicates the risks that may result from continued use of home appliance in failed state. For example, the server 5 issues an alert that continued use in a situation where failure of the refrigeration cycle is expected and cooling capacity is degrading will increase the seriousness of failure of the refrigeration cycle and disable the cooling feature of the refrigeration cycle. In another example, the server 5 may issue an alert that the user may become electrocuted when detecting a damage in the power supply cord. In another example, the server 5 may issue an alert that there is a risk of ignition and fire due to a possible battery deterioration when the battery installed in the home appliance is not recharged over time. It is easier for the user to understand the seriousness of the failure compared to merely providing an alert on the severity level of the failure and provide a better insight to the user on expected risks when the failure is left unattended.

When the repair request key 74, the purchase support key 75, or the cancel key 76 is operated by the user, the personal computer 1 transmits information to the server 5 indicating that the repair request key 74, the purchase support key 75, or the cancel key 76 has been operated. The server 5 repeats steps S62 to S64 indicated in FIG. 24 until operation of either the repair request key 74, the purchase support key 75, or the cancel key 76 is detected. When detecting the operation of the cancel key 76 (step S64: YES) without detecting the operation of the repair request key 74 and the purchase support key 75 (step S62: NO and step S63: NO), the server 5 proceeds to step S53 (RET) of FIG. 23. When detecting the operation of the repair request key 74, on the other hand (step S62: YES), the server 5 proceeds to step S65 and executes the repair request. When the server 5 executes the repair request, instructions are given to the communication control circuit 23 of the refrigerator 7 to collect and acquire data detailing the failure encountered by the refrigerator 7. The elaborate failure data include error code, category, severity, and error content as illustrated for example in FIG. 20. When receiving instructions from the server 5, the communication control circuit 23 acquires data elaborating on the ongoing failures in the refrigerator 7. The communication control circuit 23 serves as an acquiring portion configured to acquire data pertaining to failures encountered by the refrigerator 7.

Thereafter, the communication control circuit 23 serves as a transmitting portion and transmits the data pertaining to failures, i.e. error codes, to the repair reception 62. The communication control circuit 23 may be configured to transmit the model, the product serial number, user's contact, etc. to the repair reception 62 along with the data pertaining to failures. When receiving repair request from the communication control circuit 23, the repair reception 62 transmits repair reception information to the personal computer 1 indicating that request for repair has been received. When receiving information that request for repair has been received from the repair reception 62, the personal computer 1 displays a message on the liquid crystal display 1b of the personal computer 1 indicating that request for repair of the refrigerator 7 has been received along with the OK key 77 as illustrated in FIG. 30.

Figure 30:
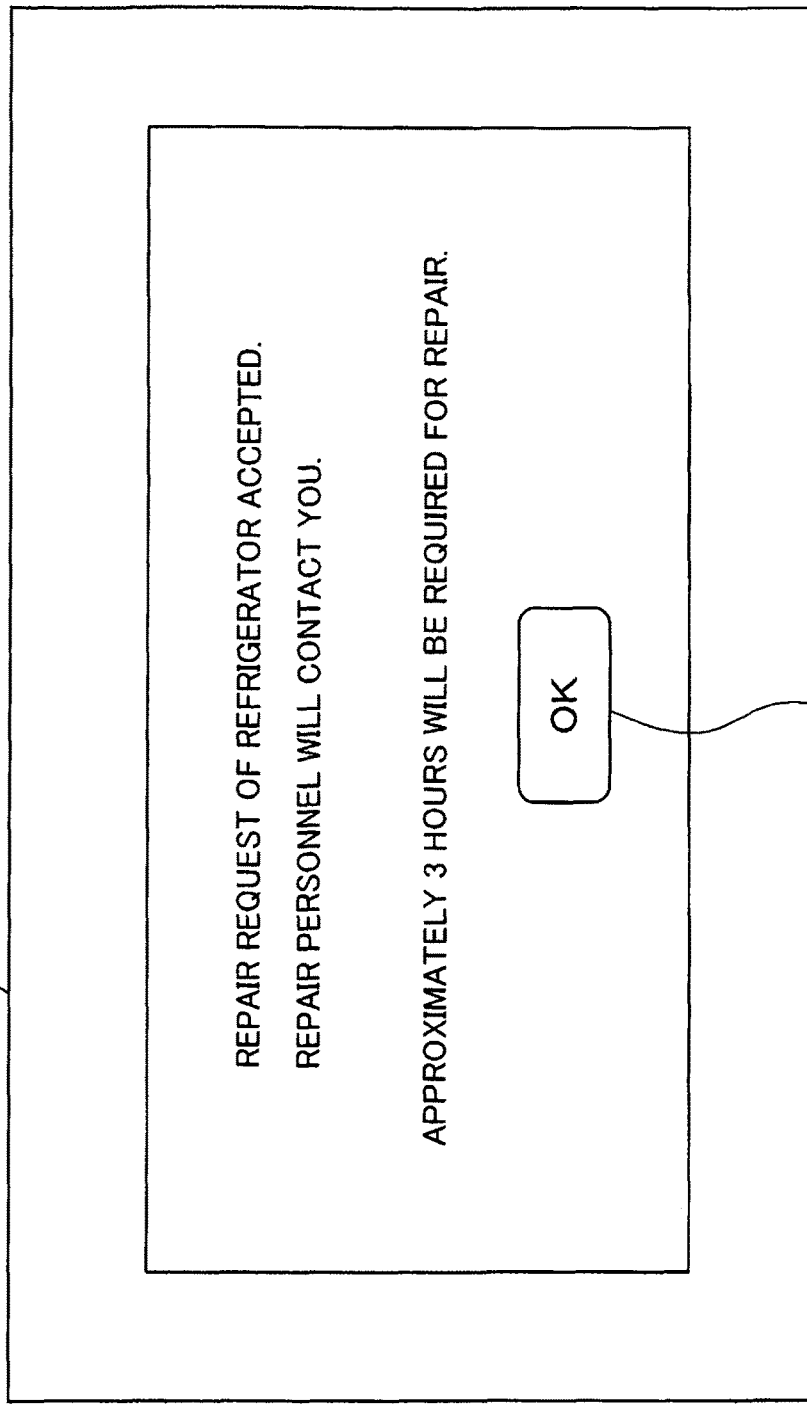

As illustrated in FIG. 30, the personal computer 1 displays the time period required in repairing the refrigerator 7 on the liquid crystal display 1b based on the repair reception information and failure data. In the present embodiment, for example, a massage that reads "APPROXIMATELY 3 HOURS WILL BE REQUIRED FOR REPAIR" is displayed in the display region 24. This is convenient for the user since the user will be able to easily be aware of the time period required for repair. When the user operates the OK key 77, the personal computer 1 transmits information to the server 5 indicating the OK key 77 has been operated. When detecting that the user has operated the OK key 77, the server 5 proceeds to step S29 of FIG. 21 to judge the presence/absence of other errors.

Figure 31:
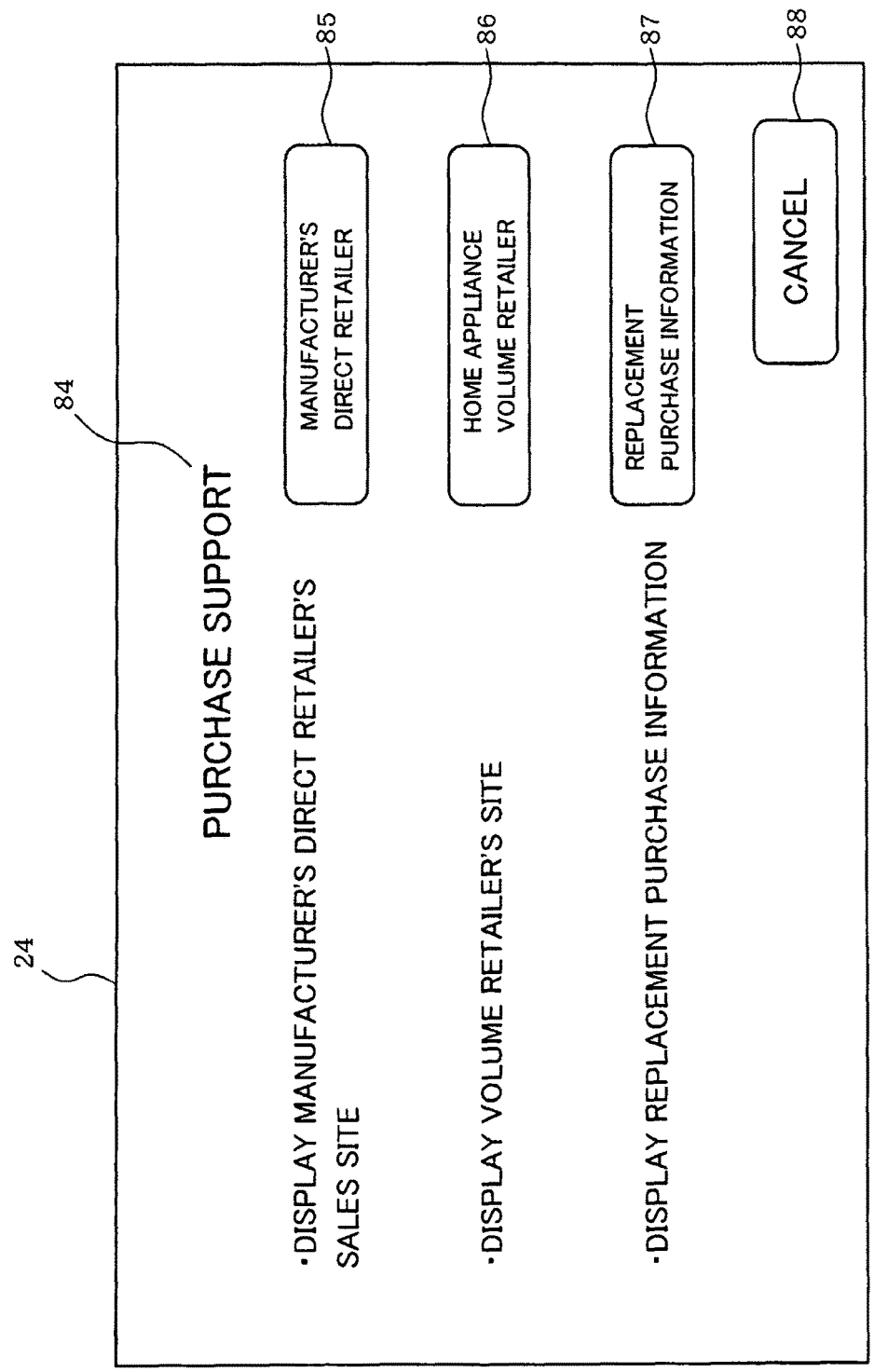

When detecting the operation of the purchase support key 75 (step S63: YES) on the other hand, the server 5 proceeds to step S66 in FIG. 24 and executes the purchase support advice display process. The server 5 starts the purchase support advice display process with step S71 indicated in FIG. 25 in which instructions are given to the personal computer 1 to display a specific purchase support advice (hereinafter referred to as purchase support advice for short) on the liquid crystal display 1b. When receiving instructions from the server 5 to display purchase support advice, the personal computer 1 displays purchase support advice 84 in the display region 24 of the liquid crystal display 1b as illustrated in FIG. 31.

The purchase support advice 84 is information pertaining to the purchase of home appliance, which is a refrigerator in this example, and includes useful information to the user. The purchase support advice 84 includes a manufacturer's direct retailer's site key 85, volume retailer's site key 86, replacement purchase information key 87, and cancel key 88 for example. The manufacturer's direct retailer's site key 85 is linked to the website of the home appliance retail directly run by the manufacturer of the refrigerator 7. The volume retailer's site key 86 is linked to the website of a general home appliance volume retailer. The manufacturer's direct retailer's site key 85 and the volume retailer's site key 86 are retailer's site keys for displaying the websites of the home appliance retailers that sell the same type of home appliance which, in this case, is a refrigerator. The home appliance retailer directly run by the manufacturer and the general home appliance retailer may be a physically existing store or an online store existing only on the internet. The personal computer 1 repeats steps S72 to S75 of FIG. 25 until either of the direct retailer's site key 85, the volume retailer's site key 86, the replacement purchase key 87, and the cancel key 88 is operated.

When detecting the operation of either of the direct retailer's site key 85, the volume retailer's site key 86, the replacement purchase key 87, and the cancel key 88, the personal computer 1 transmits information to the server 5 indicating that such operation has been made. When detecting that the direct retailer's site key 85 has been operated (step S72: YES), the server 5 proceeds to step S76 and instructs the website of the home appliance retailer directly run by the manufacturer of the refrigerator 7 to be displayed in the display region 24 of the liquid crystal display 1b of the personal computer 1. When receiving such instructions, the personal computer 1 invokes web browser possessed by the personal computer 1 and displays the website of the home appliance retailer directly run by the manufacturer of the refrigerator 7 in the display region 24 of the liquid crystal display 1b for example. Thereafter, the server 5 terminates the series of processes (END in FIG. 21).

When detecting that the volume retailer's site key 86 has been operated (step S73: YES), the server 5 proceeds to step S77 and instructs the website of the home appliance volume retailer to be displayed in the display region 24 of the liquid crystal display 1b of the personal computer 1. When receiving such instructions, the personal computer 1 invokes web browser possessed by the personal computer 1 and displays the website of the home appliance volume retailer in the display region 24 of the liquid crystal display 1b for example. Thereafter, the server 5 terminates the series of processes (END in FIG. 21). When either the website of the home appliance retailer directly run by the manufacturer or the website of a general home appliance retailer does not exist, the server 5 may be configured to display the contact such as the phone number of the retailer.

Figure 32:
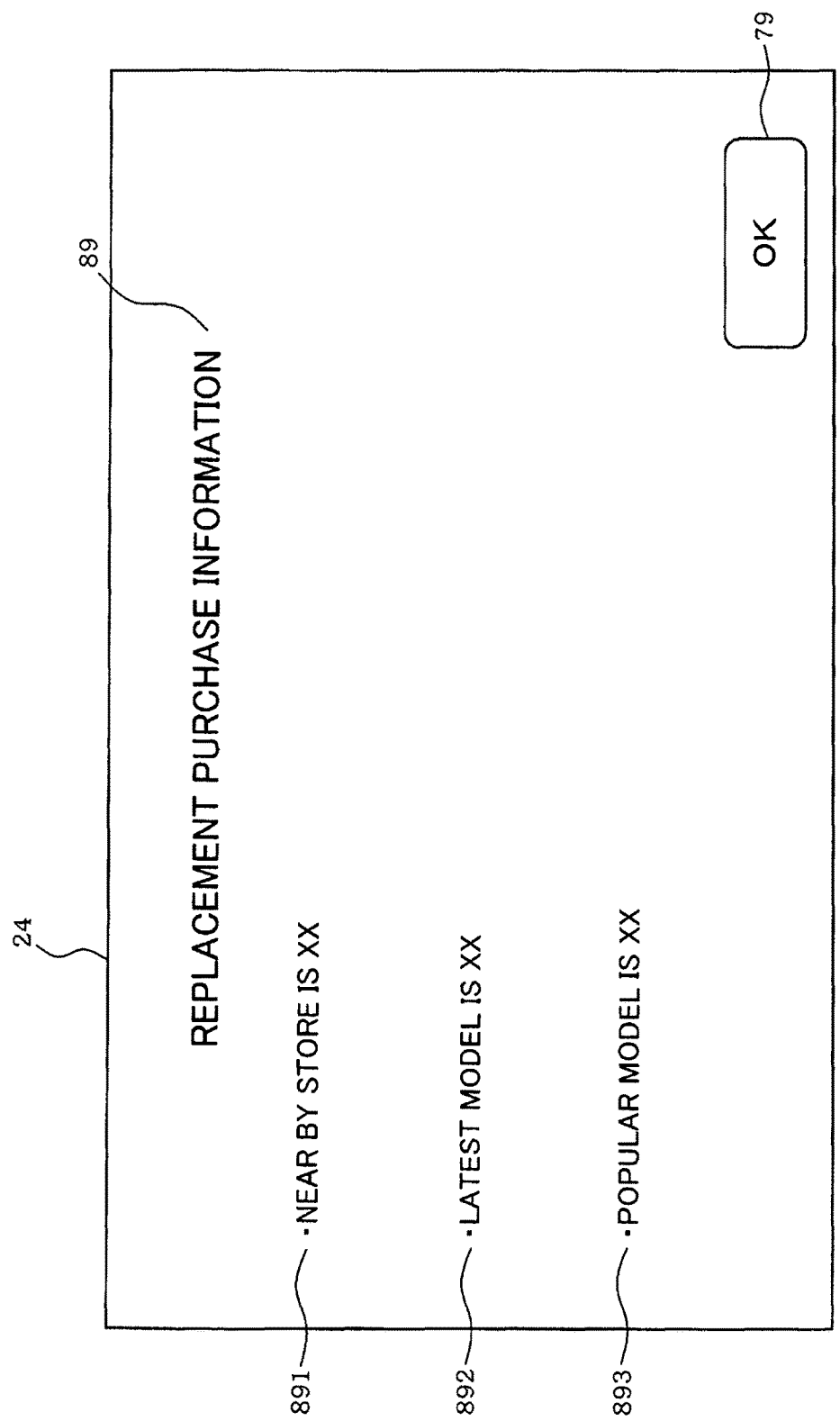

When detecting that the replacement purchase information key 87 has been operated (step S74: YES), the server 5 proceeds to step S78 and instructs replacement purchase information 89 to be displayed in the display region 24 of the liquid crystal display 1b of the personal computer 1. When receiving such instructions, the personal computer 1 displays the replacement purchase information 89 as well as the OK key 79 in the display region 24 of the liquid crystal display 1b as illustrated in FIG. 32 for example. The replacement purchase information 89 is helpful to the user when purchasing a replacement of the refrigerator and includes useful tips for purchasing a replacement of the refrigerator. The replacement purchase information 89 includes information such as "information on the nearest store 891", "information on the latest model of the refrigerator 892", and "information on the popular model of the refrigerator 893". After detecting the operation of the OK key 77, the server 5 terminates the series of processes (END in FIG. 21).

Figure 24:
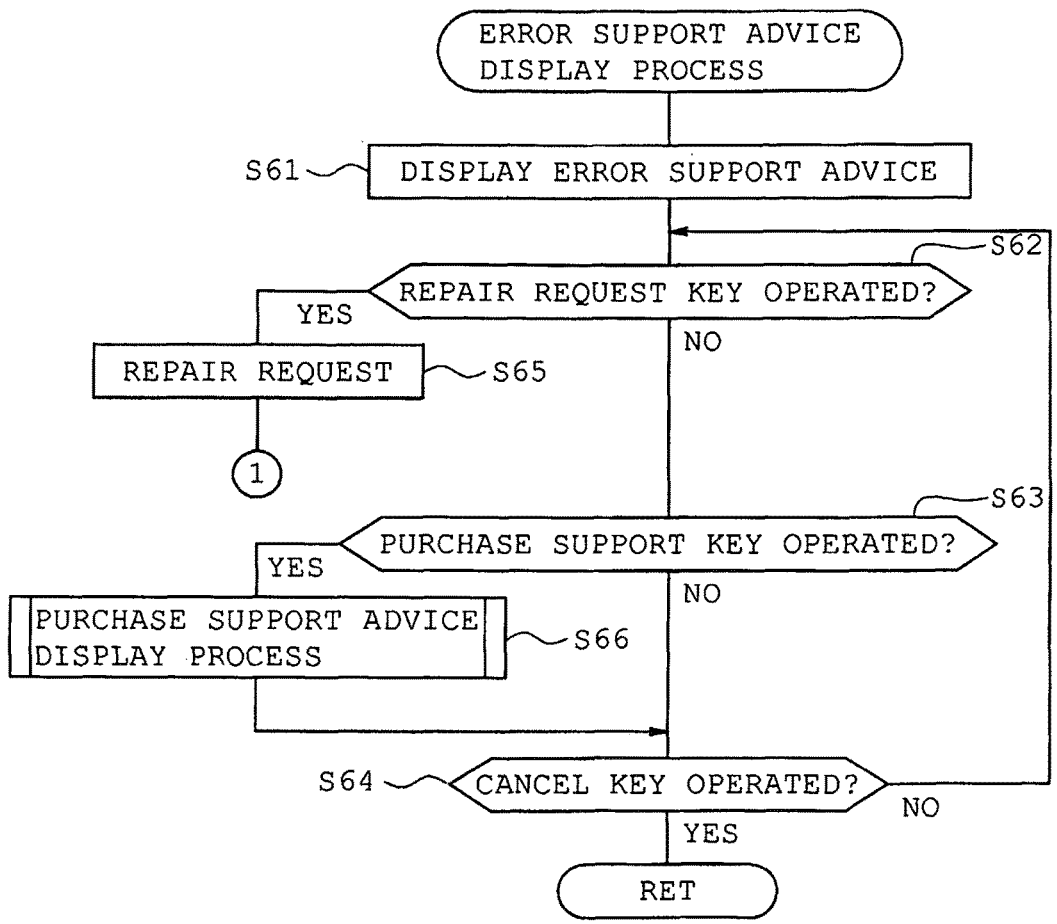
Figure 25:
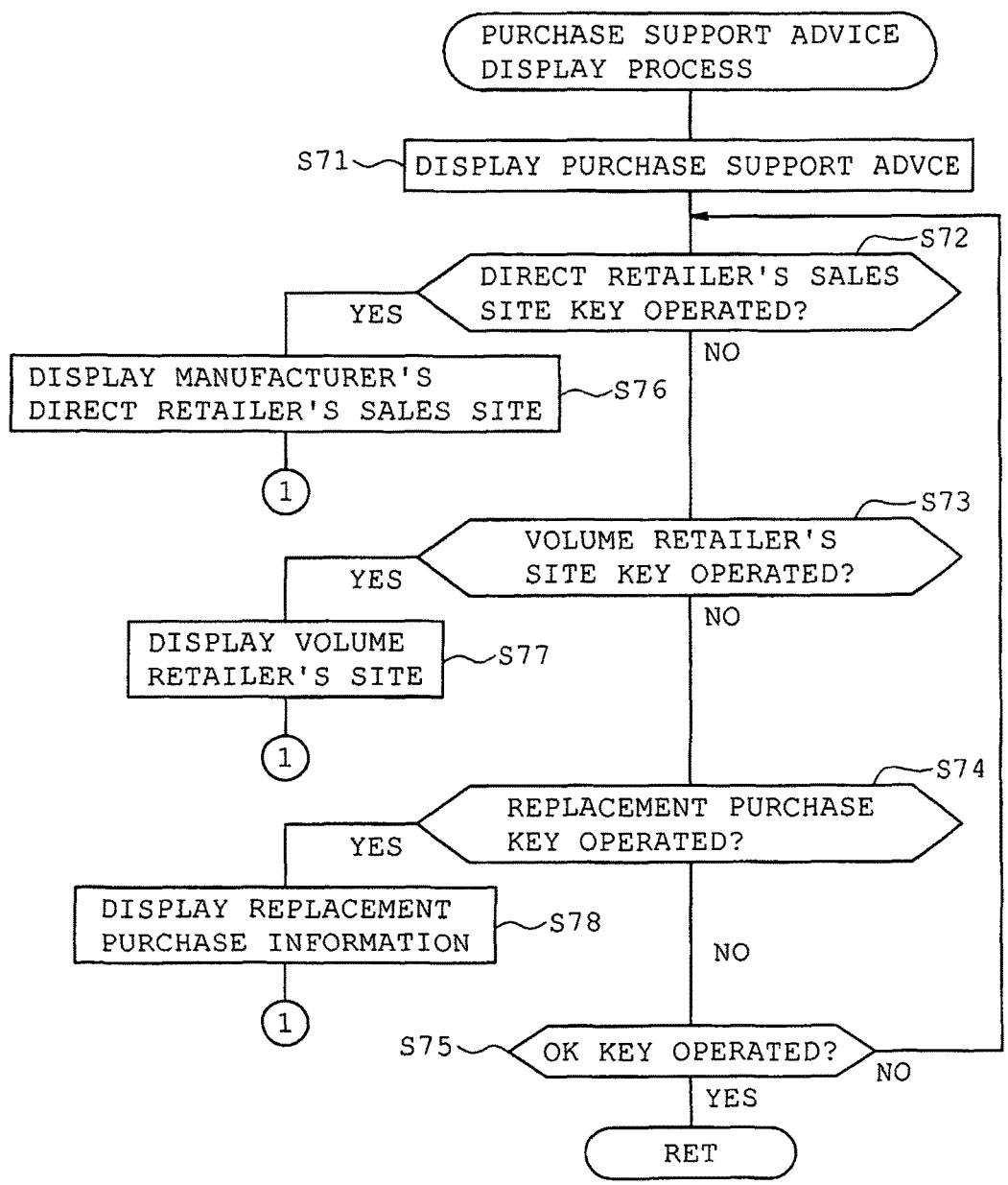
Figure 26:
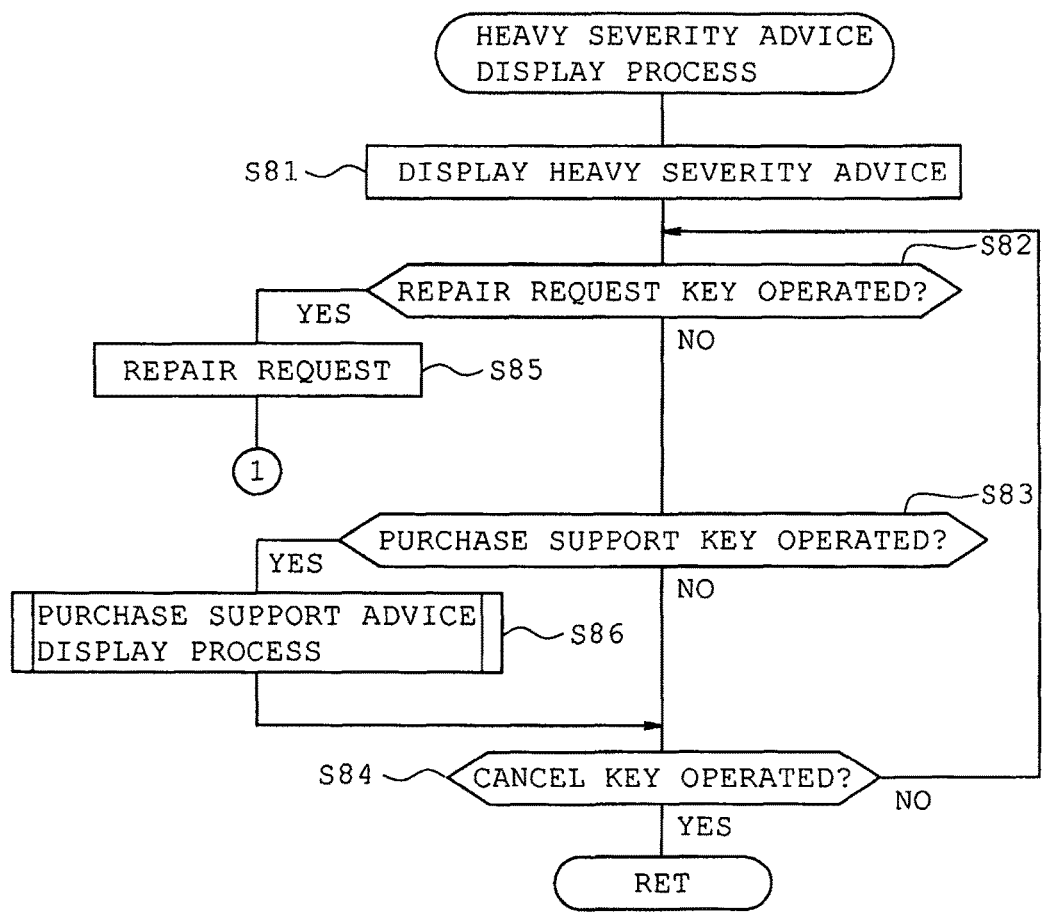

When detecting the operation of the cancel key 88 at step S64 of FIG. 24 (step S64: YES), the server 5 proceeds to step S29 of FIG. 21 to detect presence/absence of other errors. At step S29, the server 5 determines whether or not severity is "heavy". When judging that severity is not "heavy" (step S29: NO), the server 5 proceeds to step S32. When judging that severity is "heavy" (step S29: YES), on the other hand, the server 5 proceeds to step S30 and assigns "3" to error flag F, whereafter a heavy severity advice display process is executed at step S31. In the heavy severity advice display process, the server 5 instructs the personal computer 1 to display a heavy severity specific advice (hereinafter referred to as heavy severity advice for short) at step S81 of FIG. 26.

Figure 33:
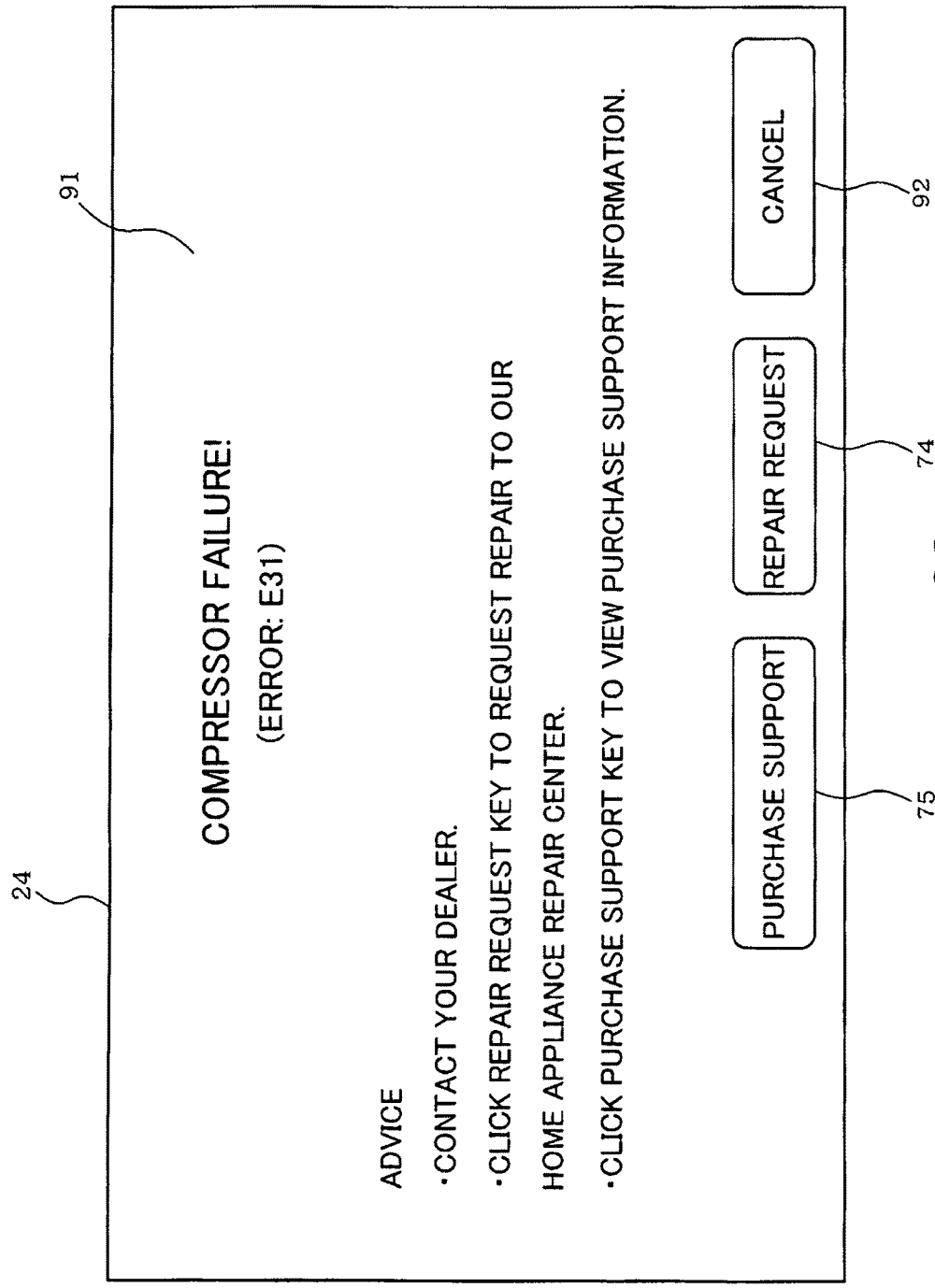

When receiving instructions to display heavy severity advice from the server 5, the personal computer 1 displays a heavy severity advice 91 associated with the error code in the display region 24 of the liquid crystal display 1b as illustrated for example in FIG. 33. FIG. 33 illustrates an example of the heavy severity advice 91 when the error code is E31. The heavy severity advice 91 includes failure forecast information indicating the failure which may occur in the future that is predicted from the current state of the refrigerator 7 and error code associated with such failure. One example of the heavy severity advice 91 may be "COMPRESSOR FAILURE". The heavy severity advice 91 includes tips for the user in addressing failures which are currently encountered by the refrigerator 7. Such tips may include suggestions to contact the dealer where the refrigerator 7 was purchased. The personal computer 1 displays the repair request key 74, purchase support key 75, and cancel key 76 on the same screen as the heavy severity advice 91.

When the repair request key 74, the purchase support key 75, or the cancel key 92 is operated, the personal computer 1 transmits information to the server 5 indicating that the repair request key 74, the purchase support key 75, or the cancel key 76 has been operated. The server 5 repeats steps S82 to S84 until operation of either the repair request key 74, the purchase support key 75, or the cancel key 76 is detected. When detecting the operation of the repair request key 74, on the other hand (step S82: YES), the server 5 proceeds to step S85 and issues a repair request to the repair reception 62 as was the case in step S63 of FIG. 24. When detecting the operation of the purchase support key 75, on the other hand (step S83: YES), the server 5 proceeds to step S86 and executes the purchase support process as was the case in step S65 of FIG. 24.

Figure 34:
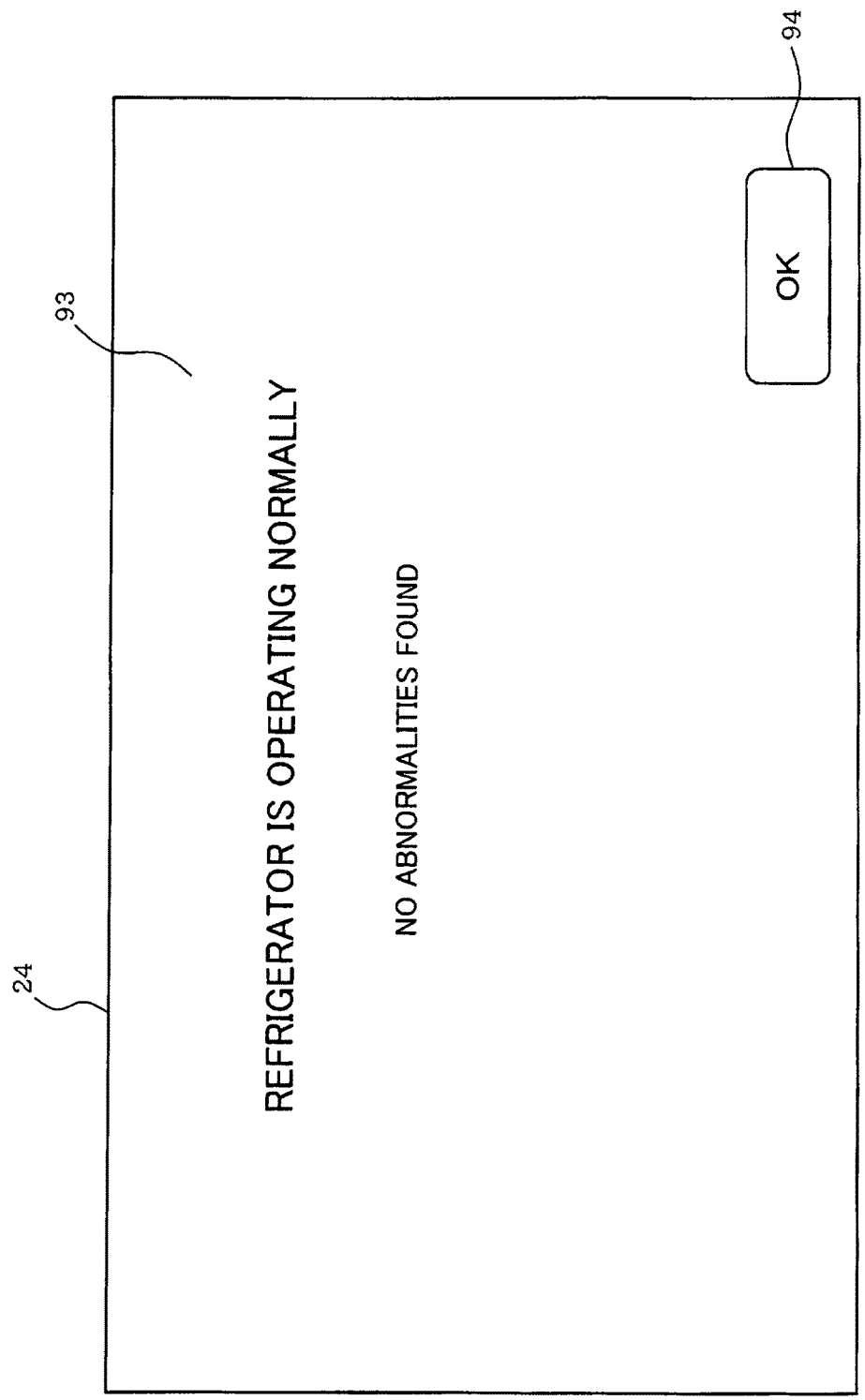

When detecting the operation of the cancel key 92 (step S84: YES) the server 5 proceeds to step S32 of FIG. 21. When the user him/herself has inquired upon the status of the refrigerator 7 using an operation terminal 16, the refrigerator 7 may not be subjected to any errors. Thus, at step S32, the server 5 judges whether or not "0" is assigned to error flag F. When error flag F=0 (step S32: YES), the server 5 makes a judgement that the refrigerator 7 is operating normally since the refrigerator 7 has not encountered any errors. Then, the server 5 instructs the personal computer 1 to display normal operation information in the display region 24 of the liquid crystal display 1b. When receiving instructions from the server 5, the personal computer 1 displays normal operation information 93 in the display region 24 of the liquid crystal display 1b as illustrated in FIG. 34. One example of the normal operation information 93 may be "REFRIGERATOR IS OPERATING NORMALLY. NO ABNORMALITIES FOUND". The personal computer 1 displays an OK key 94 on the screen where the normal operation information 93 is displayed. After detecting the operation of the OK key 94, the server 5 terminates the series of processes (END in FIG. 21).

In the fourth embodiment, the specific advice such has the light severity advice 81, the moderate severity advice 82, the error support advice 83, and the heavy severity advice 91 displayed on the liquid crystal display 1b of the personal computer 1 includes failure forecast information indicating the failure which may occur in the future that is predicted from the current state of the refrigerator 7. Thus, by viewing the failure forecast information, the user is given a foreknowledge of the failures that may occur in the future before the refrigerator 7 actually encounters such failures. The user is thus, allowed to prepare for such failures. The specific advice 81, 82, 83, and 91 each includes tips for the user in addressing failures which are expected to occur in the future based on the current state of the refrigerator 7. Reference to such tips facilitates the user's decision making in coping with the failures. These advantages improve user friendliness.

The severity of the errors are classified into 3 levels, namely, "light", "moderate", and "heavy" and the failure forecast information varies depending upon the severity. For example, when the severity is "light", the failure forecast information may advise that "DOOR IS LEFT OPEN FOR A LONG TIME" and provide a "light" warning to the user. When the severity is "moderate", the failure forecast information may advise "POSSIBLE REFRIGERATION CYCLE FAILURE" and provide a "moderate" warning to the user. When the severity is "heavy", the failure forecast information may advise "COMPRESSOR FAILURE" and provide a "heavy" warning to the user.

Accordingly, it is possible for the user to evaluate the severity of the failure based on the failure forecast information and obtain an objective outlook on the seriousness of the failure. It is thus, possible for the user to act more appropriately against the error encountered by the refrigerator 7 depending upon the severity of the error. User friendliness is thereby improved. It further easier for the user to judge whether the error encountered by the refrigerator 7 is recoverable by the user or should be sent for repair depending upon the severity of the error. It is thus, possible to reduce unnecessary repair requests.

When the severity of the error is "moderate", the personal computer 1 displays the repair request key 74 for requesting repair on the screen where the error, support advice 83, being one example of a specific advice, is displayed, as illustrated in FIG. 29. When the severity of the error is "heavy", the personal computer 1 displays the repair request key 74 on the screen where the heavy severity advice 91, being one example of a specific advice, is displayed, as illustrated in FIG. 33. It is thus, possible for the user to promptly request repair to the repair reception 62 by simply operating the repair request key 74 when repair is needed. As a result, it is possible for the user to promptly act against failures that require repair and thereby improve user friendliness.

When the severity of the error is "light" on the other hand, the personal computer 1 does not display the repair request key 74 on the screen where the light severity advice 81, being one example of a specific advice, is displayed. It is thus, possible to prevent the user from requesting unnecessary repair when the refrigerator 7 encounters a light severity error, i.e., a minor error that does not require repair.

When the severity of the error is "moderate", the personal computer 1 displays the repair request key 74 on the screen where the error support advice 83, being one example of a specific advice, is displayed, as illustrated in FIG. 29 when the user operates the support key 72 illustrated in FIG. 28. In other words, when the severity of the error is "moderate", the personal computer 1 displays the repair request key 74 on the screen where the error support advice 83 is displayed when requested by the user. It is thus, possible for the user to first take recovery measures by him/herself when encountering the moderate severity advice 82 illustrated in FIG. 28. If the error is not recovered by the user's recovery measures, the user may operate the support key 72 to display the repair request key 74 on the liquid crystal display 1b. It is possible to promptly request repair by operating the repair request key 74. It is thus, possible to improve user friendliness.

When detecting user operation of the repair request key 74, the communication control circuit 23 acquires data detailing the failure encountered by the refrigerator 7. Then, the communication control circuit 23 transmits the elaborate failure data to the repair reception 62 configured to receive repair requests of the refrigerator 7 through the communication line. It is thus, possible for the repair reception 62 to acquire precise information on the failures encountered by the refrigerator 7 by referring to the failure data received from the refrigerator 7. As a result, it is possible for the repair reception 62 to take prompt and appropriate measures in repairing the refrigerator 7. Further, the user is no longer required to explain the details of the failures encountered by the refrigerator 7 to the operator of the repair reception 62 when requesting for repair. This reduces the burden on the part of the user and thus, improves user friendliness.

As illustrated in FIG. 29, the personal computer 1 displays the purchase support key 75 on the screen where the error support advice 83, being one example of the specific advice, is displayed. The purchase support key 75 displays information pertaining to the purchasing of home appliance, which is a refrigerator in this example. As further illustrated in FIG. 33, the personal computer 1 displays the purchase support key 75 on the screen where the heavy severity advice 91, being one example of the specific advice, is displayed. It is thus, possible for the user to obtain useful information when purchasing a new refrigerator. User friendliness is thereby improved.

The information pertaining to the purchasing of home appliance, which is a refrigerator in this example, include a link to the website of the direct retailer of the manufacturer of the refrigerator 7 and a link to the website of a general home appliance volume retailer. It is thus, possible for the user to browse the websites of the home appliance retailers without having to search the web. User friendliness is thereby improved. If the viewed website belongs to the direct retailer of the manufacturer of the refrigerator 7, the user's familiarity with the manufacturer may drive the purchase from the website.

When the replacement purchase information key 87 is operated, the personal computer 1 displays the replacement purchase information 89 on the liquid crystal display 1b as information which may be helpful when buying a new refrigerator. It is thus, possible for the user to readily obtain useful information when buying new refrigerator. User friendliness is thus, improved.

Other Embodiments

In each of the foregoing embodiments, the specific advice was primarily described through a refrigerator application. The specific advice may be customized for the targeted home appliance. In each of the foregoing embodiments, the specific advice was configured to be displayed on the liquid crystal display 1b of the personal computer 1 or the liquid crystal display 6a of the high-end mobile phone 6. Alternatively, the specific advice may be provided by sending an e-mail to from the server 5 to the personal computer 1 or the high-end mobile phone 6.

The server 5 may be configured to provide a specific advice by either e-mailing the advice to a predetermined e-mail address or by displaying the advice on the liquid crystal display 1b/6a depending upon the severity or importance of the advice. Still alternatively, the server 5 may be configured to provide the specific advice by employing both of the foregoing methods. For example, the server 5 may only display the specific advice on the liquid crystal display 1b/6a if the severity or the importance of the specific advice is low. The server 5, on the other hand, may display the specific advice on the liquid crystal display 1b/6a as well as send the specific advice by e-mail if the severity or the importance of the specific advice is high.

According to such configuration, the user is allowed to be promptly informed of the failure by reading the e-mail even when the home appliance experiences a significant failure, etc. when the personal computer 1 or the high-end mobile phone 6 is turned OFF. If the failure is insignificant, an e-mail will not be sent, and thus, the user will not be required to check his/her e-mails for minor errors. Alternatively, the personal computer 1 or the high-end mobile phone 6 may be configured to select whether or not to display the specific advice on the liquid crystal display 1b/6a depending upon the severity or the importance of the specific advice received from the server 5.

The specific advice may be displayed on the display device provided to the home appliance. In such case, the displaying and e-mailing of the specific advice may be performed in concert with the display device provided to the home appliance. For example, the server 5 may instruct the refrigerator 7 to display the control panel 9 abnormally by flickering the control panel 9 when displaying the specific advice. It is thus, possible for the user to be informed that the specific advice is being displayed on the communication terminal 1/6 by looking at the control panel 9 of the refrigerator 7. That is, the server 5 provides an alert to the user that the specific advice has been displayed on the communication terminal 1/6 by way of the control panel 9. It is thus, possible to prevent the user from forgetting to view the specific advice as much as possible.

Figure 35:
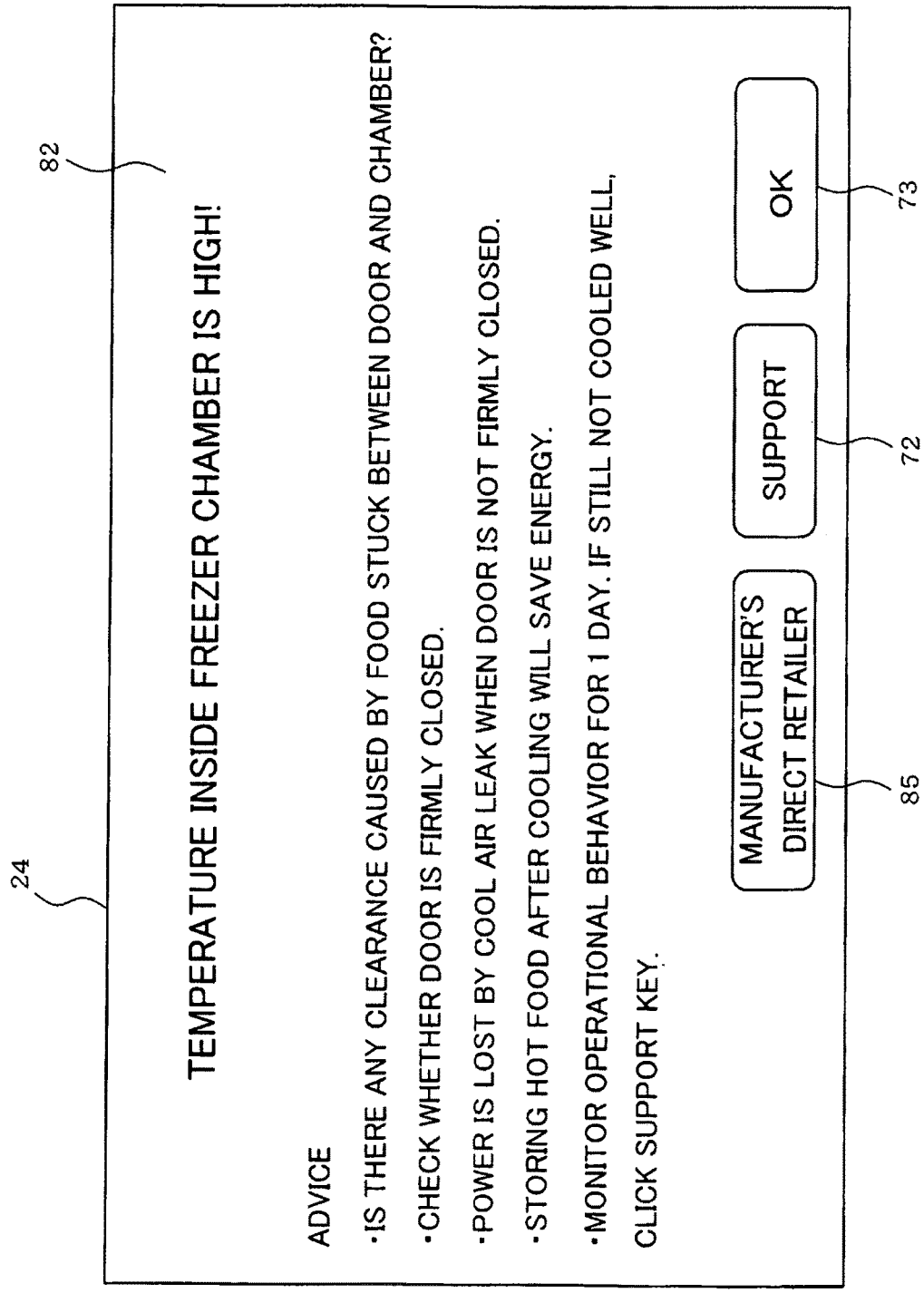

As illustrated in FIG. 35, the personal computer 1 may be configured to display the retailer's site key, for displaying the website of the home appliance retailer of the refrigerator, on the screen where the error support advice 83, being one example of the specific advice, is displayed. The retailer's site key may be the direct retailer's site key 85 for example. This will also be convenient for the user since the user will not be required to search for the website of the home appliance retailer when for example, a moderate severity error has occurred.

When another error (hereinafter referred to as the latter error) is detected while a specific advice based on an error of the refrigerator 7 detected earlier (hereinafter referred to as the earlier error) is being displayed on the liquid crystal display 1b of the personal computer 1, the server 5 may newly display a specific advice based on the latter error on the liquid crystal display 1b. If the severity of the latter error is higher than the earlier error, the personal computer 1 displays the specific advice based on the latter error on the liquid crystal display 1b so as to replace the specific advice based on the earlier error. On the other hand, if the severity of the latter error is less than the earlier error, the personal computer 1 continues the display of the specific advice based on the earlier error and refrains from displaying the specific advice based on the latter error.

When the later error is detected while the specific advice based on the earlier error is being displayed on the liquid crystal display 1b, the server 5 may display the specific advice based on the earlier error and the specific advice based on the later error on the same screen. It is thus, possible for the user to view every error currently occurring in the refrigerator 7.

When detecting both an error pertaining to the refrigeration chamber and an error pertaining to the freezer chamber, the server 5 may prioritize the display of the specific advice based on the error pertaining to the freezer chamber on the liquid crystal display 1b of the personal computer 1. It is thus, possible for the user to promptly act against the error of the freezer chamber which belongs to a lower temperature zone and which is more prone to be affected by failures.

The replacement purchase information 89 indicated in FIG. 32 may include information on installation space of the refrigerator 7 being presented. The installation space in this example indicates the installation area and the installation height. The server 5 is configured to prioritize the display of refrigerators capable of being installed in an installation space equal to or less than the installation space of the refrigerator 7 currently being used in the display region 24. It is thus, possible for the user to purchase a replacement refrigerator without having to measure the installation area and the installation height of the refrigerator. User friendliness is thus, improved.

In such case, a measurement device such as an infrared sensor capable of measuring distances may be provided to the refrigerator 7. The measurement device of the refrigerator 7 is configured to measure the installation area and the installation height with consideration to the walls, the ceiling, and furniture located around the refrigerator 7 and transmits result of measurement to the server 5. The server 5 may be configured to select, based on the result of measurement, a refrigerator capable of being installed in the location where the refrigerator 7 is currently installed as a choice of purchase.

The refrigerator 7 may be configured to store information such as its product serial number, model number, etc. as follows. The server 5 is provided with a database of information pertaining to installation area classified by product serial number or model number. The server 5 acquires the product serial number or the model number of the refrigerator 7 from the refrigerator 7. The server 5 acquires information pertaining to the installation space of the refrigerator 7 from the database based on the product serial number or the model number acquired from the refrigerator 7. Based on the acquired information, server 5 selects refrigerators that are capable of being installed in the installation space as choices of purchase. Alternatively, the refrigerator 7 may be configured to store information on its installation space instead of its produce serial number or model number. In such case, the server 5 need not provided with a database of information pertaining to installation space.

Further, the replacement purchase information 89 may include information for recommending models that open in the same way, such a double door arrangement or a rightwardly-opening single door arrangement, as the currently used refrigerator 7. It is thus, possible for the user to enjoy similar usability after the refrigerator 7 is replaced. User friendliness is thus, improved.

Figure 37:
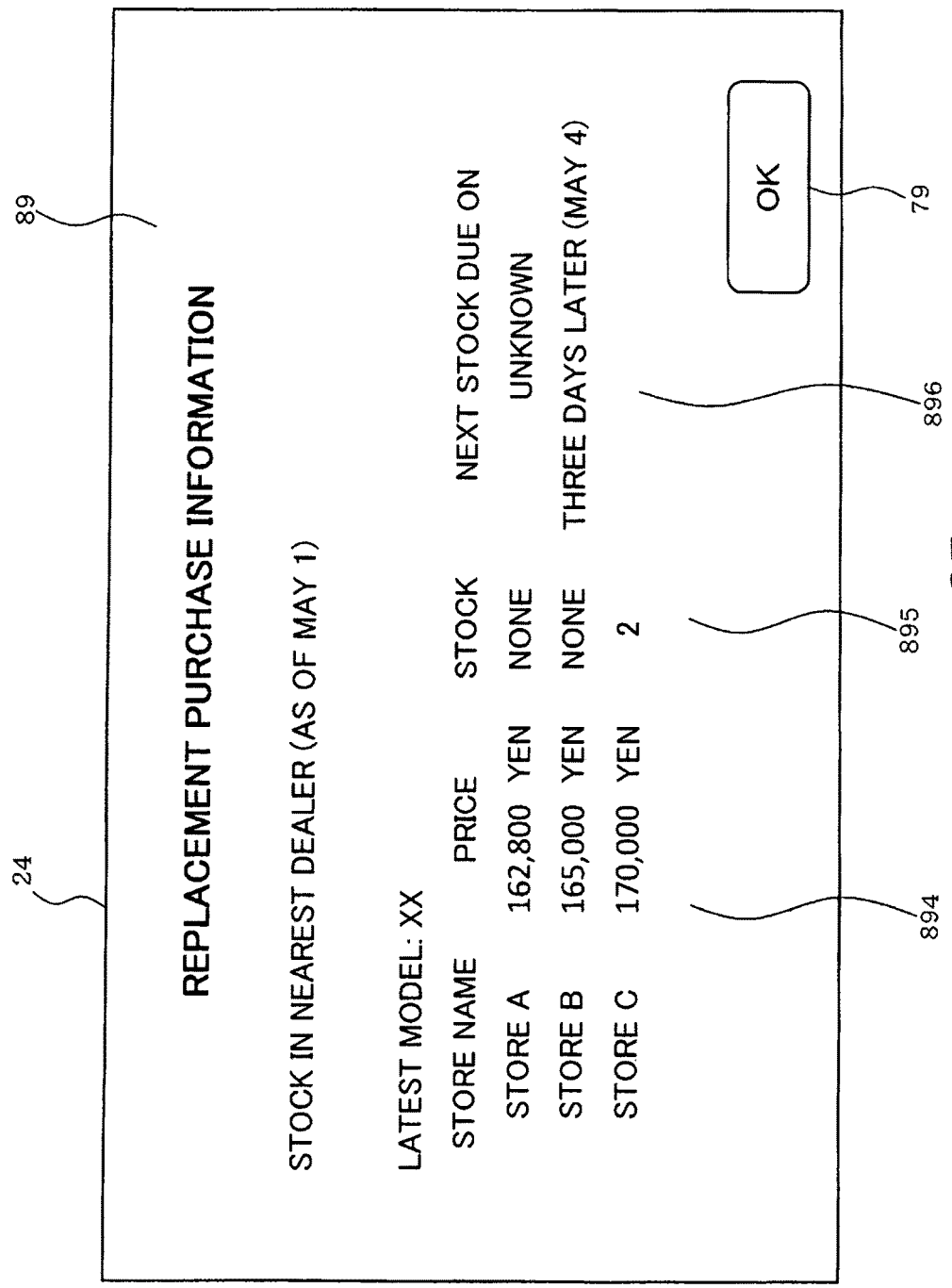

The replacement purchase information 89 may include price information 894, stock information 895, and next stock availability information 896 for example as illustrated in FIG. 37. The price information 894 indicates the price of the recommended product in each of the retailers. Displaying of the price information 894 is convenient for the user since the user is allowed to easily check the prices of the product. The stock information 895 indicates the presence/absence of stock of the recommended product in nearby retailers. Displaying the stock information 895 allows the user to easily check the stock in the nearby retailers. It is convenient for the user since the user does not have to wastefully visit a retailer which is out of stock. The next stock availability information 896 provides an estimate in the number of days required for purchasing a replacement based on the stock information. The next stock availability information 896 provides the number of days required for the next stock availability or the date of the next stock availability when the retailers are out of stock. This is convenient for the user as the user will be able easily predict the number of days required in buying a replacement in the nearby retailers from the next stock availability information 896.

The server 5 may be configured to display the price information 894, the stock information 895, and the next stock availability information 896 of multiple stores and models on the same screen. This is convenient for the user since the user is allowed to compare the price information 894, the stock information 895, and the next stock availability information 896 of multiple stores and models at once. The price information 894, the stock information 895, or the next stock availability information 896 of the retailers may be arranged in ascending or descending order. This is convenient for the user since the user is allowed to easily find the retailer offering the lowest price when the price information 894 of the retailers is arranged for example in the ascending order, in other words, from the retailer offering the lowest price.

Still referring to the purchase replacement information 89, the server 5 may be configured to display the stock information of multiple retailers and multiple models on the same screen for example as illustrated in FIG. 38. In other words, the server 5 may be configured to display the stock information 895 of the latest model and the stock information 895 of the popular model next to one another for each of the retailers. This is convenient for the user since it provides an easy comparison of the retailers and models.

The replacement purchase information 89 may include information on the sales of the recommended home appliance as exemplified by sales information 897 indicating how many of the recommended home appliance is being sold as illustrated for example in FIG. 39. The sales information 897 includes the numbers of recommended products sold, the ranks of sales calculated from the numbers sold, and comments and reviews posted by the purchasers. It thus, possible for the user to consider purchasing the product with knowledge of the popularity of the recommended product. By having access to comments and reviews posted by those who have actually purchased and used the recommended product, the user will benefit from reading such posts and also will be able to predict that the product with greater number of posts have sold more. Thus, the content and the number of posts of such reviews are important sources for making buying decisions.

Figure 40:
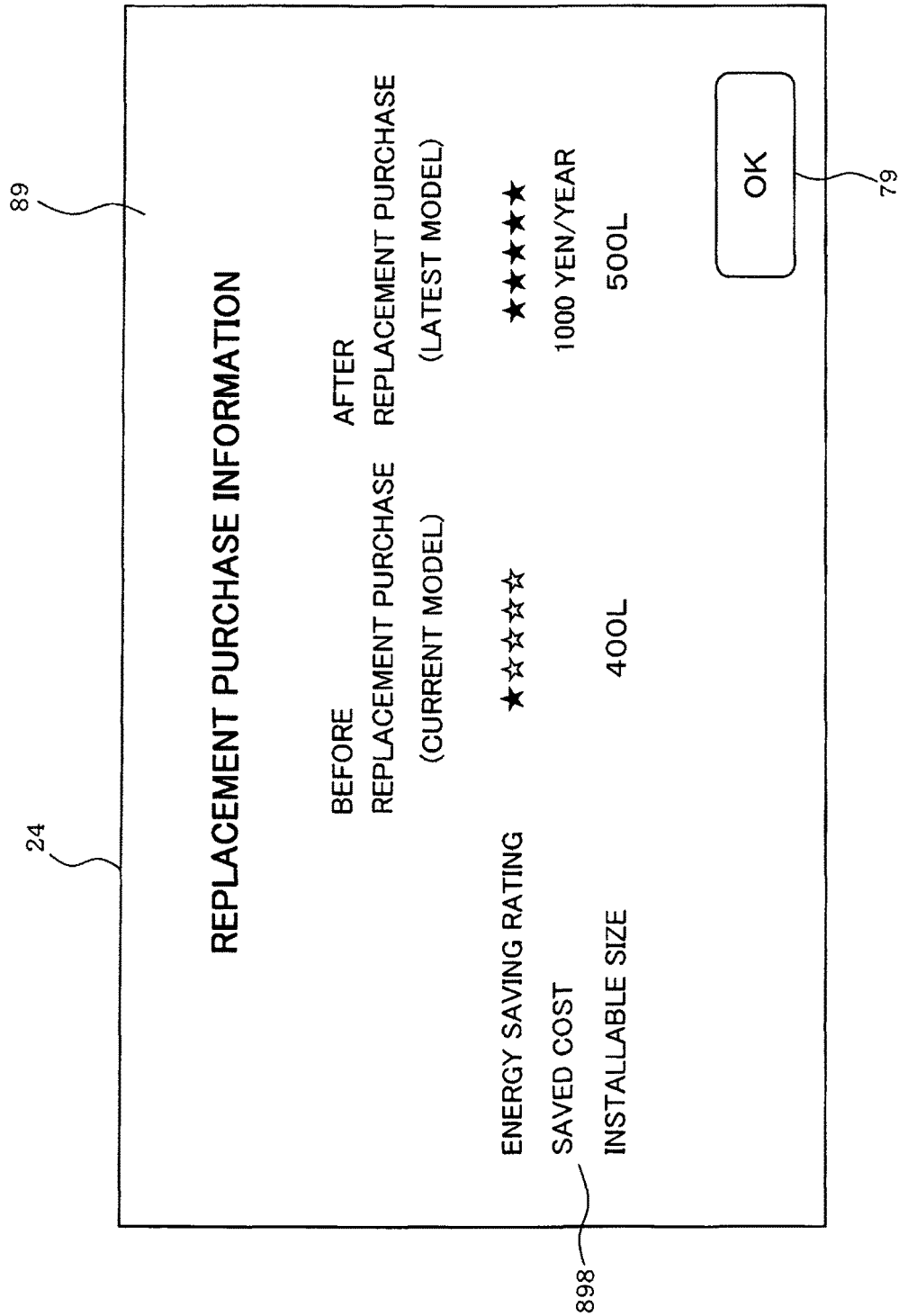

Further, the replacement purchase information 89 may include information 898 useful for the user when comparing the old model with the latest model as illustrated in FIG. 40. In such case information 898 is information encouraging replacement of the home appliance and presents advantages of replacing the home appliance. For example, information 898 may indicate the difference of electric power consumption between the refrigerator 7 currently being used and the refrigerator of the latest model by the deficit in terms of the amount of electric power or by the deficit in terms of monetary cost. Such information will leave a strong impression of energy and consequently cost saved by the replacement to the latest model and thereby encourage the user to buy a replacement. Information 898 may include information on the difference of storage volume and quietness between the refrigerator 7 currently being used and the recommended product. Information 898 need not be a comparison with the latest model but may be information concerning power consumption and years of service of the refrigerator 7 currently being used.

The replacement purchase information 89 may include information that introduces new functions that are not provided in the refrigerator 7 currently being used. This improves user friendliness and encourages the user to purchase a replacement since the user is allowed to readily learn the latest features provided in the latest model.

Figure 41:
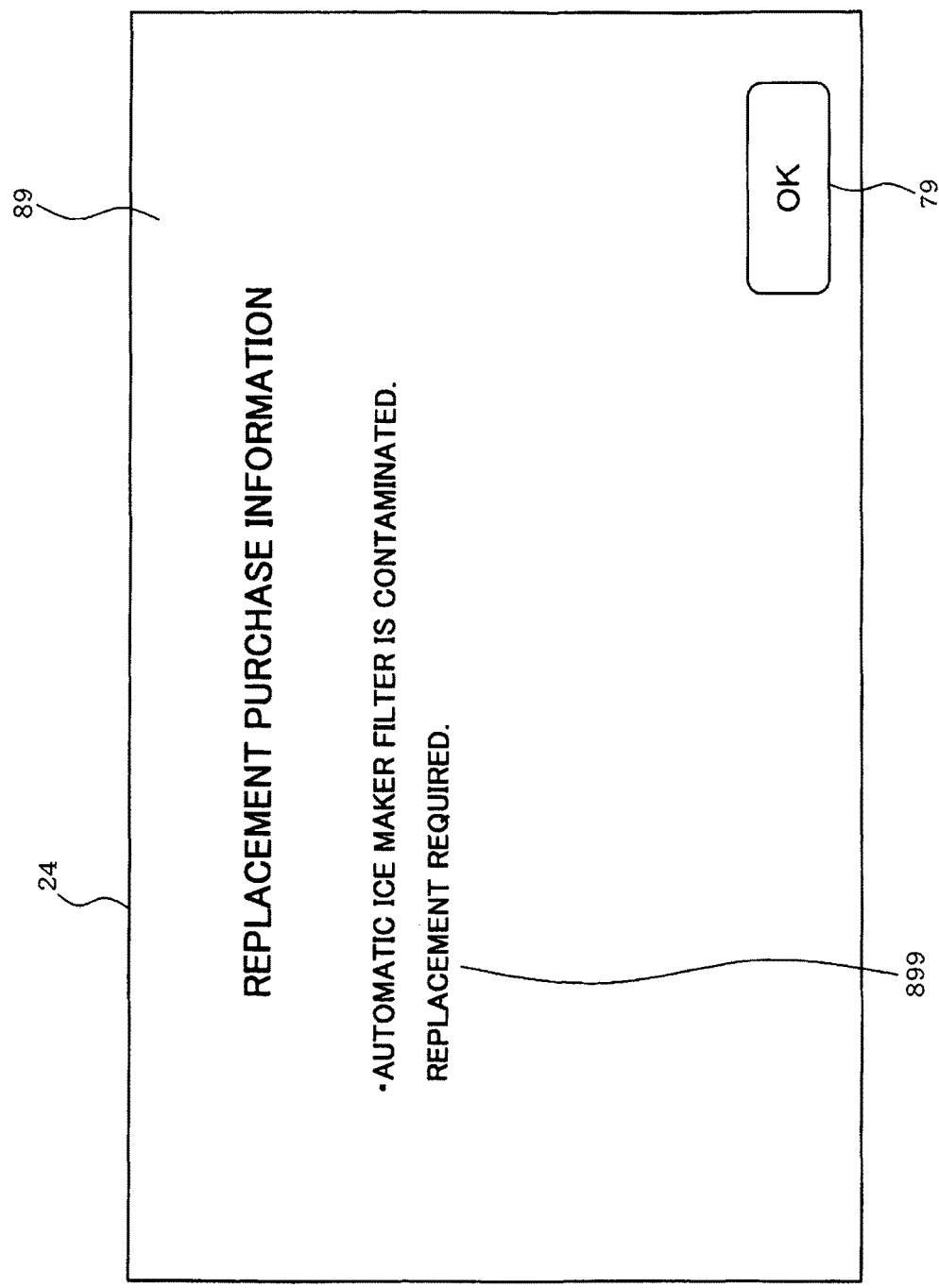
FIG. 41 illustrates a screen displaying replacement purchase information.

Further, the replacement information 89 may include information pertaining to consumables provided with the home appliance, that is, information 899 for purchasing consumables provided with the home appliance as illustrated in FIG. 41 in addition to information for purchasing a replacement for the refrigerator main unit, i.e. the home appliance main unit. Information 899 is information for encouraging purchasing of a replacement of consumables for the home appliance. It is thus, possible for the user to replace the consumables before the performance of the home appliance is degraded due to deterioration of the consumables. The user is thus, prevented from using a home appliance which is significantly reduced in performance caused by deterioration of the consumables. According to such configuration, when the performance of the home appliance is degraded due to deterioration of the consumables provided with the home appliance, the user is allowed to recover the performance of the home appliance by repairing or replacing the consumables instead of having to repair or replace the home appliance main unit. It is thus, possible to recover the original performance of the home appliance in low cost and less time.

When the severity of the error is "heavy", the server 5 may be configured to display information for prompting the user to buy a replacement of the home appliance that may read "REPLACEMENT PURCHASE OF THE REFRIGERATOR IS RECOMMENDED" instead of displaying the repair request key 74 on the same screen as the heavy severity advice 91 as illustrated in FIG. 33. Heavy severity failures usually take time and cost for repairing. Thus, a message recommending purchasing of a replacement is displayed to encourage the user to purchase a replacement in case the failure is a heavy severity failure, in which case, the user is allowed to save up on unnecessary time and cost required for repair by purchasing a replacement without requesting unnecessary repair.

Figure 42:
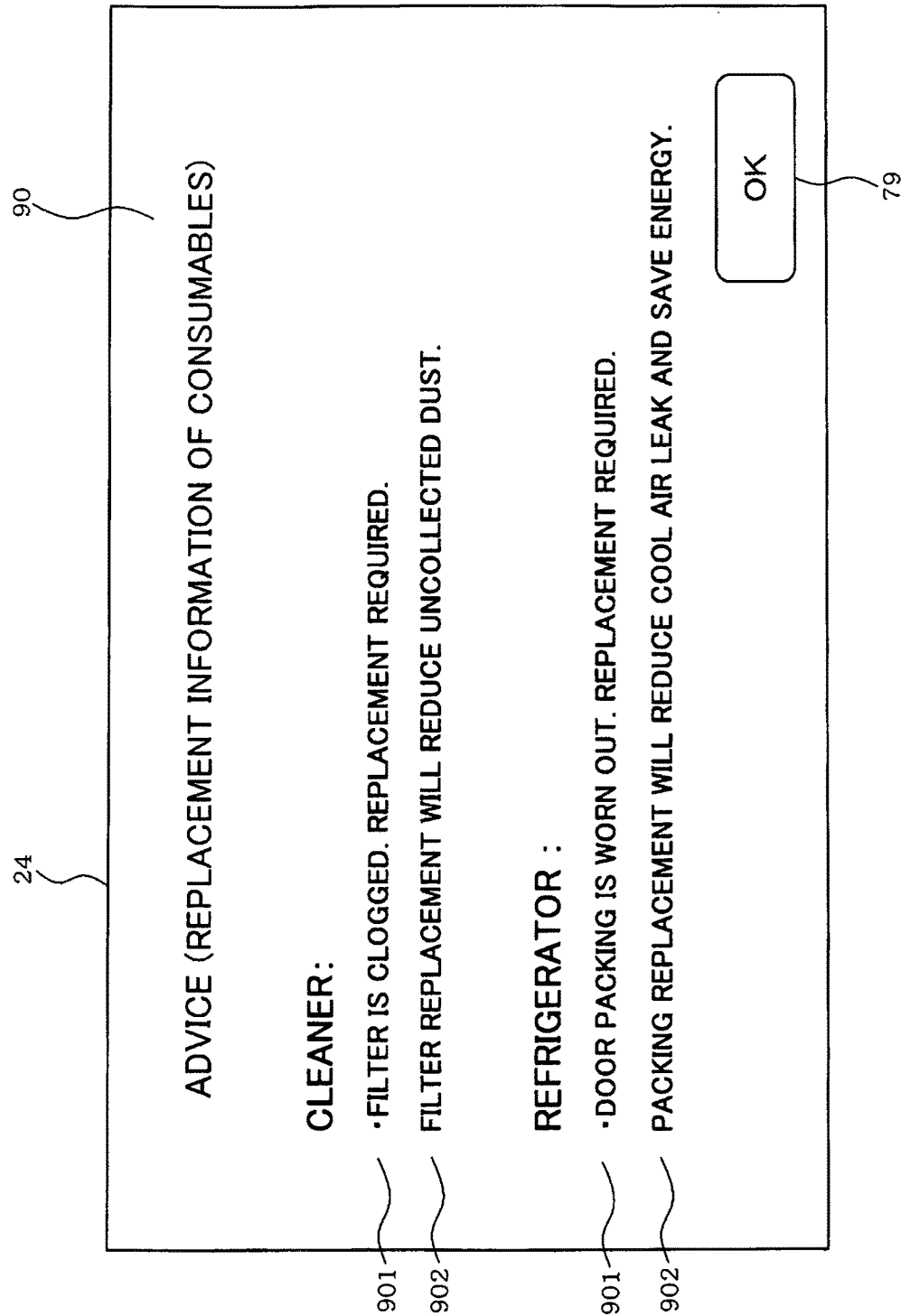
FIG. 42 illustrates a screen displaying consumable replacement information.

The server 5 may be configured to provide information as to whether or not a replacement of the consumables used in the home appliance is required. That is, the server 5 may display a specific advice including consumables replacement information 90 pertaining to replacement of consumables of the home appliance in the display region 24 as illustrated in FIG. 42. The OK key 79 is also displayed on the same screen as the consumables replacement information 90. The consumables replacement information 90 includes information 901 encouraging replacement of consumables of the home appliance and information 902 indicating the advantages obtained by replacing the consumables.

If the home appliance concerned is a cleaner for example and the filter attached to the cleaner is clogged, information 901 is a message indicating that the filter, being a consumable in this case, needs to be replaced and information 902 is a message indicating that uncollected dust can be reduced by replacing the filter. If the home appliance concerned is a refrigerator for example and the packing sealing the fridge interior is worn out, information 901 is a message indicating that the packing, being a consumable in this case, needs to be replaced and information 902 is a message indicating that cool air leak can be reduced and energy can be saved by replacing the packing. If the home appliance concerned is a battery for example and there is little charge in the battery, information 901 is a message indicating that the battery, being a consumable in this case, needs to be replaced and information 902 is a message indicating that the run time can be extended by replacing the battery.

This is convenient for the user since the user will readily notice when the consumables need to be replaced. The user will further recognize the advantages of replacing the consumables and be prompted to replace the consumables before they are exhausted. The degree of consumption of these consumables may be judged based on number of years elapsed or service time elapsed from the purchase of the home appliance. The home appliance may be provided with a sensor configured to detect the degree of consumption of the consumables. The server 5 may be configured to judge the degree of consumption based on the result of detection of the sensor. In such case, the degree of consumption may be judged by the home appliance.

Seasonal products such as air conditioners and fans mostly used during summer or heating equipment mostly used during winter and air purifiers used frequently in hay fever seasons are not used constantly throughout the year and may not be used for long time in a specific time of year. When starting the operation of such home appliances, for example, when power is supplied to the home appliance and becomes communicable with the server 5, the server 5 may be configured to detect the presence/absence of failure in the home appliance and report the outcome. The detection of the presence/absence of failure may be carried out by the home appliance. When a "heavy" failure or failure which may develop into a heavy failure has been found in the home appliance in the detection of presence/absence of failures performed prior to the start of operation of the home appliance, a message is displayed to prompt repair or purchase a replacement.

Even in home appliances such a washing machine which is expected to be run constantly throughout the year, the server 5 may be configured to perform failure detection and report the outcome before starting the operation of the washing machine if the washing machine has not been used for a long time, e.g. one month. The failure detection may be performed by the home appliance in this case as well.

When there is a long unused period from the last use of the home appliance, a failure may have occurred in the home appliance during such period or a minor failure which has occurred during the last use of the home appliance may have increased its severity. The home appliance is prone to malfunction when its use is restarted in such circumstance. When encountering such malfunctions, it is difficult for the user to judge whether such malfunction originates from misuse or from a failure. It has thus, been difficult for the user to judge whether to repair or replace a malfunctioning home appliance in these cases.

However, by making the server 5 perform error detection prior to the start of operation of the home appliance and report the outcome to the user, the user is allowed to readily judge whether or not the home appliance is experiencing failure, in other words, whether or not the home appliance is in a usable state. Thus, even when the home appliance malfunctions, the user can easily judge whether to repair or replace the home appliance. When there is a failure in the home appliance, the user is promptly notified to that effect and thus, is capable of promptly requesting repair or proceeding to buy a replacement.

The server 5 may be configured to display multiple pieces of advice directed to multiple home appliances such as a refrigerator, washing machine, and air conditioner, in the same display region 24. Home appliances used throughout the year such as refrigerators and air conditioners are used more frequently in summer when the temperature is high compared to winter when the temperature is low. Thus, load on refrigerators and air conditioners tend be higher in summer which increases the risk of failures during the summer time. When a failure occurs in the refrigerator during the summer time, the temperature inside the refrigerator is elevated and things stored in the refrigerator become spoiled in a short time span. Similarly, when a failure occurs in the refrigerator during the summer time, it is inconvenient for the user as the user is forced stay in a room in which the temperature is high. Thus, failures of home appliances such as refrigerators and air conditioners have greater impact on the user in summer than in winter.

Thus, the server 5 may be provided with a calendar feature configured to acquire seasonal information based for example on year, month, and day. In other words, the server 5 may be provided with a time information acquiring unit configured to acquire current time information based on year, month, and day. The server 5 may be configured to change the advice to be displayed depending upon the current time information acquired by the time information acquiring unit, that is, depending upon the current season. Further, the server 5 may be configured to display, in the display region 24, an advice pertaining to the failure of the home appliance having significant impact in the current season with priority over other failures. In other words, the server 5 may be configured to change the urgency of the advice depending upon the current season. That is, even when information presented in the failure forecast remains unchanged, the server 5 is configured to set the urgency of failure forecast for refrigerators to be higher in summer or in the season preceding summer compared to winter. It is thus, possible for the user to recognize information pertaining to failures of the home appliance that are prone to occur in the current season and to failures of the home appliance that inflict significant risk as information which needs to be addressed with high urgency.

The home appliance may be provided with a location acquiring unit such as a GPS (Global Positioning System) configured to acquire location information and may be configured to display advice suitable for the region in which the home appliance is being used based on the acquired location information. For example, when an air conditioner is used in regions near the sea, the outdoor unit of the air conditioner will be susceptible to failure caused by salt. In such case, the server 5 is configured to display a message in the display region 24 indicating that failure may have occurred in the outdoor unit of the air conditioner due to salt damage. The performance of the home appliance tends to degrade when installed in regions where failure is prone to occur such as regions near the coast as described above. In such case, the server 5 may be configured to issue the failure forecast information for predicting home appliance failures earlier than the normal timings by reducing the threshold for judging the issue of the failure forecast information. It is sufficient for the home appliance to obtain an approximate location. Thus, the location acquiring unit is not limited to a GPS. The communication control circuit 23 may be used for example as the location acquiring unit. In such case, the communication control circuit 23 can easily acquire the location of the home appliance by acquiring the location information of the access point 2 of the wireless LAN. The location acquiring unit may be request the user to input location information.

Figure 43:
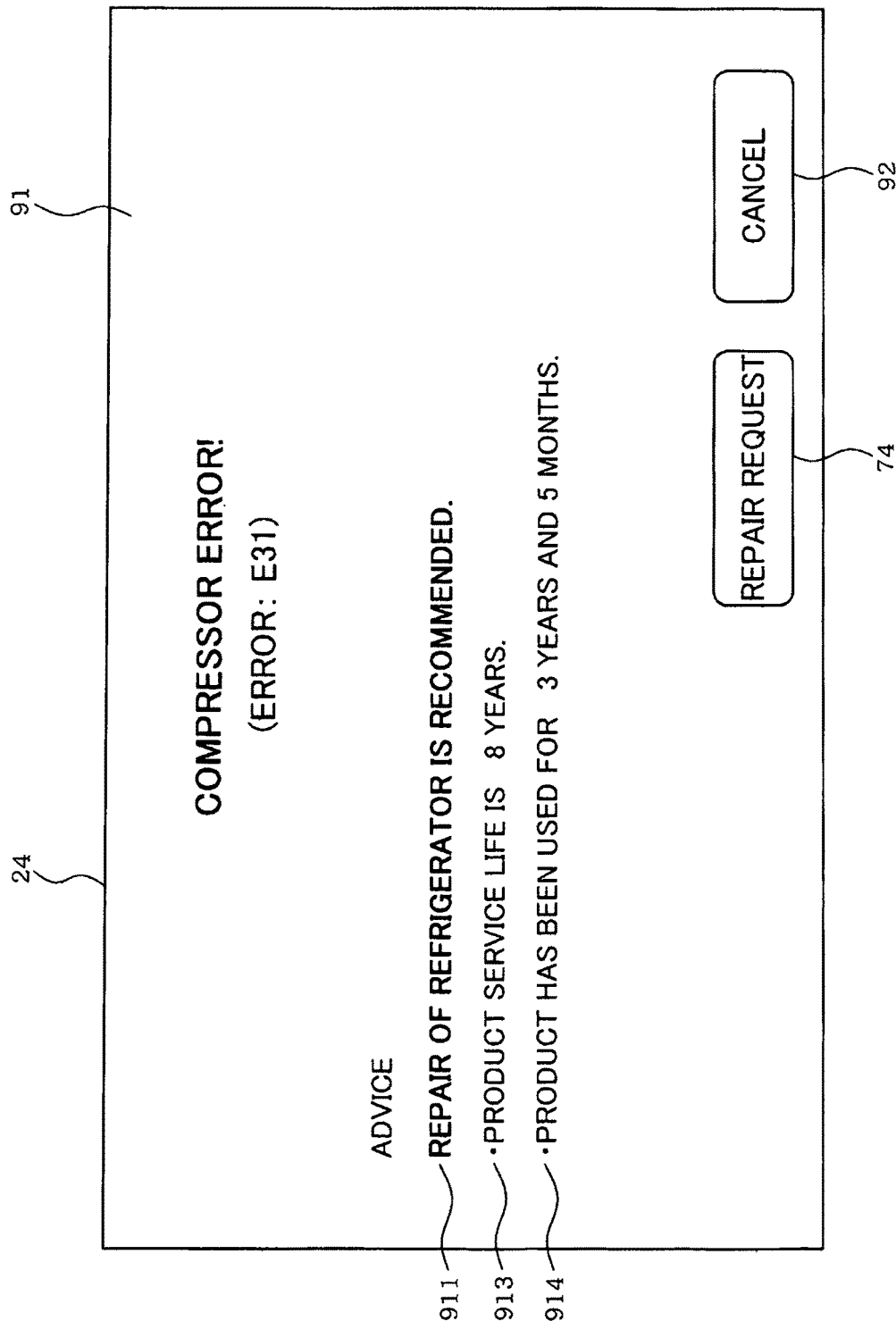
FIG. 43 illustrates a screen displaying a heavy severity advice.
Figure 44:
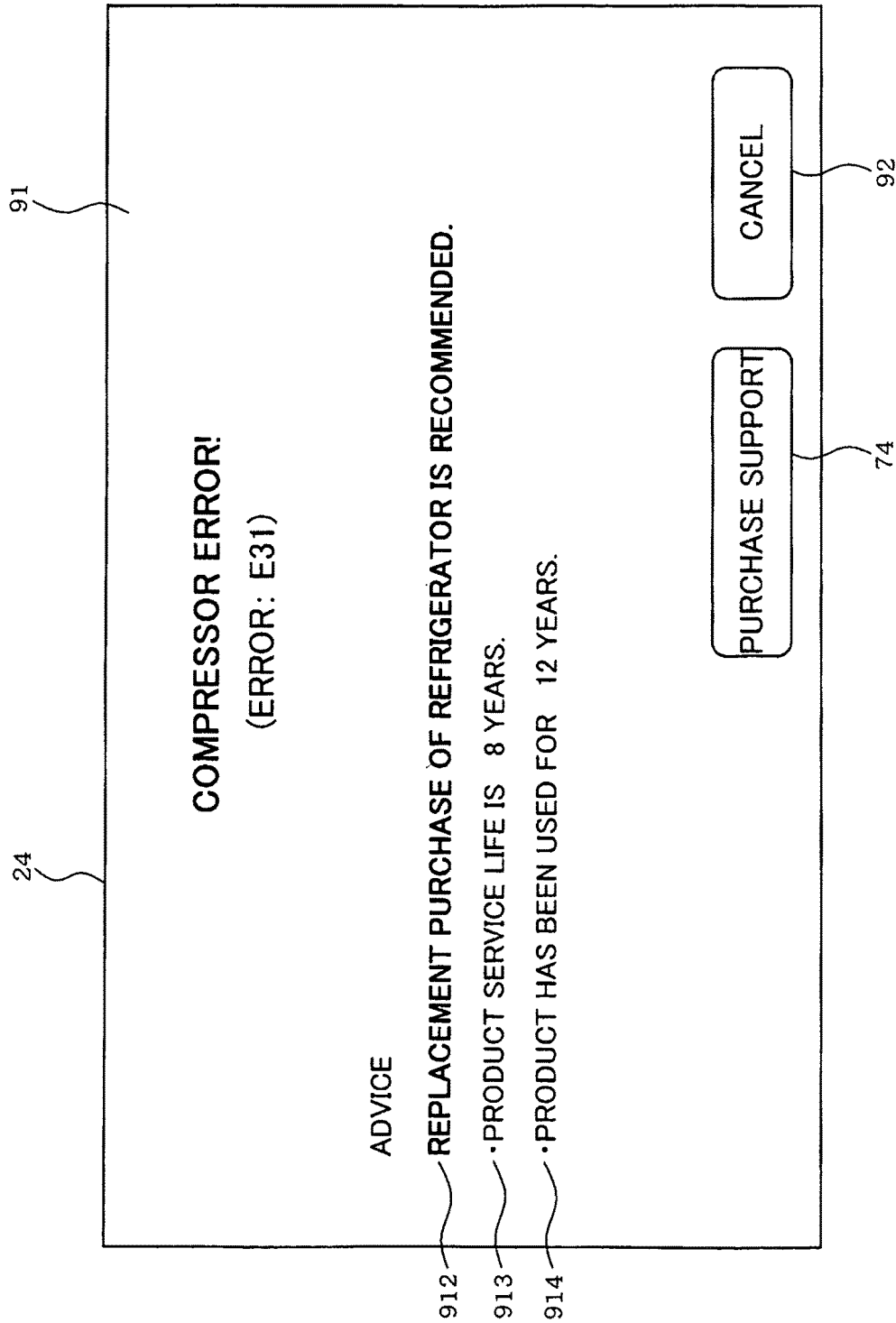
FIG. 44 illustrates a screen displaying a heavy severity advice.

As illustrated in FIGS. 43 and 44, the server 5 may be configured to change the content of the advice to be displayed in the display region 24, in other words, the information to be announced to the user depending upon the duration in which the home appliance has been in service. The advice which is changed depending upon years of service may be displayed for example on the same screen as the heavy severity advice 91. For example, when the home appliance encounters a failure when the years of service up to the present has not exceeded the expected service life preset to the home appliance, the server 5 may display information 911 prompting repair in the display region 24 along with the heavy severity advice 91. On the other hand, when the home appliance encounters a failure when the years of service up to the present has exceeded the expected service life preset to the home appliance, the server 5 may be configured to display information 912 prompting purchasing of a replacement in the display region 24.

This can be explained in more detail through the example of the refrigerator 7. The expected service life of the refrigerator 7 is set to 8 years for example. The refrigerator 7 has been in service up to the present for three years and 5 months for example, which is less than the expected service life of 8 years. In this case, when the refrigerator 7 encounters failure, the server 5 displays information 911 prompting repair along with the heavy severity advice 91 as illustrated in FIG. 43. It is thus, possible for the server 5 to make announcements in the user's point of view and the user is given more beneficial information. The server 5 further displays information 913 pertaining to the expected service life as well as information 914 pertaining to the period in which the refrigerator 7 has been in service on the same screen as information 911 for prompting repair. Accordingly, the user will be presented with evidence in support of prompting repair and can rest assured when requesting repair. The server 5 may further display the repair request key 74 on the same screen as information 911 encouraging repair. This is convenient for the user since, the user is allowed to promptly request repair when needed.

On the other hand, when the refrigerator 7 has encountered an error when the refrigerator 7 has been in service for 12 years for example, which exceeds the expected service life of 8 years, the server 5 displays information 912 prompting purchasing of a replacement in the display region 24 as illustrated in FIG. 44. This will also allow the server 5 to make announcements in the user's point of view and the user is given more beneficial information. The server 5 further displays information 913 pertaining to the expected service life as well as information 914 pertaining to the period in which the refrigerator 7 has been in service on the same screen as information 912 for prompting purchasing a replacement in this case as well. Accordingly, the user will be presented with evidence in support of the prompting purchasing of a replacement and can rest assured when purchasing a replacement. The server 5 may further display the purchase support key 75 on the same screen as information 912 encouraging purchasing a replacement. This is convenient for the user since, the user is allowed to promptly obtain purchase support advice 84 when the user believes that replacement is required.

Figure 45:
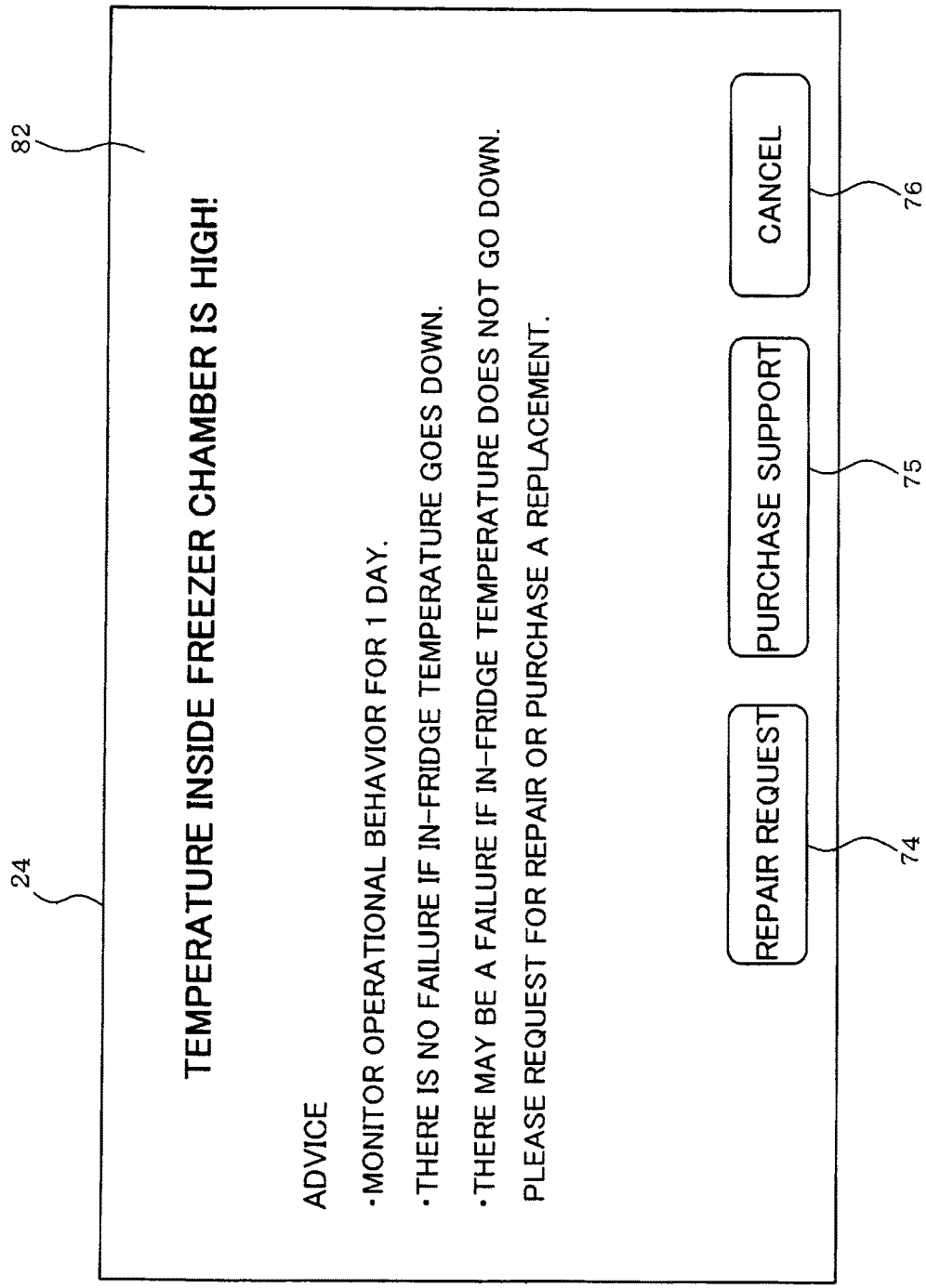
FIG. 45 illustrates a screen displaying a moderate severity advice.

The server 5 may be configured to further inform whether the current symptoms originate from failure or by the user's misuse as illustrated in FIG. 45. The moderate severity advice 82 illustrated in FIG. 45 includes information indicating whether or not the current symptoms of the home appliance can be alleviated by improving the user's usage. More specifically, the server 5 displays a message, etc. indicating that operational behavior should be monitored for a day in the display region 24 along with the moderate level advice 82 as illustrated in FIG. 45, after the user has viewed the advice illustrated for example in FIG. 28. This will clarify the presence/absence of failure and thus, the user is allowed to reliably determine whether or not to continue the use of the home appliance.

Figure 46:
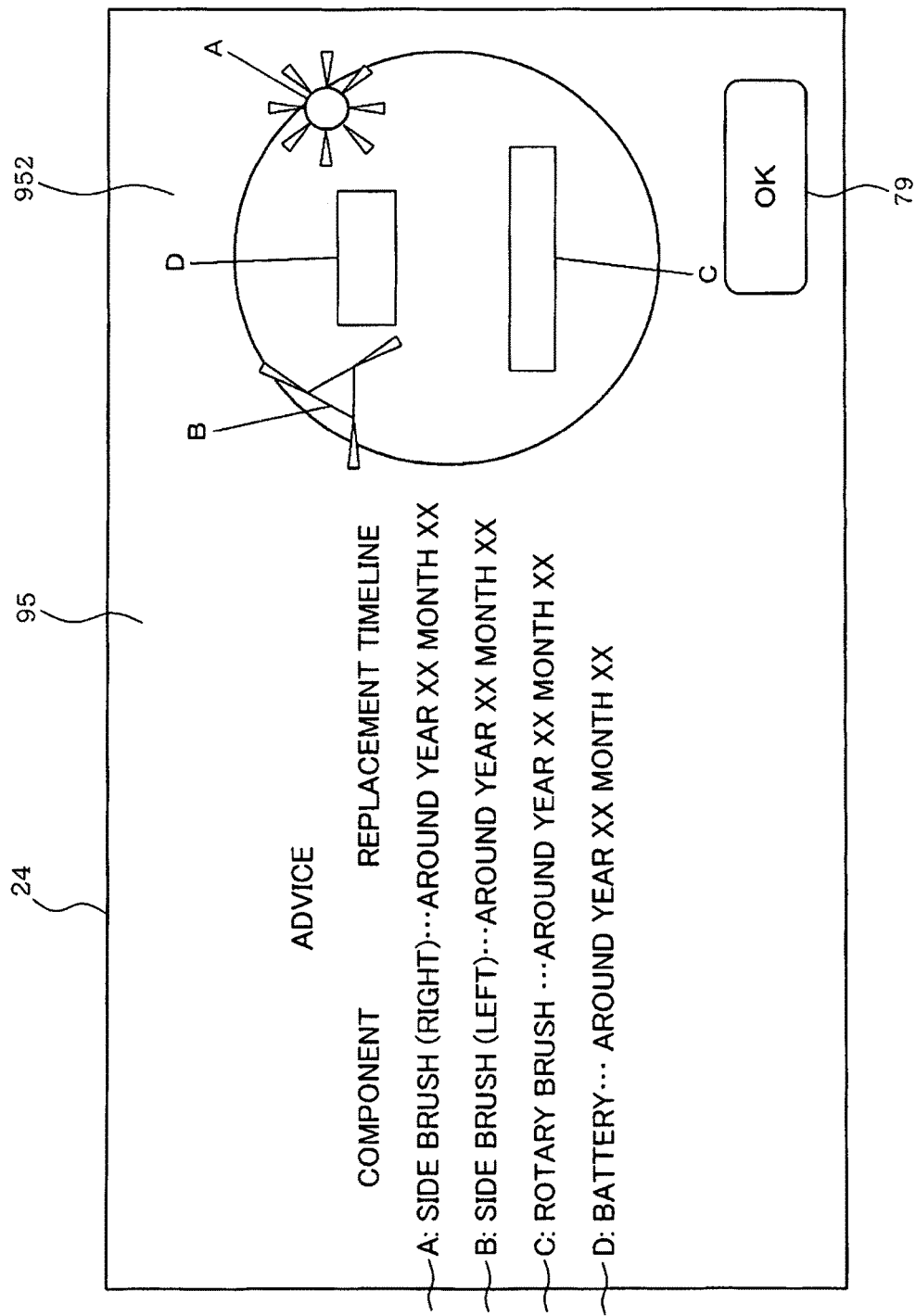
FIG. 46 illustrates a screen displaying information pertaining to repairing and replacing of consumables.

The server 5 may be configured to display information 95 pertaining to repairing and replacing of consumables as a specific advice in the display region 24 as illustrated in FIG. 46. Information 95 includes information 951 indicating when the consumables of concern should be replaced and diagram 952 indicating where in the home appliance the consumable is located. The diagram 952 schematically depicts the targeted home appliance. For example, FIG. 46 illustrates a self-running cleaner which may be known as a robot cleaner. The server 5 displays, as a specific advice, information 951 indicating the names and the replacement timings of each consumable along with diagram 952 illustrating the location where each consumable is provided in the robot cleaner on the same screen. It is thus, possible for the user to know the replacing timing for the consumables at a glance. It is further possible for the user to easily grasp where the consumables requiring replacement is located in the home appliance. Such information is convenient when the user him/herself replaces the consumables. In this example, the OK key 79 is also displayed in the display region 24.

Figure 47:
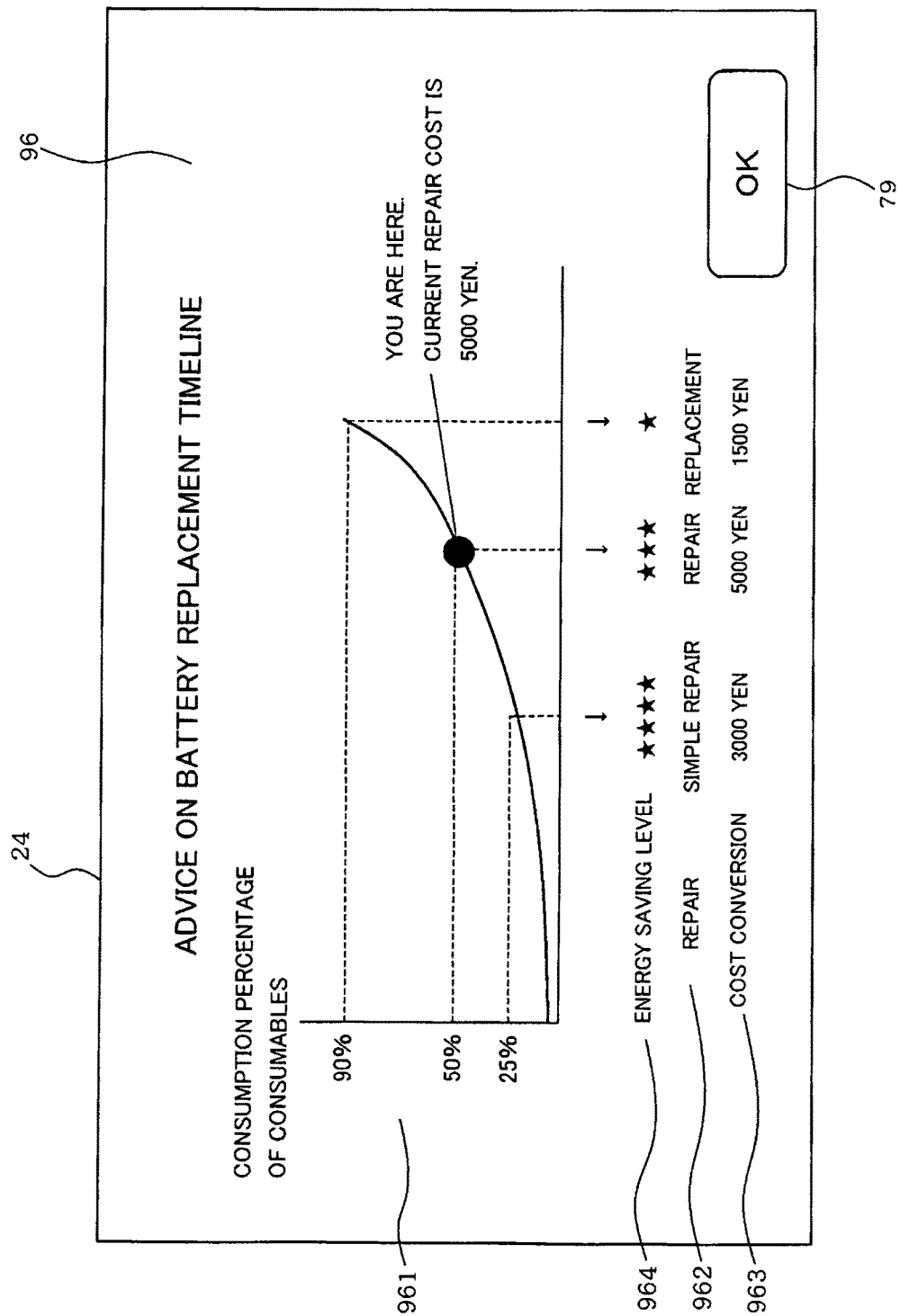
FIG. 47 illustrates a screen displaying information pertaining to the degree of consumption of consumables.

The server 5 may be configured to display, as a specific advice, information 96 pertaining to the consumables provided with the home appliance in the display region 24 as illustrated in FIG. 47. Information 96 may be described as information pertaining to degree of consumption of the consumables. In this case, information 96 is a graph in which period of service is taken along the lateral axis and percentage of consumption of the consumables are taken along the longitudinal axis. For example, the degree of consumption is indicated in multiple steps such as 25%, 50%, and 90%. Information 96 includes a graph 961 presenting estimated degree of consumption of consumables at different given time periods. Stated differently, information 96 indicates the appropriate timing for repairing the home appliance. Information 96 further includes information 962 indicating whether or not the consumable should be replaced at a given point in time or at a given degree of consumption, cost 963 required in replacing or repairing the consumable, and energy saving performance 964 when the consumable is used without being replaced. Cost 963 required in replacing or repairing the consumable is a conversion of degree of consumption of consumables into monetary cost.

This facilitates the user's judgement as to when the consumables should be repaired or replaced since a clear outlook is given on the timing of repairing and replacement of the consumables. Cost 963 is not limited to the cost of consumables but may indicate the repair cost of the home appliance main unit. Information 96 may indicate the degree of consumption of the consumables by converting it into a rating reflective of the current power saving performance, that is, consumed amount of electric power.

It is further possible for the user to set thresholds on the cost of repair and the cost of replacement. The server 5 may be configured to store the user specified threshold and issue an alert informing that the threshold of repair cost has been surpassed when the threshold has been surpassed. It is thus, possible to prevent the costs of repairing and replacing of the consumables from exceeding the preset threshold. This is convenient for the user since the cost of repairing and replacing the consumables can be confined within the projected range.

Figure 48:
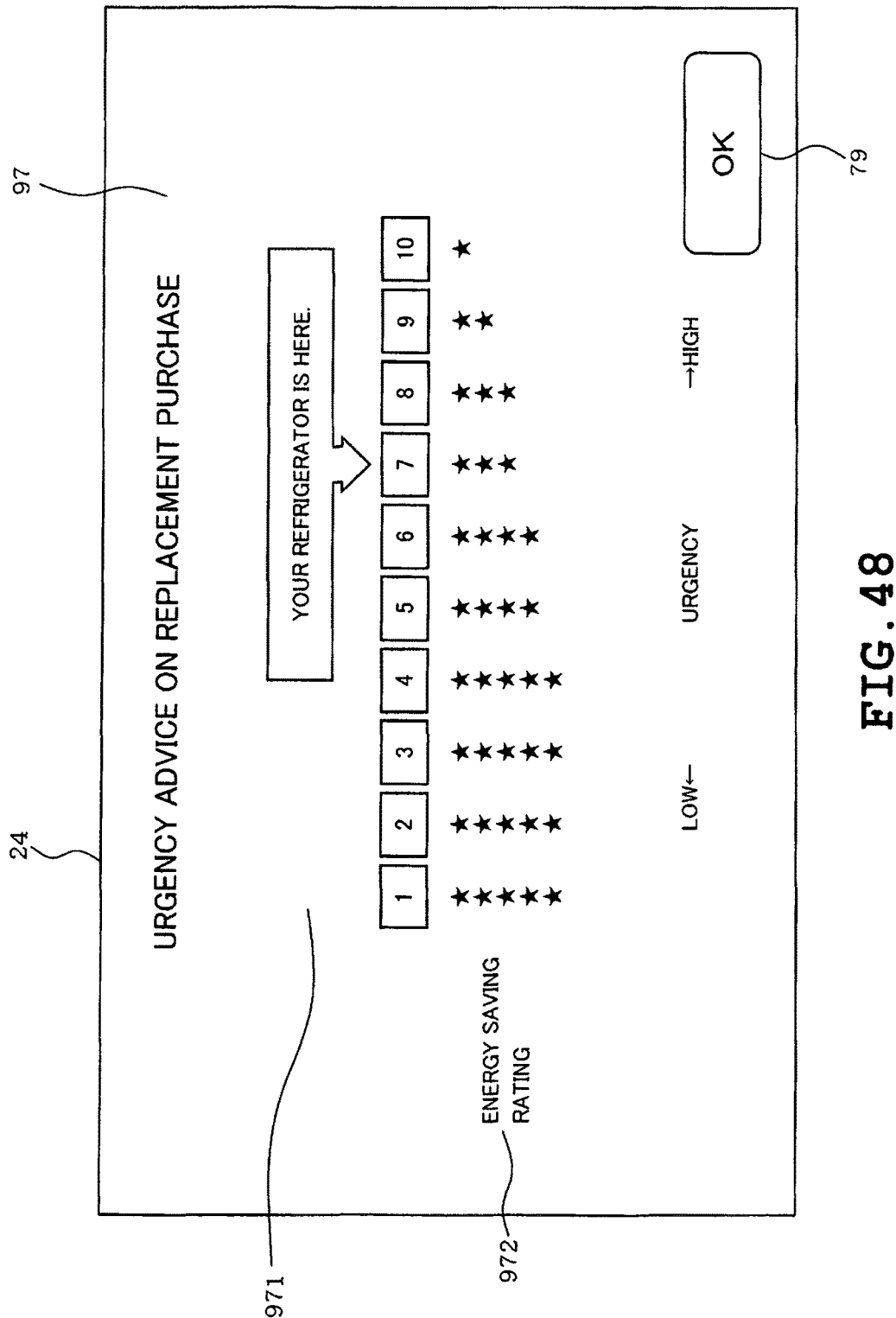
FIG. 48 illustrates a screen displaying information pertaining to urgency of purchasing a replacement.

The server 5 may be configured to display, as a specific advice, information 97 pertaining to the urgency of purchasing a replacement in the display region 24 as illustrated for example in FIG. 48. Information 97 pertains to purchasing of home appliance and informs the user of the timings for purchasing a replacement of the home appliance of concern at different stages. Information 97 includes graph 971 and graph 972. Graph 971 indicates the urgency of replacing the home appliance of concern at different stages. Graph 972 pertains to the amount of electric power consumed by the home appliance at each stage of urgency in graph 971 and is a graph indicating the rating of energy saving performance for example. Graph 971 is drawn so that the urgency of purchasing a replacement of the home appliance of concern becomes higher as the as the likelihood of encountering a heavy error becomes greater. Generally, power saving rating becomes higher as the replacement urgency becomes lower and power saving rating becomes lower as the replacement urgency becomes higher. The urgency of purchasing a replacement can be judged based on the time period in which the home appliance has been in service, etc. That is, replacement urgency is low in a home appliance with a short service period. A home appliance with a short service period will be given a higher energy saving rating compared to home appliances which have degraded over long service period and compared to home appliances of old models. The replacement urgency of the home appliance will be elevated even when if the service period is short when encountering a heavy severity failure.

This is convenient for the user as it will facilitate user's decision making in determining when to purchase a replacement of the home appliance. The user is further allowed to consider purchasing of a replacement of the home appliance currently in service by comparing the replacement urgency and the energy saving rating at the present. That is, the user is able to easily obtain objective criteria for considering replacement, namely, replacement urgency and energy saving rating and thus, is convenient for the user.

Figure 49:
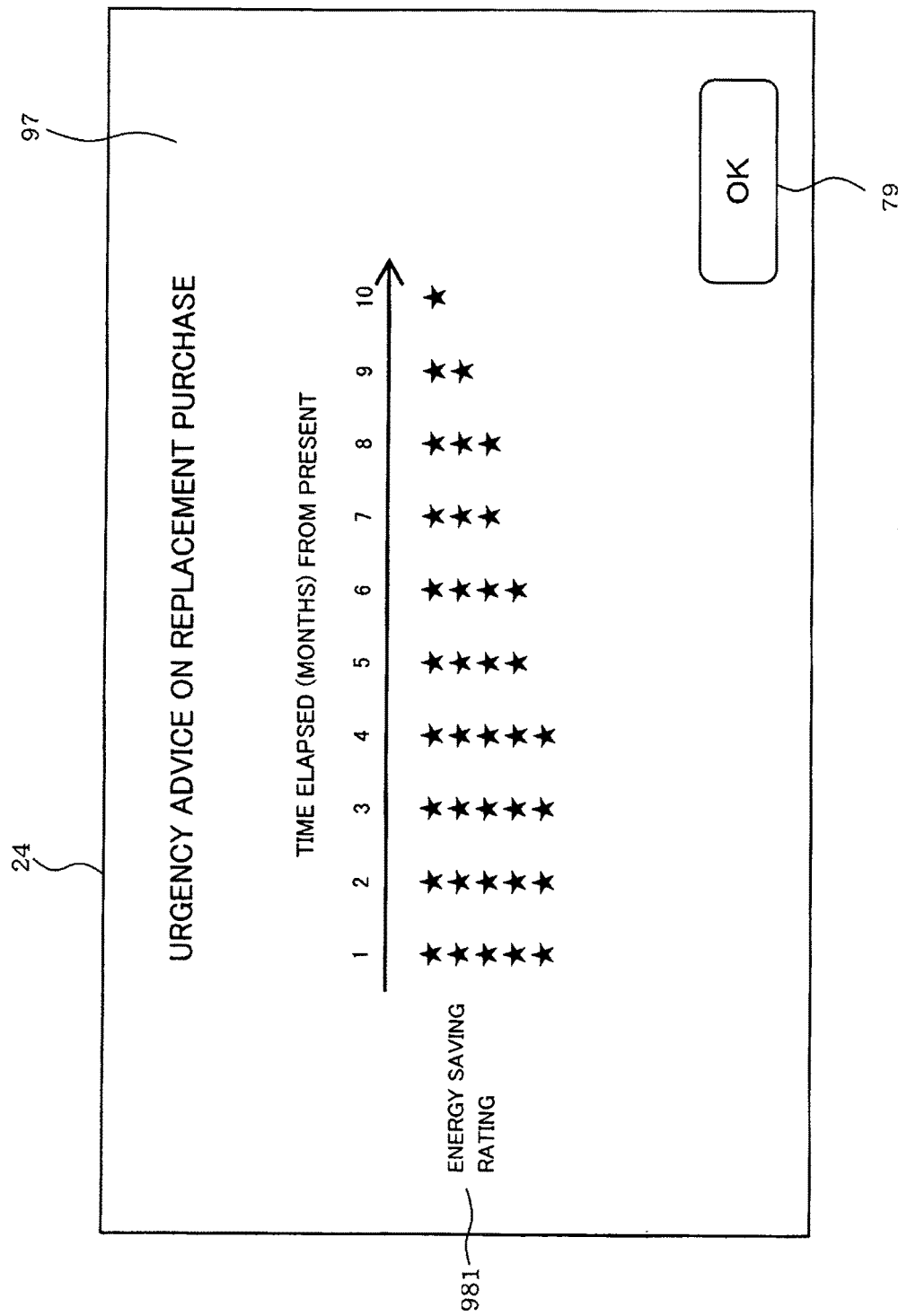
FIG. 49 illustrates a screen displaying information pertaining to urgency of purchasing a replacement.

The server 5 may be configured to display information 98 pertaining to urgency of purchasing a replacement illustrated in FIG. 49 in the display region 24 instead of information 97. Information 98 includes a graph 981 indicating the relation between the elapsed time from the present and the estimated power saving rating at each elapsed period. Information 98 indicates how much the energy saving performance of the home appliance will degrade after certain number of months when the home appliance of concern is used as it is. This is convenient for the user since the user is given easy reference to an outlook on how long the home appliance currently in service can be used and when it should be replaced.

Figure 50:
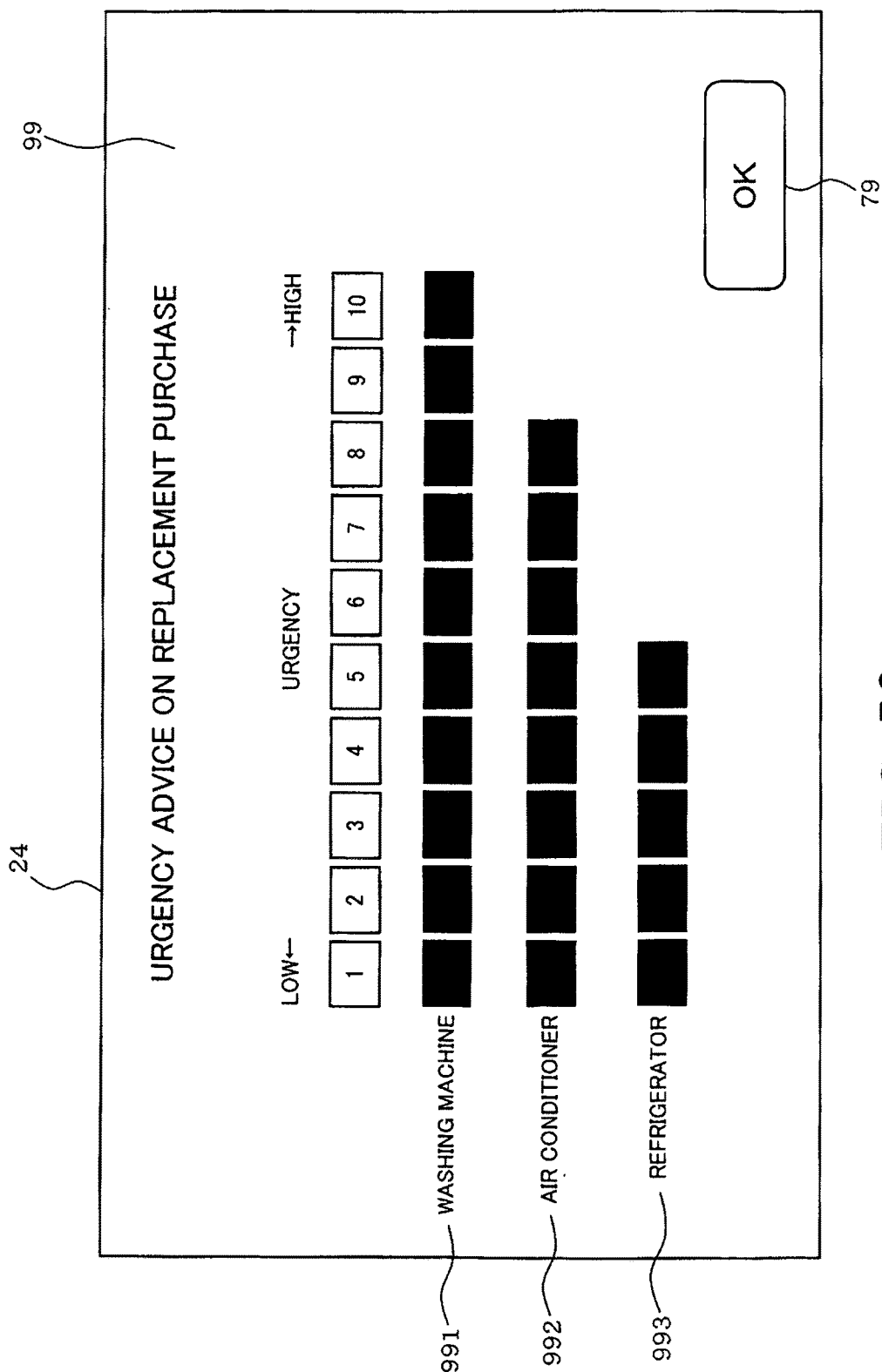
FIG. 50 illustrates a screen displaying information pertaining to urgency of purchasing a replacement.

When there is more than one home appliance of concern, the server 5 may be configured to display, as a specific advice, information 99 on the replacement urgency of the multiple types of home appliances on the same screen as illustrated in FIG. 50. Information 99 is a graph indicating the current replacement urgency of each home appliance at different stages. Information 99 includes a graph 991 indicating the replacement urgency of the washing machine, a graph 992 indicating the replacement urgency of the air conditioner, and a graph 993 indicating the replacement urgency of the refrigerator for example. The graphs 991, 992, and 993 are displayed in the order of their urgency. In other words, the replacement urgency of each home appliance is presented in the form of a ranking in the display region 24. This is convenient for the user since the user is able to easily identify the home appliance with a high replacement urgency from the choice of multiple home appliances. Information 97, 98, and 99 are preferably displayed for example in June, July, November, or December when bonuses are generally handed out and the when the user may be more susceptible to consider purchasing a new home appliance.

Figure 51:
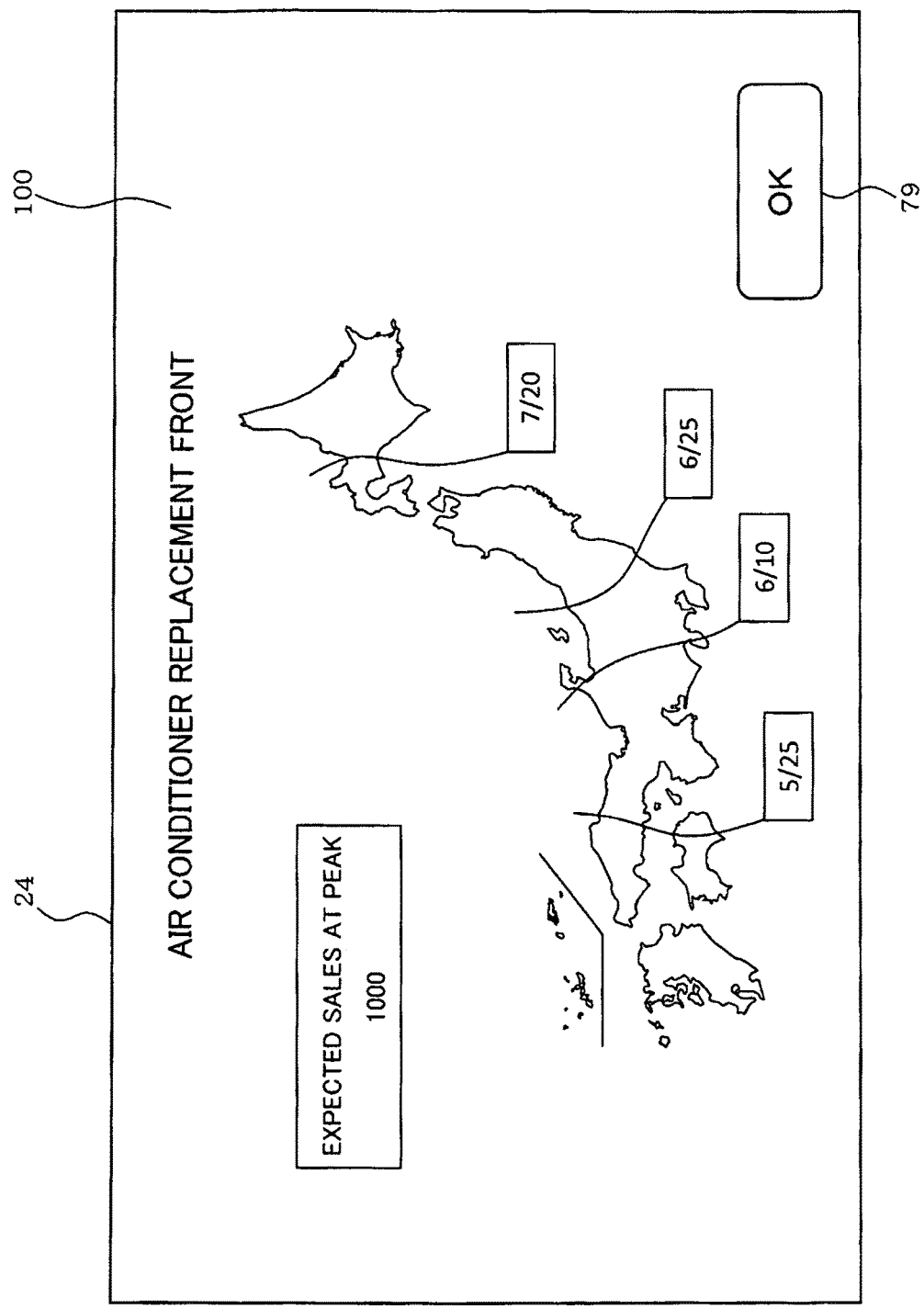
FIG. 51 illustrates a screen displaying information pertaining to sales and information pertaining to purchasing a replacement.

Further, the server 5 may be configured to display, as a specific advice, information 100 pertaining to sales and purchasing a replacement such as those illustrated in FIG. 51 in the display region 24. In this example, information 100 pertains to seasonal products such as an air conditioner and is referred to as "air conditioner replacement front" as in a cherry blossom front or a rain season front. The "air conditioner replacement front" is a forecast diagram of the number of air conditioners sold and provides a forecast of when the sales of air conditioners will reach its peak. The "air conditioner replacement front" is produced for example as follows. First, the server 5 stores the count of air conditioners sold in the past for the dealers across the country. Based on the obtained data, the server 5 predicts when the number of air conditioners sold in each dealer will reach its peak in the current year. Then, the server 5 produces a diagram in which the dealers reaching the peak of their sales at the same time are plotted and joined by a line. This is convenient for the user since the user is allowed to consider purchasing an air conditioner while viewing the sales forecast of air conditioners in the user's residential area.

Figure 52:
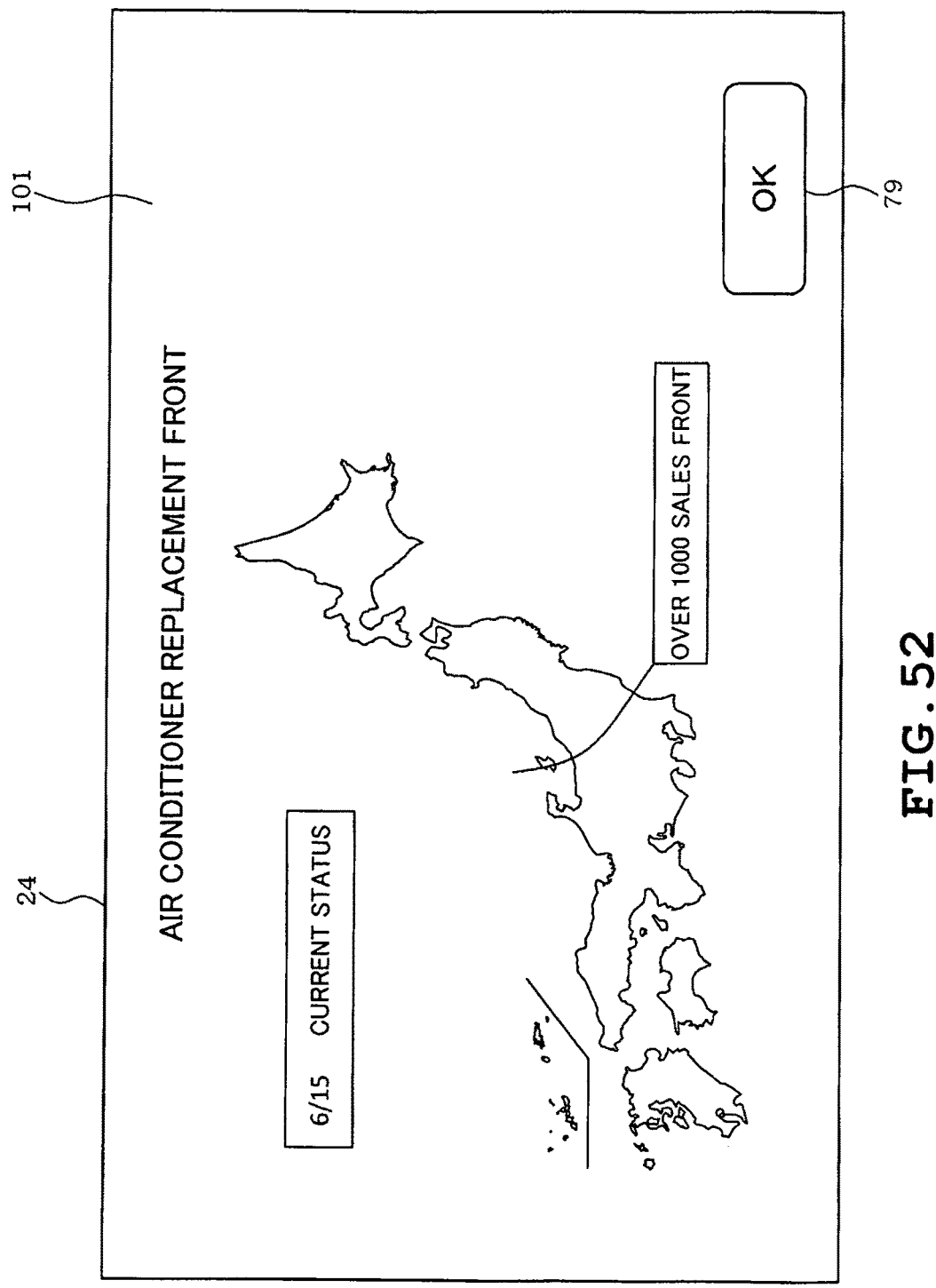
FIG. 52 illustrates a screen displaying information pertaining to sales and information pertaining to purchasing a replacement.

The "air conditioner replacement front" may be provided as information 101 indicated in FIG. 52 instead of information 99 indicated in FIG. 51. Information 101 indicated in FIG. 52 pertains to sales and replacement purchase and is produced for example as follows. First, the server 5 stores the count of air conditioners sold in the past for the dealers across the country. Based on the obtained data, the server 5 predicts the number of air conditioners sold when the sales of air conditioners in the current year reaches its peak and sets that predicted number sold as a threshold. Then, the server 5 counts the actual number of air conditioners sold in each dealer at the present and produces a diagram in which the dealers having sold as much as or greater than the threshold number are plotted and joined by a line. This is convenient for the user since the user is allowed to consider purchasing an air conditioner while viewing the sales forecast of air conditioners in the user's residential area.

Further embodiments of the network system are described below.

In some embodiments, the communication terminal is configured to display the specific advice above the general advice.

In some embodiments, the communication terminal is configured to display the specific advice in a display region having a greater area compared to a display region where the general advice is displayed.

In some embodiments, the communication terminal is configured to display a fixed general advice.

In some embodiments, the communication terminal is configured to display the specific advice in a window disposed in front of the general advice so as to overlap with the general advice.

In some embodiments, the communication terminal is configured to display a setting key on the same screen where the specific advice is displayed, the setting key being used to provide operational settings for the home appliance.

In some embodiments, the communication terminal is configured to display a transition key on the same screen where the specific advice is displayed, the transition key being used to make a transition to a settings screen for providing operational settings for the home appliance.

In some embodiments, the home appliance dealer's website key is linked to a website of a dealer directly run by a manufacturer of the home appliance.

In some embodiments, the severity level includes a light level indicating a low possibility of future failure, a moderate level indicating a high possibility of future failure, and heavy level indicating presence of failure.

In some embodiments, the communication terminal displays a repair request key, configured to request repair, on the same screen where the specific advice is displayed when the severity level is heavy, and wherein the communication terminal does not display the repair request key on the same screen where the specific advice is displayed when the severity level is light.

In some embodiments, the communication terminal displays a repair request key, configured to request repair, on the same screen where the specific advice is displayed upon user request when the severity level is moderate.

In some embodiments, the communication terminal is configured to display time required for repairing the home appliance based on the data pertaining to failure.

In some embodiments, the communication terminal is configured to display cost required for repairing the home appliance based on the data pertaining to failure.

In some embodiments, the storing unit is configured to store a preset threshold of the cost required for repairing and when the cost required for repairing surpasses the threshold, an alert is issued informing surpassing of the threshold.

In some embodiments, the information pertaining to purchasing of home appliance includes information on product stock.

In some embodiments, the information pertaining to purchasing of home appliance includes information pertaining to installation space of home appliance and wherein the communication terminal displays a home appliance capable of being installed in an installation space equal to or less than an installation space of home appliance currently being used with priority over other home appliances.

In some embodiments, the information pertaining to purchasing of home appliance includes information pertaining to sales of home appliances.

In some embodiments, the information pertaining to sales of home appliances includes information on number of home appliances sold by region.

In some embodiments, the information pertaining to purchasing of home appliances includes information encouraging purchasing of a replacement of a consumable used with the home appliance.

In some embodiments, the information pertaining to purchasing of home appliances includes information indicating a scale of urgency for purchasing a replacement of the home appliance.

In some embodiments, the communication terminal is configured to display the information pertaining to purchasing of home appliance for multiple types of home appliances on the same screen.

In some embodiments, the communication terminal is configured to display information encouraging purchasing of a replacement of the home appliance when the home appliance is susceptible to suffering heavy failures.

In some embodiments, the information encouraging purchasing of a replacement includes information indicating advantages of purchasing a replacement of the home appliance.

In some embodiments, the specific advice includes information on a risk arising from continued use of the home appliance in a failed state.

In some embodiments, the specific advice has a scale of urgency ranging over multiple levels specified thereto, wherein the urgency is modified depending upon current time information.

In some embodiments, the communication terminal displays a status of the home appliance on the display portion before service of the home appliance is started.

In some embodiments, the specific advice has a scale of urgency ranging over multiple levels specified thereto.

In some embodiments, the specific advice includes information indicating an appropriate timing for repairing the home appliance.

In some embodiments, the specific advice includes information indicating degree of consumption of the consumable.

In some embodiments, the information indicating degree of consumption of the consumable is represented by a graph.

In some embodiments, the information indicating degree of consumption of the consumable is represented by monetary cost.

In some embodiments, the information indicating degree of consumption of the consumable is represented by amount of electric power consumption.

In some embodiments, the information indicating degree of consumption of the consumable is scaled over multiple levels.

In some embodiments, the specific advice is given in a form of a figure schematically depicting the home appliance, the figure indicating a location of the consumable provided with the home appliance.

In some embodiments, advantages of replacing the consumable are displayed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A network system comprising:
   a home appliance connected to a communication line, the home appliance including a control portion configured to control an operating state of the home appliance, an information setting portion configured to set information corresponding to a current state of the home appliance, and a transmitting portion configured to externally transmit a result of information set by the information setting portion through the communication line;
   a storing unit connected to the home appliance through the communication line and configured to store multiple entries of data for displaying advice pertaining to the home appliance; and
   a communication terminal connected to the storing unit through the communication line and provided with a display portion, the communication terminal being configured to display: a select screen provided with multiple keys, each of the multiple keys provided with a message label indicating a different, improper operation state of the home appliance respectively and configured to be selected and electrically operated by a user determining a corresponding improper operation state of the home appliance, a specific advice to improve the operation state of the home appliance indicated by the message label provided on the key operated by the user, the specific advice being based on data obtained from the multiple entries of data stored in the storing unit corresponding to the result of information transmitted by the home appliance, and a general advice displayed on a same screen and at a same time as the specific advice, the general advice including information not reflective of the result of information transmitted by the home appliance.

2. The network system according to claim 1, wherein the specific advice includes a failure forecast information configured to predict failures of the home appliance.

3. The network system according to claim 1, wherein the communication terminal is configured to display a home appliance dealer's website key on the same screen where the specific advice is displayed, the home appliance dealer's website key being used to display a website of the home appliance dealer.

4. The network system according to claim 2, wherein the failure forecast information differs in content depending upon a severity level indicating a possibility of failure.

5. The network system according to claim 1, wherein:
   in response to detecting operation of a repair request key configured to request repair, the communication terminal is configured to transmit a result of the detecting to the transmitting portion through the communication line,
   the home appliance is further provided with an acquiring portion configured to acquire data pertaining to failure occurring in the home appliance when receiving the result of detection, and
   the transmitting portion is configured to transmit the data pertaining to failure acquired by the acquiring portion to a repair reception being connected to the communication line and being configured to receive request for repair of the home appliance.

6. The network system according to claim 1, wherein the communication terminal displays a purchase support key, configured to display information pertaining to purchasing of home appliance, on the same screen where the specific advice is displayed.

7. The network system according to claim 6, wherein the information pertaining to purchasing of home appliance includes information on amount of electric power consumption.

8. The network system according to claim 6, wherein the information pertaining to purchasing of home appliances includes information encouraging purchasing of a replacement of the home appliance.

9. The network system according to claim 1, wherein the storing unit is provided with a time information acquiring unit configured to acquire current time information and transmits the time information acquired by the time information acquiring unit to the communication terminal, and wherein the communication terminal is configured to change priority of the specific advice to be displayed based on the time information acquired from the storing unit.

10. The network system according to claim 1, wherein the home appliance is further provided with a location acquiring unit configured to acquire current location of the home appliance,
    wherein the transmitting portion is configured to transmit location information acquired by the location acquiring unit to the storing unit, and
    wherein the storing unit is configured to change content of the specific advice based on the location information of the home appliance.

11. The network system according to claim 1, wherein the specific advice is changed depending upon duration of service 10 of the home appliance.

12. The network system according to claim 1, wherein the specific advice includes information indicating whether current symptoms of the home appliance can be alleviated by improving user's usage.

13. The network system according to claim 1, wherein the specific advice includes information pertaining to a consumable provided with the home appliance.

* * * * *